(12) United States Patent
Ballard et al.

(10) Patent No.: US 11,299,688 B2
(45) Date of Patent: Apr. 12, 2022

(54) POLYSILOXANE HYDRAULIC FLUIDS

(71) Applicants: THE BOEING COMPANY, Chicago, IL (US); Commonwealth Scientific and Industrial Research Organisation, Acton (AU)

(72) Inventors: Mathew John Ballard, Oakleigh East (AU); Philip Stephen Casey, Heathmont (AU); Susan Wan-Yi Holmes, Murrumbeena (AU); Cameron David Way, Heathmont (AU); Kevin Norman Winzenberg, Camberwell (AU); James Hull, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/300,579

(22) PCT Filed: May 11, 2017

(86) PCT No.: PCT/AU2017/050435
§ 371 (c)(1),
(2) Date: Nov. 11, 2018

(87) PCT Pub. No.: WO2017/193174
PCT Pub. Date: Nov. 16, 2017

(65) Prior Publication Data
US 2019/0284494 A1  Sep. 19, 2019

Related U.S. Application Data

(60) Provisional application No. 62/334,555, filed on May 11, 2016.

(51) Int. Cl.
C10M 107/50 (2006.01)
C08G 77/04 (2006.01)
(Continued)

(52) U.S. Cl.
CPC .......... *C10M 107/50* (2013.01); *C08G 77/04* (2013.01); *C08G 77/045* (2013.01);
(Continued)

(58) Field of Classification Search
CPC ..... C08K 5/5357; C08K 5/5333; C08L 83/04; C08L 2205/025; C10M 2229/042;
(Continued)

(56) References Cited

U.S. PATENT DOCUMENTS 2,634,288 A  4/1953 Boyer et al.
3,048,545 A  8/1962 Critchley et al.
(Continued)

FOREIGN PATENT DOCUMENTS

EP  3455282 A1  3/2019
GB  1165026 A  9/1969
(Continued)

OTHER PUBLICATIONS

Extended European Search Report for Application No. 17795195.1-1104/3455252 dated Nov. 29, 2019.
(Continued)

*Primary Examiner* — Vishal V Vasisth
(74) *Attorney, Agent, or Firm* — Patterson + Sheridan, LLP

(57) ABSTRACT

The present disclosure relates to polysiloxanes, processes for preparing polysiloxanes, and hydraulic fluids comprising polysiloxanes. This disclosure also relates to hydraulic fluids comprising one or more polysiloxane compounds and diphosphonate compounds, and to the use of diphosphonate compounds in hydraulic fluids or as additives or components in various compositions, for example to provide fire retardant properties to a fluid or composition. This disclosure
(Continued)

also relates to use of the compositions as hydraulic fluids, which may be used in various machines, vehicles and craft, including aircraft.

82 Claims, 9 Drawing Sheets

(51) Int. Cl.
| | |
|---|---|
| C08K 5/5333 | (2006.01) |
| C08K 5/5357 | (2006.01) |
| C08L 83/04 | (2006.01) |
| C10M 137/12 | (2006.01) |
| C10M 111/04 | (2006.01) |
| C10M 141/12 | (2006.01) |
| C08G 77/00 | (2006.01) |
| C10N 30/02 | (2006.01) |
| C10N 30/00 | (2006.01) |
| C10N 40/08 | (2006.01) |

(52) U.S. Cl.
CPC .......... *C08K 5/5333* (2013.01); *C08K 5/5357* (2013.01); *C08L 83/04* (2013.01); *C10M 111/04* (2013.01); *C10M 137/12* (2013.01); *C10M 141/12* (2013.01); *C08G 77/70* (2013.01); *C08G 77/80* (2013.01); *C08L 2205/025* (2013.01); *C10M 2223/06* (2013.01); *C10M 2223/065* (2013.01); *C10M 2229/042* (2013.01); *C10M 2229/0425* (2013.01); *C10N 2030/02* (2013.01); *C10N 2030/36* (2020.05); *C10N 2040/08* (2013.01)

(58) Field of Classification Search
CPC .... C10M 2229/0425; C10M 2223/065; C10M 2223/06; C10N 2240/08; C10N 2230/36; C10N 2230/02; C10N 2030/18; C08G 77/045; C08G 77/04; C08G 77/70; C08G 77/80

See application file for complete search history.

(56) References Cited

U.S. PATENT DOCUMENTS

| | | | |
|---|---|---|---|
| 3,288,712 A | 11/1966 | Stark | |
| 3,532,730 A | 10/1970 | Culpepper | |
| 3,579,449 A | 5/1971 | Wann et al. | |
| 3,630,916 A | 12/1971 | Thompson | |
| 4,019,997 A | 4/1977 | Brown, Jr. et al. | |
| 5,130,041 A | 7/1992 | Groenhof | |
| 6,348,437 B1 | 2/2002 | Avery et al. | |
| 2013/0079263 A1 | 3/2013 | McIntyre | |
| 2014/0142006 A1* | 5/2014 | Ichihashi | ............. C10M 169/04 508/107 |

FOREIGN PATENT DOCUMENTS

| | | |
|---|---|---|
| JP | H04091125 A | 3/1992 |
| JP | H05177294 A | 7/1993 |
| JP | H05202078 A | 8/1993 |
| JP | H08231598 A | 9/1996 |
| JP | H11021443 A | 1/1999 |
| WO | 2014/028632 A1 | 2/2014 |
| WO | 2015116509 A1 | 8/2015 |
| WO | 2017193174 A1 | 11/2017 |

OTHER PUBLICATIONS

Lee Jason J et al: "The solubility of low molecular weight Poly (Dimethyl siloxane) in dense C02 and its use as a C02-philic segment", The Journal of Supercritical Fluids, vol. 119, Aug. 17, 2016.

Daisuke Noda et al: "Non-Precious-Metal Catalytic Systems Involving Iron or Cobalt Carboxylates and Alkyl Isocyanides for Hydrosilylation of Alkenes with Hydrosiloxanes", Journal of the American Chemical Society, vol. 138, No. 8, Mar. 2, 2016.

"Silicone Fluids" Power Chemical Corporation Limited, retrieved from internet on Nov. 8, 2018, http://www.powerchemcorp.com/library/public/SiSiB_SILICONE_FLUIDS_v14.0.pdf, published Feb. 2012, 31 pgs.

Schiefer, H., et al., "Extending the Utility of Silicone Lubricants through Structural Modifications," J. Chemical and Engineering Data (1961), Vole 6, No. 1.

Sunada et al., "Combinatorial Approach to the Catalytic Hydrosilylation of Styrene Derivatives: Catalyst Systems Composed of Organoiron (O) or (II) Precursors and Isocyanides," Organometallics, Dec. 15, 2020, 11 pages.

Japanese Notice of Reasons for Rejection for Application No. 2018-559844 dated Apr. 20, 2021.

Chinese Office Action for Application No. 2017800427333 dated Dec. 13, 2020.

Australian Government Examination Report No. 1 for Application No. 2017263714 dated Jan. 29, 2021.

Japanese Notice of Reasons for Rejection for Application 2018-559844 dated Nov. 30, 2021.

* cited by examiner

POLYSILOXANE HYDRAULIC FLUIDS

CROSS-REFERENCE TO RELATED APPLICATIONS

The present application is a National Stage patent application of International Application No. PCT/AU2017/050435, filed May 11, 2017, and claims priority to U.S. Provisional Patent Application No. 62/334,555 filed on May 11, 2016, the contents of which are hereby incorporated by reference in their entireties.

FIELD

The present disclosure relates to polysiloxanes, processes for preparing polysiloxanes, and hydraulic fluids comprising polysiloxanes. This disclosure also relates to hydraulic fluids comprising one or more polysiloxane compounds and diphosphonate compounds, and to the use of diphosphonate compounds in hydraulic fluids or as additives or components in various compositions, for example to provide fire retardant properties to a fluid or composition. This disclosure also relates to use of the compositions as hydraulic fluids, which may be used in various machines, vehicles and craft, including aircraft.

BACKGROUND

Aircraft typically include hydraulic systems for operating and actuating moveable components such as landing gear, brakes, etc. Hydraulic fluids used in the hydraulic systems of civilian aircraft typically contain some combination of phosphate esters including trialkyl phosphates, dialkyl aryl phosphate esters, alkyl diaryl phosphate esters, and triaryl phosphate esters. However, undesirable properties exist in phosphate ester based hydraulic fluids currently being used including a tendency to strip paint, corrode metals, dissolve plastics, and to develop an increase in acidity during use. Consequently, there has been ongoing development of phosphate ester-based hydraulic fluid formulations to include various additives to mitigate some of these undesirable properties, although some of the additives themselves are now considered user unfriendly or involve future supply restrictions. Some hydraulic fluids also contain less desirable fluorinated surfactants such as perfluoroalkylsulfonic acid salt as an anti-erosion agent. There is a need to replace phosphate ester-based hydraulic fluids with fluids that are more benign and more user friendly.

Consequently, there is a need to develop alternative hydraulic fluids that can provide suitable rheological, tribological and chemical properties, including suitable viscosity, lubricity, and for some applications, bulk modulus and fire retardant properties, for example for use in various craft, vehicles and machinery, including for aircraft.

SUMMARY

The present inventors have identified alternative hydraulic fluid compositions comprising polysiloxane compounds. Further advantages have also been identified by the use of diphosphonate compounds in the hydraulic fluid compositions. For example, the polysiloxane compounds according to at least some embodiments as described herein can provide suitable properties to the hydraulic fluid compositions such as suitable viscosity, and the diphosphonate compounds according to at least some embodiments as described herein can provide suitable properties to the hydraulic fluid compositions such as fire retardant and lubricity properties. Other compounds or additives may also be included in the hydraulic fluid compositions to achieve additional advantages or impart various further properties to the composition. According to at least some embodiments as described herein, a compound may provide more than one property (or function) to the hydraulic fluid compositions. Desirable properties may include any one or more of: suitable operating viscosity over a broad temperature range (including sub-ambient temperatures), fire retardant properties, lubricity, compatibility with other materials (e.g. with rubber components or paint coatings), stability in operating conditions, and low or reduced corrosiveness to metal and alloy surfaces.

In one aspect there is provided a hydraulic fluid composition comprising a polysiloxane compound and a diphosphonate compound, wherein the polysiloxane compound is represented by a compound of Formula 1:

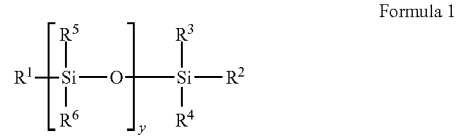

Formula 1 wherein
y is an integer selected from 1 to 40;
$R^1$, $R^2$, $R^3$, and $R^4$, are each independently selected from the group consisting of $C_{1-10}$alkyl, aryl, and $C_{1-10}$alkylaryl; and
Each $R^5$ and $R^6$ is independently selected from the group consisting of $C_{1-10}$alkyl, aryl, and $C_{1-10}$alkylaryl.

In another aspect, there is provided use of the hydraulic fluid composition as a fire resistant hydraulic fluid or hydraulic fluid for aircraft.

In another aspect, there is provided use of the polysiloxane compound of Formula 1 according to any examples as described herein for preparing a hydraulic fluid composition comprising a diphosphonate compound according to any examples as described herein.

In another aspect, there is provided use of a diphosphonate compound according to any examples as described herein for preparing a hydraulic fluid composition comprising a polysiloxane compound of Formula 1 according to any examples as described herein.

In another aspect, there is provided a process for preparing a hydraulic fluid composition comprising adding together in a composition, in any order, a polysiloxane compound of Formula 1 and diphosphonate compound according to any examples as described herein. The process may comprise the addition, in any order, of at least one of a phosphonate compound or additive according to any examples as described herein.

In another aspect, there is provided a hydraulic fluid composition comprising a polysiloxane compound of Formula 1:

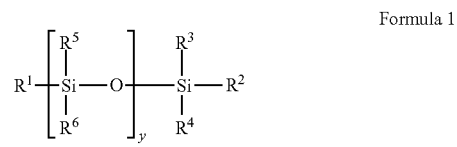

Formula 1 wherein y is an integer selected from 1 to 40;

$R^1$, $R^2$, $R^3$, and $R^4$, are each independently selected from $C_{1-10}$alkyl, aryl, and $C_{1-10}$alkylaryl;

Each $R^5$ and each $R^6$ is independently selected from $C_{1-10}$alkyl, aryl, and $C_{1-10}$alkylaryl; and wherein at least one of $R^1$ to $R^4$, or at least one $R^5$ and $R^6$ from at least one of the y groups, is selected from at least one of aryl and $C_{1-10}$alkylaryl.

In another aspect, there is provided a polysiloxane compound of Formula 1:

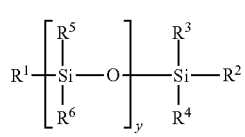

Formula 1 wherein y is an integer selected from 2 to 25;

$R^1$, $R^2$, $R^3$, and $R^4$, are each independently selected from $C_{1-10}$alkyl, aryl, and $C_{1-10}$alkylaryl; and Each $R^5$ and each $R^6$ is independently selected from $C_{1-10}$alkyl, aryl, and $C_{1-10}$alkylaryl; and wherein at least one of $R^1$ and $R^2$ is selected from aryl and $C_{1-10}$alkylaryl.

The polysiloxane compound of Formula 1 for any of the above aspects may be represented by a compound of Formula 1a:

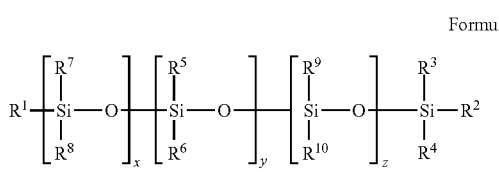

Formula 1a wherein x is an integer selected from 0 to 10;

y is an integer selected from 1 to 20;

z is an integer selected from 0 to 10;

$R^1$, $R^2$, $R^3$, and $R^4$, are each independently selected from $C_{1-10}$alkyl, aryl, and $C_{1-10}$alkylaryl;

Each $R^5$ and $R^6$ is independently selected from $C_{1-10}$alkyl, aryl, and $C_{1-10}$alkylaryl; and Each $R^7$, $R^8$, $R^9$, and $R^{10}$, is independently selected from $C_{1-10}$alkyl.

Each $R^7$, $R^8$, $R^9$, and $R^{10}$, may be methyl and x and z may each be integers independently selected from 1 to 3. Y may be an integer selected from 2 to 16 or the sum of x, y and z, may be an integer selected from 2 to 16.

$R^1$ and $R^2$ may each be independently selected from $C_{1-10}$alkyl, aryl, and $C_{1-10}$alkylaryl. Each $R^3$, $R^4$, $R^5$, $R^7$, $R^8$, $R^9$, and $R^{10}$, may be $C_{1-4}$alkyl. Each $R^6$ and y may be selected to provide the polysiloxane compound of Formula 1a with between 1 to 6 optional substituents independently selected from aryl and $C_{1-10}$alkylaryl. Any other substituents for each $R^6$ may be independently selected from $C_{1-4}$alkyl. Each $R^3$, $R^4$, $R^5$, $R^7$, $R^8$, $R^9$, and $R^{10}$, may be methyl, and each $R^6$ may be independently selected from methyl, aryl, and $C_{1-10}$alkylaryl.

At least one or both of $R^1$ and $R^2$ may be selected from at least one of aryl and $C_{1-10}$alkylaryl. The $C_{1-10}$alkylaryl may be a $C_{1-6}$alkylphenyl, for example phenethyl. The number of phenyl substituents in the siloxane compound may be selected to provide a mol % of phenyl in the polysiloxane compound of between 2 and 50 mol % relative to silicon.

The polysiloxane compound of Formula 1 may be provided by a mixture of two or more polysiloxane compounds of Formula 1. The polysiloxane mixture may comprise a series of different polysiloxane compounds of Formula 1 each having a different y value or a number of siloxane repeat units (Si—O) selected from and including each integer from 9 to 12, 8 to 13, 9 to 14, 8 to 15, 7 to 16, or 6 to 17. It will be appreciated that there may be provided a formulation or hydraulic fluid composition comprising the mixture of polysiloxane compounds according to any one or more of the examples as described herein.

The hydraulic fluid compositions comprising a polysiloxane compound according to any examples as described herein may further comprise a phosphonate compound selected from at least one of a monophosphonate and diphosphonate compound according to any examples as described herein. For example, the hydraulic fluid compositions may comprise a diphosphonate compound of Formula 2 as described herein. For example, the hydraulic fluid compositions may comprise a monophosphonate compound of Formula 3 as described herein.

The diphosphonate compound may be a compound of Formula 2:

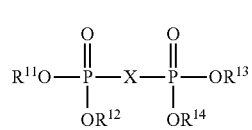

Formula 2 wherein

X is selected from a group consisting of an aryl, $C_{1-20}$alkyl, $C_{1-20}$alkylaryl, and $C_{1-20}$dialkylaryl; and $R^{11}$, $R^{12}$, $R^{13}$, and $R^{14}$, are each independently selected from $C_{1-20}$alkyl, aryl, and $C_{1-20}$alkylaryl.

The diphosphonate compound may be a compound of Formula 2(a):

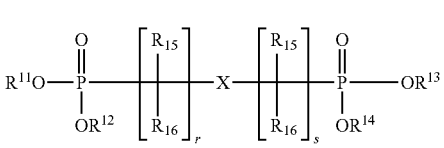

Formula 2(a)

wherein

X is absent or an aryl;

r and s are integers independently selected from 0 to 10, providing r is at least 1 when s is 0 and X is absent;

$R^{11}$, $R^{12}$, $R^{13}$, and $R^{14}$, are each independently selected from $C_{1-20}$alkyl, aryl, and $C_{1-20}$alkylaryl; and Each $R^{15}$ and each $R^{16}$ are independently selected from hydrogen, $C_{1-20}$alkyl, aryl, and $C_{1-20}$alkylaryl.

The diphosphonate compound may be a compound of Formula 2(a)(i):

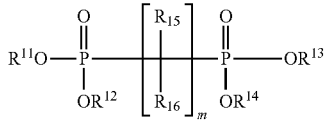

Formula 2(a)(i)

wherein
m is an integer selected from 1 to 10;
$R^{11}$, $R^{12}$, $R^{13}$, and $R^{14}$, are each independently selected from $C_{1-20}$alkyl, aryl, and $C_{1-20}$alkylaryl; and
Each $R^{15}$ and $R^{16}$ is independently selected from hydrogen, $C_{1-20}$alkyl, aryl, and $C_{1-20}$alkylaryl.

For the hydraulic fluid compositions as described above, m may be an integer selected from 1 to 6; $R^{11}$, $R^{12}$, $R^{13}$, and $R^{14}$, may each be independently selected from $C_{1-10}$alkyl and $C_{1-10}$alkylaryl; and each $R^{15}$ and $R^{16}$ may be independently selected from hydrogen and methyl.

For the hydraulic fluid compositions as described above, m may be an integer selected from 1 to 6; $R^{11}$, $R^{12}$, $R^{13}$, and $R^{14}$, may each be independently selected from $C_{2-10}$alkyl; and each $R^{15}$ and $R^{16}$ may be hydrogen.

For the hydraulic fluid compositions as described above, m may be an integer selected from 2 to 4; $R^{11}$, $R^{12}$, $R^{13}$, and $R^{14}$, may each be independently selected from $C_{2-6}$alkyl; and each $R^{15}$ and $R^{16}$ may be hydrogen.

The hydraulic fluid compositions may further comprise a phosphonate compound represented by a compound of Formula 3:

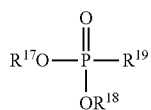

Formula 3 wherein $R^{17}$, $R^{18}$, and $R^{19}$, may each be independently selected from $C_{1-20}$alkyl, aryl, and $C_{1-20}$alkylaryl.

$R^{17}$, $R^{18}$, and $R^{19}$, may each be independently selected from $C_{1-10}$alkyl and $C_{1-10}$alkylaryl.

The amount of polysiloxane compound, based on weight % of the composition, may be provided at between about 10 and 90%. The volume ratio of the polysiloxane compound to the diphosphonate compound in the composition may be provided at a volume ratio of more than about 1:2, respectively, e.g. 1:1, 2:1 or 3:1.

The hydraulic fluid composition may further comprise or consist of at least one additive selected from the group consisting of an acid scavenger, an anti-erosion additive, a viscosity index improver, an antifoaming agent, an anti-corrosion additive, an antioxidant, and any combination thereof. The hydraulic fluid composition may further comprise or consist of at least one additive selected from the group consisting of an acid scavenger, an antifoaming agent, an antioxidant, and any combination thereof. It will be appreciated that the composition may comprise or consist of a single additive selected from the whole group.

The acid scavenger may be selected from the group consisting of phenylglycidyl ether, pinene oxide, styrene oxide, glycidyl cyclohexyl ether, glycidyl epoxycyclohexyl ether, diglycidyl ether, glycidyl isopropyl ether, butadiene dioxide cyclohexylene oxide, bis-epoxycyclohexyl adipate, 3,4-epoxycyclohexylcarboylate, 3,4-epoxycyclohexane, and combinations thereof.

The antifoaming agent may be selected from the group consisting of silicone oil, polyvinyl alcohol, polyethers, and combinations thereof.

The antioxidant may selected from the group consisting of 2,6-di-tert-butyl-p-cresol, phenyl-α-napthylamine, di(octylphenyl)amine, 6-methyl-2,4-bis(octylthio)-methyl]-phenol, tetrakis[methylene(3,5-di-tert-butyl-4-hydroxyhydrocinnamate)], and combinations thereof.

The hydraulic fluid composition may be substantially free of fluorinated anti-erosion additives. The hydraulic fluid composition may be substantially free of perfluorinated anionic surfactants, for example a perfluoroalkyl sulfonic acid or salt thereof. These compositions may be more user friendly, provide improved ease of handling or with fewer additives may facilitate ease of manufacturing or lower cost of goods.

The hydraulic fluid composition may be substantially free of additional viscosity index improvers, for example those selected from the group consisting poly(alkyl acrylate), poly(alkyl methacrylate), poly(alkyl methacrylate) esters, polycyclic polymers, polyurethanes, polyalkylene oxides, polyesters, and combinations thereof. These compositions with fewer additives may facilitate ease of manufacturing or lower cost of goods, or may provide lower densities or enhanced fire retardant properties, for example.

The flash point of the hydraulic fluid composition may be between 160 and 300° C. when measured using flash point testing method of ASTM D4206 of 2-4 ml volumes with a Stanhope Seta Open Cup Apparatus. The density (gcm$^3$ at 298K) of the hydraulic fluid composition may be less than 1.5, 1.4, 1.3, 1.2, or 1.1. The hydraulic fluid composition may exhibit a viscosity between about 5 and about 25 centipoises at about 100° F. and between about 500 and about 3500 centipoises at −65° F.

The hydraulic fluid compositions may be fire resistant hydraulic fluids or hydraulic aircraft compositions, such as for commercial aircraft.

It will be appreciated that further aspects and examples are described herein, which may include one or more of the features as described above.

DETAILED DESCRIPTION

The present disclosure describes the following various non-limiting examples, which relate to investigations undertaken to identify alternative hydraulic fluid compositions, which includes those suitable for use in aviation and aircraft. It was surprisingly found that a composition comprising a polysiloxane compound, which includes the various compositions and compounds as described herein, can provide effective hydraulic fluid properties, and at least according to some examples may provide advantages such that they are effective for use in commercial aircraft. Diphosphonate compounds were also identified to provide further advantages to the hydraulic fluids comprising the polysiloxane compounds. For example, one or more desirable properties of the hydraulic fluid compositions may include a low rate of change of viscosity with temperature, fire retardant properties, lubricity, compatibility with rubber components, stability in operating conditions, and low corrosiveness to metal and alloy surfaces. Further advantages can, for example, enable more user friendly formulations, ease of handling, or ease of manufacturing or lower cost of goods from reduced complexity of formulations. A compound may provide one or more properties to the composition, and therefore the inclusion of multiple compounds, and optionally any other additives, into a hydraulic fluid composition can present a significant challenge in achieving desirable properties for a hydraulic fluid, particularly if it is being developed for use in commercial aircraft. A hydraulic fluid should provide suitable rheological, tribological, and chemical properties, and an individual compound is unlikely to provide such various properties by itself, although a fluid comprising multiple compounds may provide such various properties if each compound in the fluid contributes suitable individual properties to modify the overall properties of the composition. Currently used phosphate ester-based hydraulic fluid formulations have continued to evolve in complexity over many years and they now include a multifaceted array of various compounds and additives. In contrast to the phosphate ester-based hydraulic fluid formulations, there are disclosed herein alternative hydraulic fluid compositions, which may according to at least some examples be effective for use in aircraft including commercial aircraft.

Specific Terms

As it will be understood, "aryl" whether used alone, or in compound words such as alkylaryl, may refer to: (i) a substituted or unsubstituted mono- or polycyclic aromatic carbocyclic moiety, e.g., of about 6 to about 20 carbon atoms, such as phenyl, naphthyl or fluorenyl; or (ii) a substituted or unsubstituted partially saturated polycyclic carbocyclic aromatic ring system in which an aryl and a cycloalkyl or cycloalkenyl group are fused together to form a cyclic structure such as a tetrahydronaphthyl, indenyl, indanyl or fluorene ring. It will be appreciated that the polycyclic ring system may include a bicyclic and/or tricyclic ring system. It will also be appreciated that the term "unsubstituted" refers to the absence of one or more substituent groups or presence of one or more hydrogens. The "substituted" groups may be $C_{1-10}$alkyl as defined herein, such as straight chain or branched $C_{1-4}$alkyl.

"Alkyl" whether used alone, or in compound words such as alkylaryl, represents straight or branched chain hydrocarbons ranging in size from one to about 20 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl and/or butyl, pentyl, hexyl, and higher isomers, including, e.g., those straight or branched chain hydrocarbons ranging in size from about 6 to about 20 carbon atoms, or greater.

The term "$C_{1-20}$alkyl," as used herein refers to a straight chain or branched, saturated hydrocarbon having from 1 to 20 carbon atoms. Representative "$C_{1-20}$alkyl" groups include, but are not limited to, -methyl, -ethyl, -n-propyl, -n-butyl, -n-pentyl, -n-hexyl, -n-heptyl, -n-octyl, -n-nonyl, -n-decyl; n-undecyl, n-dodecyl, n-tridecyl, n-tetradecyl, n-pentadecyl, n-hexadecyl, n-heptadecyl, n-octadecyl, n-nonadecyl, n-icosyl.

The term "$C_{1-10}$alkyl," as used herein refers to a straight chain or branched, saturated hydrocarbon having from 1 to 10 carbon atoms. Representative "$C_{1-10}$alkyl" groups include, but are not limited to, -methyl, -ethyl, -n-propyl, -n-butyl, -n-pentyl, -n-hexyl, -n-heptyl, -n-octyl, -n-nonyl and -n-decyl; while branched $C_{1-8}$alkyls, for example, include, but are not limited to, -isopropyl, -sec-butyl, -isobutyl, -tert-butyl, -isopentyl, 2-methylbutyl, 1-hexyl, 2-hexyl, 3-hexyl, methyl, ethyl, propyl, isopropyl, n-butyl, isobutyl, sec-butyl, tert-butyl, n-pentyl, isopentyl, neopentyl, n-hexyl, isohexyl, 2-methylpentyl, 3-methylpentyl, 2,2-dimethylbutyl, 2,3-dimethylbutyl, 2,2-dimethylpentyl, 2,3-dimethylpentyl, 3,3-dimethylpentyl, 2,3,4-trimethylpentyl, 3-methylhexyl, 2,2-dimethylhexyl, 2,4-dimethylhexyl, 2,5-dimethylhexyl, 3,5-dimethylhexyl, 2,4-dimethylpentyl, 2-methylheptyl, 3-methylheptyl, n-heptyl, isoheptyl, n-octyl, and isooctyl.

The term "alkylaryl", "$C_{1-20}$alkylaryl", or "$C_{1-10}$alkylaryl", refers to a compound having an alkyl group bonded to an aryl group wherein the "alkyl", "$C_{1-20}$alkyl", $C_{1-10}$alkyl", and "aryl" moieties, are each defined supra.

The term "dialkylaryl", "$C_{1-20}$dialkylaryl", or "$C_{1-10}$dialkylaryl", refers to an aryl moiety substituted with two alkyl groups, wherein the "alkyl", "$C_{1-20}$alkyl", $C_{1-10}$alkyl", and "aryl" moieties, are each defined supra. It will be appreciated that each alkyl group can provide a point for bonding to another atom in a compound of Formula 2.

The term "low corrosion" generally refers to a concentration or amount effective to substantially inhibit or reduce corrosion, for example typically a loss of less than about 100 microns per year in the thickness of a metal in contact with the hydraulic fluid. In another example, the term "low corrosion" may refer to a loss of less than about 10 microns per year in the thickness of a metal in contact with the hydraulic fluid. The corrosion may be determined using the protocol in ASTM D4636.

General Terms

Throughout this disclosure, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Those skilled in the art will appreciate that the disclosure herein is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations or any two or more of said steps or features.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "fire retardant" refers to a property for a substance, additive or compound that may reduce flammability or delay combustion in fluids.

The term "lubricant", "lubricity" or like term, refers to a property for a substance, additive or compound that may facilitate reduction in friction or wear.

The term "high temperature stability" generally refers to a reduced or low degree of decomposition when heated to a temperature of about 250° C. for about 1 hour.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The term "consists of", or variations such as "consisting of", refers to the inclusion of any stated element, integer or step, or group of elements, integers or steps, that are recited in context with this term, and excludes any other element, integer or step, or group of elements, integers or steps, that are not recited in context with this term.

It will be clearly understood that, although a number of prior art publications are referred to herein, this reference does not constitute an admission that any of these documents forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Hydraulic Fluid Composition

The present disclosure provides hydraulic fluid compositions comprising one or more polysiloxane compounds. The present disclosure also provides hydraulic fluid compositions further comprising one or more phosphonate compounds. The phosphonate compound may be a diphosphonate compound. The polysiloxane compounds may be any one or more compounds of Formula 1 or Formula 1a as described herein. The phosphonate compounds may be any one or more diphosphonate compounds of Formula 2 as described herein. The phosphonate compounds may be any one or more phosphonate compounds of Formula 3 as described herein. The hydraulic fluid compositions may also comprise or further consist of any one or more additional compounds and additives as described herein. The hydraulic fluid composition may comprise a polysiloxane compound in a weight % of the total composition selected in a range of between 15 and 85%, 20 and 80%, 25 and 75%, 30 and 70%, 35 and 65%, 40 and 60%, or 45 and 55%. The hydraulic fluid composition may comprise a polysiloxane compound (in a weight %) of the total composition of at least about 15, 20, 25, 30, 35, 40, 45, 50, 55, 60, 65, 70, 75, or 80%. The hydraulic fluid composition may comprise a polysiloxane compound (in a weight %) of the total composition of less than about 80, 75, 70, 65, 60, 55, 50, 45, 40, 35, or 30%. The polysiloxane compound can provide a viscosity modifier property to the composition, and may include additional properties, such that in a composition comprising a diphosphonate compound there is provided a more effective hydraulic fluid, for example a hydraulic fluid effective for use in aircraft. For example, according to at least some examples the hydraulic fluid composition may not require a further viscosity modifier additive. In contrast to halogenated polysiloxanes, the non-halogenated polysiloxane compounds as described herein may also be less damaging or corrosive, and may provide other lubricity or flash point properties effective for use with a diphosphonate compound within a hydraulic fluid. The non-halogenated polysiloxanes may also be more benign and more user friendly, and may reduce the need for an anti-erosion or anti-corrosion additive, such as fluorinated surfactant, for example PFOS.

At least according to some examples as described herein, increased amounts or ratios of polysiloxanes relative to diphosphonates can provide further advantageous properties to the fluid including one or more of an improved viscosity across a range of temperatures (including sub-ambient), compatibility with paint, O-ring seals and metals, miscibility (with e.g. Skydrol® brand fire-resistant hydraulic fluids), lubricity, and pour point. Increased amounts of diphosphonates in the fluid can also provide improved fire retardant properties.

The hydraulic fluid compositions may comprise a polysiloxane compound wherein the number of aryl or alkylaryl (e.g. phenyl, benzyl or phenethyl) substituents in the polysiloxane compound provides a mol % of aryl moieties in the polysiloxane compound in a range selected from between 2 and 50 mol %, 5 and 45 mol %, 10 and 40 mol %, 15 and 35 mol %, or 20 and 30 mol % relative to silicon. At least according to some examples further advantages may be provided by aryl moieties being provided in the polysiloxanes compounds, for example in materials compatibility, rheological properties such as viscosity and thermal properties (e.g. flash and fire point).

The hydraulic fluid composition may comprise a diphosphonate compound in a weight % of the total composition selected in a range of between 15 and 85%, 20 and 80%, 25 and 75%, 30 and 70%, 35 and 65%, 40 and 60%, or 45 and 55%. The hydraulic fluid composition may comprise a diphosphonate compound in a weight % of the total composition of at least about 5, 10, 15, 20, 25, 30, 35, 40, 45, 50, 55, 60, 65, 70, or 75%. The hydraulic fluid composition may comprise a diphosphonate compound in a weight % of total composition of less than about 70, 65, 60, 55, 50, 45, 40, 35, 30, 25, 20, 15, or 10%. The diphosphonate compound can provide fire retardant and lubricity properties to the composition. The diphosphonate compound may be more user friendly and therefore more acceptable in relation to use in hydraulic fluids.

The hydraulic fluid composition may comprise or consist of a polysiloxane compound and a diphosphonate compound with a volume ratio selected from a range at or between about 95:5 to 5:95, 90:10 to 10:90, 85:15 to 15:85, 80:20 to 20:80, 25:75 to 25:75, 70:30 to 30:70, 65:35 to 35:65, 60:40 to 40:60, 55:45 to 45:55, or about 50:50. As mentioned above, the amount of polysiloxane compound and diphosphonate compound in the fluid can be selected to provide improved rheological properties for a particular use, such as a more balanced combination of viscosity, lubricity and fire retardant properties, in relation to the desired use, The hydraulic fluid composition may further comprise or consist of additional components, for example additional compounds and/or additives as described herein, in an amount by weight % in the total composition of less than about 50, 45, 40, 35, 30, 25, 20, 15, 10, or 5%. The hydraulic fluid composition may further comprise or consist of one or more additional components in an amount by weight % in the total composition of at least about 1, 2, 5, 10, 15, 20, 25, 30, 35, or 40%. The hydraulic fluid composition may further comprise or consist of one or more additional components in an amount by weight % in the total composition of a range of about 1% to 30%, about 3% to 25%, or about 5% to 20%. The amount and type of one or more additional components included in the hydraulic fluid can also be selected to provide improved rheological properties for a particular use or to add an additional property to the fluid or mitigate a property of the fluid.

The hydraulic fluid compositions may be formulated for use in aircraft, or formulated to provide certain properties or achieve certain specifications, for example formulated for SAE AS1241 specifications.

In one example, the hydraulic fluid compositions comprise polysiloxane compounds consisting of polysiloxane compounds according to any examples as described herein. For example, the hydraulic fluid compositions may be substantially free of any siloxane or polysiloxane compounds falling outside of those examples describing the polysiloxane compounds. It would be appreciated that the hydraulic fluid compositions for this particular example may include one or more other compounds and additives as described herein providing they were not selected from siloxanes or polysiloxanes.

Flash Point

The hydraulic fluid composition may have a flash point selected from at least 160° C., at least 170° C., at least 180° C., at least 190° C., at least 200° C., at least 210° C., at least 220° C., at least 230° C., at least 240° C., at least 250° C., at least 260° C., at least 270° C., at least 280° C., at least 290° C., or at least 300° C.

The hydraulic fluid composition may have a flash point between 160° C. and 300° C. The hydraulic fluid composition may have a flash point selected from between a range of about 180° C. and 290° C., about 200° C. and 280° C., about 210° C. and 270° C., about 220° C. and 260° C., or about 240° C. and 250° C.

The flash points may be determined using the protocol provided in ASTM D4206. The ASTM D4206 method involves using 2-4 ml volumes of the fluid composition with a Stanhope Seta Open Cup Apparatus.

The hydraulic fluid compositions according to at least some examples as described herein can have a flash point that meets SAE AS1241 specifications.

Fire Point

The hydraulic fluid composition may have a fire point selected from at least 160° C., at least 170° C., at least 180° C., at least 190° C., at least 200° C., at least 210° C., at least 220° C., at least 230° C., at least 240° C., at least 250° C., at least 260° C., at least 270° C., at least 280° C., at least 290° C., or at least 300° C.

The hydraulic fluid composition may have a fire point between about 160° C. and 300° C. The hydraulic fluid composition may have a fire point selected from between a range of about 180° C. and 290° C., about 200° C. and 280° C., about 210° C. and 270° C., about 220° C. and 260° C., or about 240° C. and 250° C.

The fire points may be determined using the protocol in ASTM D4206 or ASTM D92.

The hydraulic fluid compositions according to at least some examples as described herein can have a fire point that meets SAE AS1241 specifications.

Pour Point

The hydraulic fluid composition may have a pour point of less than 10° C., 20° C., 30° C., 40° C., 45° C., 50° C., 55° C., 60° C., 65° C., 70° C., or 75° C.

The pour point may be determined using the protocol in ASTM D97.

Density

The hydraulic fluid composition may have a density (at 298K) of less than about 1.5 g/cm$^3$. The hydraulic fluid composition may have a density of less than about 1.4 g/cm$^3$, about 1.3 g/cm$^3$, about 1.2 g/cm$^3$, about 1.1 g/cm$^3$, about 1.08 g/cm$^3$, about 1.06 g/cm$^3$, about 1.04 g/cm$^3$, about 1.02 g/cm$^3$, about 1.01 g/cm$^3$, or about 1.00 g/cm$^3$.

The hydraulic fluid compositions according to at least some examples as described herein can have a density that meets SAE AS1241 specifications.

Melting Point

The hydraulic fluid composition may have a melting point at atmospheric pressure of less than about 0° C. The hydraulic fluid composition may have a melting point selected from less than about −10° C., about −20° C., about −30° C., about −40° C., about −45° C., or about −50%.

The hydraulic fluid compositions according to at least some examples as described herein can have a melting point that meets SAE AS1241 specifications.

Viscosity

The hydraulic fluid composition may have a viscosity (at 100° F.) selected from between a range of about 5 and 15 cP, about 6 and 14 cP, about 7 and 13 cP, about 8 and 12 cP, or about 9 cP and 11 cP.

The hydraulic fluid composition may have a viscosity (at −65° F.) selected from between a range of about 500 and 3500 cP, about 1000 and 3000 cP, or about 1500 and 2500 cP.

The viscosity may be determined using the protocol in ASTM D445, and for example ASTM D445FL1 for low temperature measurements.

The hydraulic fluid compositions according to at least some examples as described herein can have a viscosity that meets SAE AS1241 specifications.

Paint Hardness

Paint hardness testing of a painted surface exposed to a hydraulic fluid can provide an indication for compatibility of the fluid with painted surfaces, since the hydraulic fluid may, in use, contact painted surfaces.

The hydraulic fluid composition may have a paint hardness (pencil push) after 28 days of exposure to the fluid at ambient temperature (about 20° C.) of at least 7B, 6B, 5B, 4B, 3B, or 2B.

The hydraulic fluid composition may have a paint hardness (pencil push) after 28 days of exposure to the fluid at about 60° C. of at least 7B, 6B, 5B, 4B, 3B, or 2B.

The hydraulic fluid composition may have a paint hardness (ultimate) after 28 days of exposure to the fluid at ambient temperature of at least 4B, 3B, 2B.1B, F, HB, 1H, 2H, 3H, 4H, 5H, or 6H.

The paint hardness may be determined using the protocol in ASTM D3363.

The hydraulic fluid compositions according to at least some examples as described herein can have a paint hardness property that meets SAE AS1241 specifications.

O-Ring Swell

O-ring swell testing by exposing O-rings to a hydraulic fluid can provide another indication for compatibility of the fluid with other materials, such as those used in aerospace industry, since the hydraulic fluid may, in use, come into contact with those types of materials.

The hydraulic fluid composition may have a reduction in volume of O-rings by less than 35%, 30%, 25%, 20%, 19%, 18%, 17%, 16%, 15%, 14%, 13%, 12%, 11%, or 10%, The hydraulic fluid composition may induce a reduction in volume of O-rings in a range of about 0-30%, about 2-25%, about 4-20%, or about 6-18%.

The O-ring swell test may be determined using the protocol in ASTM D6546. The test may be conducted using a Kapco or Parker O-ring.

The hydraulic fluid compositions according to at least some examples as described herein can have an O-ring swell test property that meets SAE AS1241 specifications.

Wick Cycle

The wick cycle test is used to determine the effect of evaporation on the flammability of hydraulic fluids. The test essentially measures the fire resistance of hydraulic fluids by cycling fluid soaked wicks (i.e., pipe cleaner stems) into a Bunsen burner flame. The number of cycles to ignition of the wick is counted. About 30 cycles per minute are run. Fluids are tested at ambient temperature. The hydraulic fluid samples are to resist ignition for a minimum number of cycles.

The hydraulic fluid compositions may have a wick test property where ignition of a wick does not occur for a minimum number of cycles of at least 25, at least 50, at least 75, at least 100, at least 150, at least 200, at least 250, or at least 300.

The wick cycle may be determined using the protocol in ASTM D4172,

The hydraulic fluid compositions according to at least some examples as described herein can have a wick cycle test property that meets SAE AS1241 specifications.

Toxicity and Environmental Impact

The fluid composition s can be selected to provide low toxicological or environmental impact, for example lower toxicological properties relative to Skydrol® brand fire-resistant hydraulic fluids. The polysiloxanes as described herein are substantially non-toxic and particularly in relation to the use of fluorinated surfactants or monophosphate esters, such as those used in Skydrol® LD4 (a phosphate ester based hydraulic fluid) and Skydrol® 5 (a phosphate ester based hydraulic fluid containing a perfluorinated surfactant as an anti-erosion additive). The diphosphonates as described herein can also provide relatively low toxicological properties, particularly in relation to the use of fluorinated surfactants or monophosphate esters such as those used in Skydrol® 5. In one example, the hydraulic compositions may be substantially free of at least one of monophosphate esters and fluorinated surfactants. In another example, the hydraulic compositions may be substantially free of fluorinated surfactants, such as perfluorinated acids (e.g. PFOS).

Reaction Product

There may be provided a hydraulic fluid composition comprising a polysiloxane compound that is a reaction product of one or more cyclosiloxanes and a hydrogen terminated siloxane, wherein the reaction product is further capped with an alkyl, aryl or alkylaryl group. The alkyl, aryl or alkylaryl group may be provided by any one or more examples thereof as described herein, for example the alkyl group may be a $C_{1-10}$alkyl.

In another example, there is provided a hydraulic fluid composition comprising a polysiloxane compound that is a reaction product of a substituted cyclosiloxane of Formula A and siloxane of Formula B optionally capped with an alkyl, aryl or alkylaryl group:

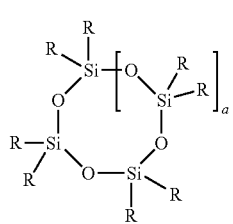

Formula A

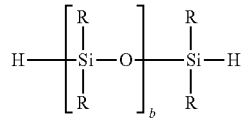

Formula B wherein each R is independently selected from hydrogen, $C_{1-10}$alkyl, aryl and $C_{1-10}$alkylaryl; a is an integer selected from 0 to 20; and b is an integer selected from 1 to 15. Other examples may also be provided where Formula A and B are as described below for any one or more examples thereof.

Polysiloxane Compounds

The hydraulic fluid composition of the present disclosure comprises a polysiloxane compound. The polysiloxane compound may be described according to the following chemical structure of Formula 1:

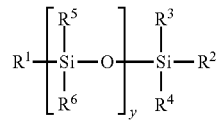

Formula 1

For the above Formula 1, y may be an integer selected from 1 to 40. $R^1$, $R^2$, $R^3$, and $R^4$, may be each independently selected from $C_{1-10}$alkyl, aryl, and $C_{1-10}$alkylaryl. Each $R^5$ and each $R^6$ may be independently selected from $C_{1-10}$alkyl, aryl, and $C_{1-10}$alkylaryl. It will be appreciated that when y is greater than 1 each $R^5$ and each $R^6$ may be independently selected from $C_{1-10}$alkyl, aryl, and $C_{1-10}$alkylaryl, for example one $R^5$ group may be a $C_{1-10}$alkyl and another $R^5$ group may be a $C_{1-10}$alkylaryl.

For the above Formula 1, y may be selected from any integer or range of integers between 1 and 40. The term y may be an integer selected from 1 to 35, 2 to 30, 3 to 25, 4 to 20, or 5 to 15, for example. The integer y may be an integer of at least 2, 4, 6, 8, 10, or 12, for example. The integer y may be an integer of equal to, or less than, 36, 34, 32, 30, 28, 26, 24, 22, 20, 18, 16, 14, 12, 10, or 8.

In another example, at least one of $R^1$ to $R^4$, or at least one $R^5$ and $R^6$ from at least one of the y groups, is selected from at least one of aryl and $C_{1-10}$alkylaryl. In another example, at least one of $R^1$ and $R^2$ is selected from aryl and $C_{1-10}$alkylaryl. In another example, $R^1$ and $R^2$ are each independently selected from aryl and $C_{1-10}$alkylaryl. In another example, y is an integer selected from 2 to 25.

The above polysiloxane compounds of Formula 1 may be further described by the following polysiloxane compounds of Formula 1a:

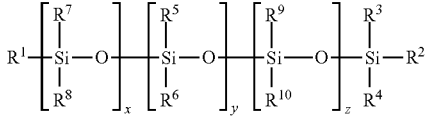

Formula 1a

For the above Formula 1a, x may be an integer selected from 0 to 10. The term y may be an integer selected from 1 to 20. The term z may be an integer selected from 0 to 10. $R^1$, $R^2$, $R^3$, and $R^4$, may be each independently selected from $C_{1-10}$alkyl, aryl, and $C_{1-10}$alkylaryl. Each $R^5$ and $R^6$ may be independently selected from $C_{1-10}$alkyl, aryl, and $C_{1-10}$alkylaryl. Each $R^7$, $R^8$, $R^9$, and $R^{10}$, may be independently selected from $C_{1-10}$alkyl. For the above Formula 1a, each $R^7$, $R^8$, $R^9$, and $R^{10}$, may be methyl and x and z may be integers each independently selected from 1 to 3.

For the above Formula 1a, y may be selected from any integer or range of integers between 1 and 20. The term y may be an integer selected from 1 to 18, 2 to 16, 3 to 14, 4 to 12, or 5 to 11, for example. The integer y may be an integer of at least 1, 2, 3, 4, 5, 6, 7, 8, 9, or 10. The integer y may be an integer of equal to, or less than, 19, 18, 17, 16, 15, 14, 13, 12, 11, 10, 9, 8, 7, 6, 5, or 4.

For the above Formula 1a, x may be selected from any integer or range of integers between 1 and 10. The term x may be an integer selected from 1 to 9, 2 to 8, 3 to 7, or 4 to 6, for example. The integer x may be an integer of at least 1, 2, 3, 4, 5, 6, 7, or 8. The integer x may be an integer of equal to, or less than, 9, 8, 7, 6, 5, 4, 3, or 2.

For the above Formula 1a, z may be selected from any integer or range of integers between 0 and 10. The reference to an integer of zero will be understood to be the absence of the group. The term z may be an integer selected from 1 to 9, 2 to 8, 3 to 7, or 4 to 6, for example. The integer z may be an integer of at least 1, 2, 3, 4, 5, 6, 7, or 8. The integer x may be an integer of equal to, or less than, 9, 8, 7, 6, 5, 4, 3, or 2.

For the above Formula 1a, the sum total of x, y and z integers, may be selected from any integer or range of integers between 2 and 40. The sum of x, y and z integers, may be an integer selected from 1 to 20, 2 to 16, 3 to 14, or 4 to 12. The sum of x, y and z integers, may be an integer of at least 2, 3, 4, 5, 6, 7, 8, 9, 10, 11, or 12. The sum of x, y and z integers, may be an integer of equal to, or less than, 18, 16, 14, 12, 10, or 8.

$R^1$ to $R^{10}$ Groups

The $R^1$ to $R^{10}$ groups for the above polysiloxane compounds of Formula 1 and Formula 1a may be further described as follows.

$R^1$ to $R^{10}$ may each be independently selected from $C_{1-10}$alkyl, aryl, and $C_{1-10}$alkylaryl. The $R^1$ to $R^{10}$ groups may also be selected to provide the polysiloxane compounds of Formula 1 and Formula 1a with a number, or mol %, of aryl and $C_{1-10}$alkylaryl groups. For example, the polysiloxane compounds may contain between 1 and 10 substituents selected from aryl and $C_{1-10}$alkylaryl groups, where the remainder of the substituents are $C_{1-10}$alkyl groups. The polysiloxane compounds may contain between 1 and 6, or 2 and 4, substituents selected from aryl and $C_{1-10}$alkylaryl groups, where the remainder of the substituents are $C_{1-10}$alkyl groups. The remainder of the $C_{1-10}$alkyl substituents groups may be methyl.

The number of aryl or alkylaryl substituents in the polysiloxane compound may provide a mol % of the aryl moiety in the polysiloxane compound of between 2 and 50 mol %, 5 to 45 mol %, 10 to 40 mol %, 15 to 35 mol %, or 20 to 30 mol %, relative to silicon. For example, where the aryl or arylalkyl groups contain a phenyl moiety, then the number of phenyl substituents in the polysiloxane compound may provide a mol % of phenyl in the siloxane compound of between 2 and 50 mol %, 5 to 45 mol %, 10 and 40 mol %, 15 and 35 mol %, or 20 to 30 mol %.

$R^1$ and $R^2$ may be each independently selected from aryl and $C_{1-10}$alkylaryl. $R^1$ and $R^2$ may be independently selected from a $C_{1-10}$alkylaryl. The aryl or $C_{1-10}$alkylaryl may be a mono or bicyclic aryl. The monocyclic aryl may be phenyl or the monocyclic alkylaryl may be a $C_{1-10}$alkylphenyl. The $C_{1-10}$alkylaryl may be a $C_{1-6}$alkylphenyl. The $C_{1-6}$alkylphenyl may be phenethyl.

For Formula 1a, $R^1$ and $R^2$ may be each independently selected from $C_{1-10}$alkyl, aryl and $C_{1-10}$alkylaryl; each $R^3$, $R^4$, $R^5$, $R^7$, $R^8$, $R^9$, and $R^{10}$, may be $C_{1-4}$alkyl; and each $R^6$ and y may be selected to provide the polysiloxane compound of Formula 1a with between 1 to 10 optional substituents independently selected from aryl and $C_{1-10}$alkylaryl and any other substituents for each $R^6$ is independently selected from $C_{1-4}$alkyl. The optional substituents independently selected from aryl and $C_{1-10}$alkylaryl may be selected to provide 1 to 6 substituents, or 2 to 4 substituents.

For Formula 1, each $R^3$, $R^4$, and $R^5$, may be selected from $C_{1-10}$alkyl, and each $R^6$ may be independently selected from $C_{1-10}$alkyl, aryl and $C_{1-10}$alkylaryl. Each $R^3$, $R^4$, and $R^5$, may be selected from methyl, and each $R^6$ may be independently selected from methyl, aryl and $C_{1-10}$alkylaryl. $R^1$ and $R^2$ may be each independently selected from aryl and $C_{1-10}$alkylaryl. $R^1$ and $R^2$ may be independently selected from a $C_{1-10}$alkylaryl. The aryl or $C_{1-10}$alkylaryl may be a mono or bicyclic aryl. The monocyclic aryl may be phenyl or the monocyclic alkylaryl may be a $C_{1-10}$alkylphenyl. The $C_{1-10}$alkylaryl may be a $C_{1-6}$alkylphenyl. The $C_{1-6}$alkylphenyl may be phenethyl.

For Formula 1a, each $R^3$, $R^4$, $R^5$, $R^7$, $R^8$, $R^9$, and $R^{10}$, may be selected from $C_{1-10}$alkyl, and each $R^6$ may be independently selected from $C_{1-10}$alkyl, aryl and $C_{1-10}$alkylaryl. Each $R^3$, $R^4$, $R^5$, $R^7$, $R^8$, $R^9$, and $R^{10}$, may be selected from methyl, and each $R^6$ may be independently selected from methyl, aryl and $C_{1-10}$alkylaryl. $R^1$ and $R^2$ may be each independently selected from aryl and $C_{1-10}$alkylaryl. $R^1$ and $R^2$ may be independently selected from a $C_{1-10}$alkylaryl. The aryl or $C_{1-10}$alkylaryl may be a mono or bicyclic aryl. The monocyclic aryl may be phenyl or monocyclic alkylaryl may be a $C_{1-10}$alkylphenyl. The $C_{1-10}$alkylaryl may be a $C_{1-6}$alkylphenyl. The $C_{1-6}$alkylphenyl may be phenethyl, which may also be referred to herein as ethyl benzene or EB.

In another example, at least one of $R^1$ to $R^4$, or at least one $R^5$ and $R^6$ from at least one of the y groups, is selected from at least one of aryl and $C_{1-10}$alkylaryl. In another example, at least one of $R^1$ to $R^4$, or at least one of $R^5$ to $R^{10}$ from at least one of the x, y or z groups, is selected from aryl and $C_{1-10}$alkylaryl. In another example, at least one of $R^1$ and $R^2$ is selected from aryl and $C_{1-10}$alkylaryl. In another example, $R^1$ and $R^2$ are each independently selected from aryl and $C_{1-10}$alkylaryl. In another example, the sum of x, y and z, is between 2 and 25, and at least one of $R^1$ to $R^4$ is selected from aryl and $C_{1-10}$alkylaryl.

The polysiloxane compounds as described herein can provide suitable properties for use as hydraulic fluids, such as low density and rheological properties, for example effective combination of viscosity and lubricity, in relation to a desired use. The polysiloxanes at least according to some examples described herein can also provide relatively safe, low toxicological properties, and easy to handle compounds, at least relative to Skydrol® brand fire-resistant hydraulic fluids (e.g. Skydrol® 5).

Polysiloxane Dispersity

The polysiloxanes may be provided as a mixture of polysiloxane compounds as described herein. The composition and constituency of the mixture of polysiloxane compounds may also be described by its dispersity value (also referred to as Polydispersity Index—PDI), which provides an indication of the distribution of various polysiloxane compounds in the composition and can be measured by determining and dividing the weight average molecular mass by the number average molecular mass. It will be appreciated that the weight average molecular mass and number average molecular mass can be determined from a sample mixture of polysiloxanes by various chromatographic or spectrometric methods, such as HPLC or NMR methods.

The weight average molecular mass of the polysiloxane compounds may be provided in a range of about 300 to 5000, 400 to 4500, 500 to 4000, 600 to 3500, 800 to 3000, or 1000 to 2500. The weight average molecular mass of the polysiloxane compounds may be at least about 300, 500, 700, 1000, 1500, 2000, 2500, 3000, 3500, 4000, or 4500. The weight average molecular mass of the polysiloxane compounds may be less than about 5000, 4500, 4000, 3500, 3000, 2500, 2000, 1500, 1000, 700, or 500. The weight average molecular mass may be provided at a range between any two of these upper and lower limits as hereinbefore described.

The number average molecular mass of the polysiloxane compounds may be provided in a range of about 300 to 3000, 400 to 2000, 500 to 1500, 600 to 1000, or 800 to 900. The number average molecular mass of the polysiloxane compounds may be at least about 400, 500, 600, 700, 800, 900, 1000, 1500, 2000, or 2500. The number average molecular mass of the polysiloxane compounds may be less than about 3000, 2500, 2000, 1500, 1000, 900, 800, 700, 600, or 500. The number average molecular mass may be provided at a range between any two of these upper and lower limits as hereinbefore described.

The dispersity of the polysiloxane compounds in the composition may be provided in a range of about 1 to 20, 1 to 15, 1 to 10, 1 to 5, or 1 to 3. The dispersity of the polysiloxane compounds in the composition may be less than about 20, 19, 18, 17, 16, 15, 13, 14, 13, 12, 11, 10, 9, 8, 7, 6, 5, 4, 3, 2, or 1.5. The dispersity of the polysiloxane compounds in the composition may be at least about 1.5, 2, 3, 4, 5, 6, 7, 8, 9, 10, 11, 12, 13, 14, or 15. The dispersity of the polysiloxane compounds in the composition may be provided at a range between any two of these upper and lower limits as hereinbefore described.

The polysiloxane compound of Formula 1 may be provided by a mixture of two or more polysiloxane compounds of Formula 1. For example, the polysiloxane mixture may be provided by at least 3, 4, 5, 6, 7, 8, 9, 10, 11, 12, 13, 14, 15, 16, 17, 18, or 19 different polysiloxane compounds of Formula 1. The polysiloxane mixture may comprise polysiloxane compounds of Formula 1 having a y value or an average number of siloxane repeat units (Si—O) selected from 9 to 12. In another example, the polysiloxane mixture may comprise polysiloxane compounds having a y value or average number of siloxane repeat units (Si—O) selected from 8 to 13, 7 to 15, 6 to 17, 5 to 19, 4 to 21, or 3 to 23. The average number may be a mean, mode or medium based average, for example based on the mixture of polysiloxane compounds of Formula 1 relative to the y value or siloxane repeat units as hereinbefore described. The polysiloxane mixture may comprise a series of different polysiloxane compounds of Formula 1 each having a different y value or a number of siloxane repeat units (Si—O) selected from and including each integer from 9 to 12. In another example, the polysiloxane mixture may comprise a series of different polysiloxane compounds of Formula 1 each having a different y value or a number of siloxane repeat units (Si—O) selected from and including each integer from 8 to 13, 7 to 15, 6 to 17, 5 to 19, 4 to 21, or 3 to 23. In another example, the polysiloxane mixture may comprise at least four polysiloxane compounds each having a different number of siloxane repeat units (Si—O) selected from 9 to 12 repeat units, at least six polysiloxane compounds each having a different number of siloxane repeat units (Si—O) selected from 8 to 13 repeat units, at least eight polysiloxane compounds each having a different number of siloxane repeat units (Si—O) selected from 7 to 14 repeat units, at least ten polysiloxane compounds each having a different number of siloxane repeat units (Si—O) selected from 6 to 15 repeat units, at least twelve polysiloxane compounds each having a different number of siloxane repeat units (Si—O) selected from 5 to 16 repeat units, or at least fourteen polysiloxane compounds each having a different number of siloxane repeat units (Si—O) selected from 4 to 17 repeat units. It will be appreciated that there may be provided a formulation or hydraulic fluid composition comprising the mixture of polysiloxane compounds according to any one or more of the examples as described above.

The polysiloxane compounds and mixtures of the polysiloxane compounds, according to at least some examples as described below can provide further advantages, for example improved miscibility with other compounds and fluids, fire and flash points, rheological properties, and compatibility with materials including diphosphonates, for example, Synthesis of Polysiloxane Compounds The polysiloxanes as herein described may be prepared by using a ring opening polymerisation reaction of various cyclosiloxanes, for example a cationic ring opening polymerisation (CROP) reaction. The CROP reaction may initiated by using a cationic initiator in the presence of a hydrogen terminated siloxane. The CROP reaction and selection of reagents enables a relatively controlled synthesis and polymerisation reaction for obtaining the polysiloxanes as described herein, for example low weight polysiloxanes or mixtures of low weight polysiloxanes, such as polysiloxanes having siloxane repeat units or polydispersities as described above. This provides a process for preparing the polysiloxane compounds as described in the present disclosure, which have shown to provide surprisingly effective properties for use as more user friendly hydraulic fluids.

It will be appreciated that the cationic initiator provides acidolysis and condensation of the cyclosiloxanes, and propagation into various hydrogen terminated polysiloxanes. The hydrogen terminated polysiloxanes, which may also be provided with hydrogen groups along the siloxane chain, can then be replaced or "capped" with various alkyl, aryl and alkylaryl groups. For example, the hydrogen terminated polysiloxanes can be endcapped in the presence of a catalyst with various alkyl, aryl and alkylaryl groups, by reaction with vinyl equivalents of those groups.

The cationic initiator may be selected from acids with a non-nucleophilic base, or protic cationic acids such as $H_2SO_4$, $HClO_4$ and $CF_3SO_3H$ (trifluorosulphonic acid), or Lewis cationic acids such as $AlCl_3$ and $SnCl_4$. In one example, the cationic initiator is $CF_3SO_3H$. The catalyst may be a platinum or organoplatinum compound, such as Karstedt's catalyst.

In one example, there is provided a process for preparing the polysiloxane compounds as described herein comprising the steps of: reacting a cyclosiloxane in the presence of cationic initiator and a hydrogen terminated siloxane to form a hydrogen terminated polysiloxane; and reacting the hydrogen terminated polysiloxane in the presence of a catalyst and vinyl alkyl, aryl or arylalkyl group, to form the polysiloxane compounds.

In another example, there is provided a process for preparing a polysiloxane compound of Formula 1:

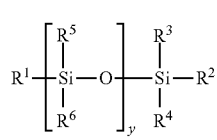

Formula 1 wherein y is an integer selected from 1 to 40;

$R^1$, $R^2$, $R^3$, and $R^4$, are each independently selected from $C_{1-10}$alkyl, aryl, and $C_{1-10}$alkylaryl; and Each $R^5$ and $R^6$ is independently selected from $C_{1-10}$alkyl, aryl, and $C_{1-10}$alkylaryl;

comprising:

(a) reacting a solution comprising a substituted cyclosiloxane of Formula A with a cationic initiator in the presence of a siloxane of Formula B to form a hydrogen terminated polysiloxane of Formula C:

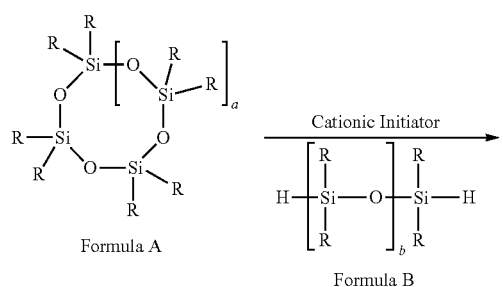

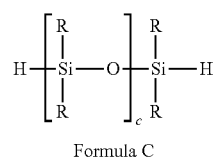

Formula C wherein each R is independently selected from hydrogen, $C_{1-10}$alkyl, aryl, and $C_{1-10}$alkylaryl;

a is an integer selected from 0 to 20;

b is an integer selected from 1 to 15;

c is an integer selected from 1 to 40;

(b) reacting a solution comprising the polysiloxane of Formula C with at least one of an alkyl, aryl and alkylaryl group, or reactive precursor thereof, to form the polysiloxane of Formula 1.

It will be appreciated that further examples for Formulae A, B and C, may be provided by any one or more examples as described herein for various polysiloxanes of Formula 1.

For the reaction step (a) there may be also provided a neutralisation step following desired propagation of the polysiloxanes of Formula C, such as by completing the reaction step by neutralising any acid present with base The cyclosiloxane of Formula A may be a cyclosiloxane of Formula $A_1$ or $A_2$:

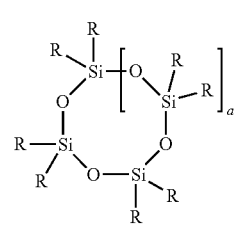

Formula $A_1$

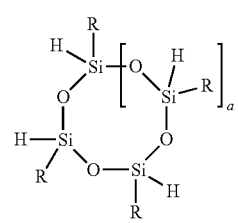

Formula $A_2$ wherein a is an integer selected from 0 to 20;

Each R is independently selected from $C_{1-10}$alkyl, aryl, and $C_{1-10}$alkylaryl.

The cyclosiloxane of Formula A may be provided by a mixture of cyclosiloxanes of Formula $A_1$ or $A_2$. For example, step (a) of the process may comprise a cyclosiloxane mixture providing a cyclosiloxane of Formula $A_1$ and a cyclosiloxane of Formula $A_2$. For example, the cyclosiloxane of Formula $A_1$ may be octamethylcyclosiloxane, and the cyclosiloxane of Formula $A_2$ may be tetramethylcyclosiloxane. The ratio of Formula $A_1$ and $A_2$ may be varied depending on the number of vinyl groups desired to replace hydrogens in the siloxane chain. The ratio of Formula $A_1$ and $A_2$ may be 1:1.

The siloxane of Formula B as described above may be provided wherein each R is independently selected from $C_{1-10}$alkyl, aryl, and $C_{1-10}$alkylaryl. The siloxane of Formula B may be provided wherein each R is independently selected from $C_{1-10}$alkyl, such as methyl. In an example, b is an integer selected from 1 to 10. For example, the siloxane of Formula B may be tetramethyldisiloxane (TMDS).

The siloxane compound of Formula C may be represented by a siloxane of Formula $C_1$:

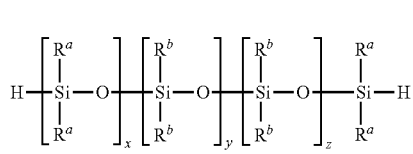

Formula $C_1$ wherein x is an integer selected from 0 to 10;

y is an integer selected from 1 to 20;

z is an integer selected from 0 to 10;

Each $R^a$ is independently selected from $C_{1-10}$alkyl; and

Each $R^b$ is independently selected from $C_{1-10}$alkyl, aryl, and $C_{1-10}$alkylaryl;

In another example for Formula $C_1$: each $R^a$ is methyl; each $R^b$ is independently selected from $C_{1-10}$alkyl, aryl, and $C_{1-10}$alkylaryl; x and z are each integers independently selected from 1 to 3; and y is an integer selected from 2 to 16 or the sum of x, y and z, is an integer selected from 2 to 16.

The ratio may be varied between the cyclosiloxane of Formula A and siloxane of Formula B. It will be appreciated that the variation in such ratio provides an option in which to modify the polysiloxane chain lengths. For example the ratio between the siloxane of Formula B and cyclosiloxane of Formula A may be provided at least about 1:1, respectively, for example between about 1:1 to 1:10 or 1:1 to 1:5. For example, the ratio of the siloxane of Formula B and cyclosiloxane of Formula A in step (a) may be provided at or between any one or more of 1:2, 1:3, 1:4, 1:5, 1:6, 1:7, or 1:8, respectively.

The reaction in step (b) above may be a reaction comprising a catalyst and vinyl group. The reaction may be a hydrosilylation reaction, for example using Karstead's catalyst. The alkyl, aryl and alkylaryl groups may be provided as a vinyl group, such as a vinylated precursor to provide the $C_{1-10}$alkyl, aryl, and $C_{1-10}$alkylaryl group, for example an alkenyl or alkenylaryl group. The $C_{1-10}$alkyl, aryl, and $C_{1-10}$alkylaryl groups may cap one or more of the hydrogen groups present on the siloxane. The siloxane compound of Formula C may provide one or both ends with a hydrogen group, which may be "end capped" by the $C_{1-10}$alky, aryl, or $C_{1-10}$alkylaryl groups, for example end capped with ethylbenzene. The ratio of siloxanes of Formula C to vinyl groups may be at least equivalent to the number of desired $C_{1-10}$alkyl, aryl, or $C_{1-10}$alkylaryl groups. The ratio of siloxanes of Formula C to vinyl groups for step (b) may be provided at least about 1:1, respectively, for example between about 1:1 to 1:10 or 1:1 to 1:5. For example, the ratio of the siloxane of Formula C and vinyl groups in step (b) may be provided at or between any one or more of 1:2, 1:3, 1:4, 1:5, 1:6, 1:7, or 1:8, respectively.

Diphosphonate Compounds

The hydraulic fluid composition of the present disclosure may comprise one or more diphosphonate compounds. In one example, the diphosphonate compounds have a hydrocarbon chain linking the phosphonate groups. The hydrocarbon chain may be optionally interrupted with an aryl group, for example a benzyl group. The hydrocarbon chain may be an alkyl group as described herein.

The one or more diphosphonate compounds may be represented by a compound of Formula 2:

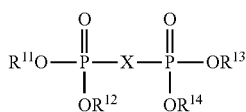

Formula 2

The diphosphonate compounds of Formula 2 are further described as follows. X may be selected from a group consisting of an aryl, $C_{1-20}$alkyl, $C_{1-20}$alkylaryl, and $C_{1-20}$dialkylaryl. X may be selected from a group consisting of a $C_{1-20}$alkyl and $C_{1-20}$dialkylaryl group. The $C_{1-20}$dialkylaryl group may be a $C_{1-20}$dialkylphenyl. The $C_{1-20}$dialkylaryl may be a $C_{1-10}$dialkylphenyl, for example a 1,4-dimethylenylbenezene.

$R^{11}$, $R^{12}$, $R^3$, and $R^{14}$, may each be independently selected from $C_{1-20}$alkyl, aryl, and $C_{1-20}$alkylaryl. $R^{11}$, $R^{12}$, $R^{13}$, and $R^{14}$, may each be independently selected from $C_{1-20}$alkyl and $C_{1-20}$alkylaryl. $R^{11}$, $R^{12}$, $R^{13}$, and $R^{14}$, may each be independently selected from $C_{1-10}$alkyl and $C_{1-10}$alkylaryl. $R^{11}$, $R^{12}$, $R^3$, and $R^{14}$, may each be independently selected from $C_{2-10}$alkyl or $C_{2-6}$alkyl.

The one or more diphosphonate compounds may be represented by a compound of Formula 2(a):

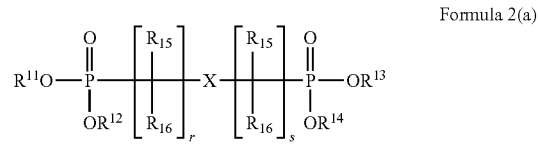

Formula 2(a)

The diphosphonate compounds of Formula 2(a) can be further described as follows.

$R^{11}$, $R^{12}$, $R^{13}$, and $R^{14}$, may be provided by any examples thereof as previously described above.

X may be absent or an aryl, for example a benzene group.

Each of the terms r and s may be an integer selected from 0 to 10, providing r is at least 1 when s is 0 and X is absent. Each of the terms r and s may be an integer selected from 1 to 10. The terms r and s may be integers independently selected from 1 to 9, 1 to 6, or 2 to 4, for example. Each independent term r and s may be at least 1, 2, 3, 4, 5, 6, 7, or 8. Each independent term r and s may be equal to, or less than, 9, 8, 7, 6, 5, 4, 3, or 2.

Each $R^{15}$ and each $R^{16}$ may be independently selected from hydrogen, $C_{1-20}$alkyl, aryl, and $C_{1-20}$alkylaryl. Each $R^{15}$ and each $R^{16}$ may be independently selected from hydrogen, $C_{1-10}$alkyl, aryl, and $C_{1-10}$alkylaryl. Each $R^{15}$ and each $R^{16}$ may be independently selected from hydrogen, $C_{1-10}$alkyl, and $C_{1-10}$alkylaryl. Each $R^{15}$ and each $R^{16}$ may be independently selected from hydrogen and $C_{1-10}$alkyl. Each $R^{15}$ and each $R^{16}$ may be independently selected from hydrogen and methyl. Each $R^{15}$ and each $R^{16}$ may be hydrogen.

The diphosphonate compounds may be represented by a compound of Formula 2a(i):

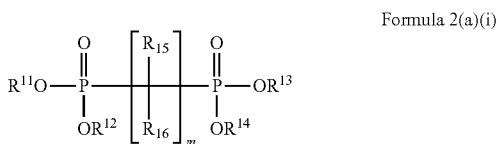

Formula 2(a)(i)

The diphosphonate compounds of Formula 2(a)(i) may be further described as follows.

The term m may be an integer selected from 1 to 10. The term m may be selected from any integer or range of integers between 1 and 10. The term m may be an integer selected from 1 to 9, 1 to 6, or 2 to 4, for example. The integer m may be an integer of at least 1, 2, 3, 4, 5, 6, 7, or 8. The integer m may be an integer of equal to, or less than, 9, 8, 7, 6, 5, 4, 3, or 2.

$R^{11}$, $R^{12}$, $R^{13}$, and $R^{14}$, may each be independently selected from $C_{1-20}$alkyl, aryl, and $C_{1-20}$alkylaryl. $R^{11}$, $R^{12}$, $R^{13}$, and $R^{14}$, may each be independently selected from $C_{1-20}$alkyl and $C_{1-20}$alkylaryl. $R^{11}$, $R^{12}$, $R^{13}$, and $R^{14}$, may each be independently selected from $C_{1-10}$alkyl and $C_{1-10}$alkylaryl. $R^{11}$, $R^{12}$, $R^3$, and $R^{14}$, may each be independently selected from $C_{2-10}$alkyl or $C_{2-6}$alkyl.

Each $R^{15}$ and $R^{16}$ may be independently selected from hydrogen, $C_{1-20}$alkyl, aryl, and $C_{1-20}$alkylaryl. Each $R^{15}$ and $R^{16}$ may be independently selected from hydrogen, $C_{1-10}$alkyl, aryl, and $C_{1-10}$alkylaryl. Each $R^{15}$ and $R^{16}$ may be independently selected from hydrogen, $C_{1-10}$alkyl, and $C_{1-10}$alkylaryl. Each $R^{15}$ and $R^{16}$ may be independently selected from hydrogen and $C_{1-10}$alkyl. Each $R^{15}$ and $R^{16}$ may be independently selected from hydrogen and methyl. Each $R^{15}$ and $R^{16}$ may be hydrogen.

The diphosphonate compounds as described herein can provide suitable properties for use as hydraulic fluids when mixed with the polysiloxane compounds as described herein. For example the diphosphonate compounds can provide a fire retardant property to the fluid, or provide a suitable density (e.g. weight) and rheological properties, for example an effective combination of fire retardant and lubricity to the fluid, in relation to a desired use.

It will be also appreciated that all formulae and compound structures of the present disclosure as described herein, which includes polysiloxane or diphosphonate compounds, can encompass any stereoisomers thereof, including any geometric isomers (e.g. cis/trans or E/Z isomerism). For example, any formulae or compound structures of the present disclosure include all cis and trans isomers as well as any mixtures thereof.

Example Compounds

Some examples of polysiloxane compounds of Formula 1 are provided in Table 1 as follows:

TABLE 1

Compounds of Formula 1

| Chemical Structure | Substituents | Ref. |
|---|---|---|
| | $R^1$ to $R^6$ are methyl, y is 8 | D9 Polydimethyl Siloxane |
| | $R^1$ to $R^6$ are methyl, y is 16 | PDMS-16 Polydimethyl Siloxane |
| | $R^1$ to $R^6$ are ethyl, y is 5 | PDES-6 Polydiethyl Siloxane |
| | $R^1$ to $R^6$ are ethyl, y is 8 | PDES-9 Polydiethyl Siloxane |
| | $R^1$ to $R^6$ are ethyl, y is 11 | PDES-12 Polydiethyl Siloxane |
| | $R^1$ to $R^6$ are n-propyl, y is 7 | PDPS-8 PolyDiPropyl Siloxane |

TABLE 1-continued

Compounds of Formula 1

| Chemical Structure | Substituents | Ref. |
|---|---|---|
| (structure) | $R^1$ to $R^6$ are n-butyl; y is 5 | PDBS-6 PolyDiButyl Siloxane |
| (structure) | $R^1$ to $R^6$ are n-butyl; y is 7 | PDBS-8 PolyDiButyl Siloxane |
| (structure) | $R^1$ to $R^4$ are methyl; $2 \times R^5$ are phenyl and remaining $R^5$ are methyl; $R^6$ are methyl; y is 15 | D16(2Ph) Phenylmethyl Siloxane-dimethyl Siloxane |
| (structure) | $R^1$ to $R^4$ is methyl; $4 \times R^5$ are phenyl and remaining $R^5$ are methyl; $R^6$ are methyl; y is 15 | D16(4Ph) Phenylmethyl Siloxane-dimethyl Siloxane |

TABLE 1-continued

Compounds of Formula 1

| Chemical Structure | Substituents | Ref. |
|---|---|---|
| 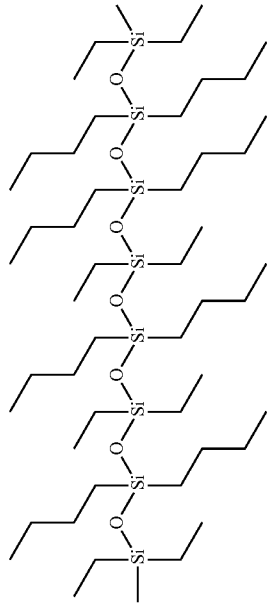 | $R^1$ to $R^4$ are methyl and ethyl<br>$R^5$ and $R^6$ are ethyl and butyl<br>y is 7 | P(DE-co-DB)S-8 Alkylated Siloxane |
| 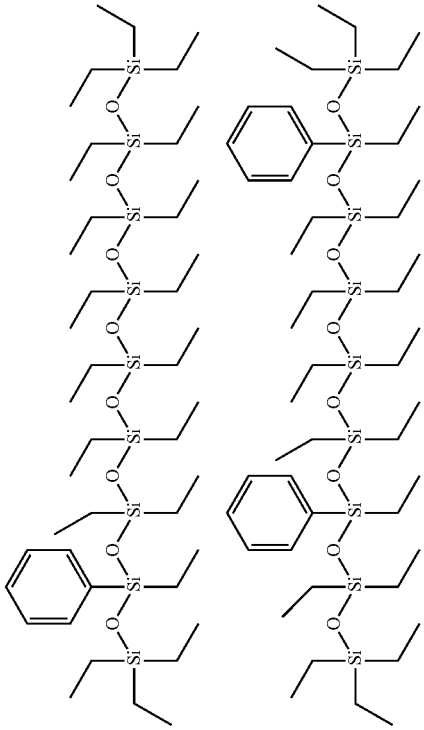 | $R^1$ to $R^4$ are ethyl<br>1 × $R^5$ is phenyl and remaining $R^5$ are ethyl<br>$R^6$ are ethyl<br>y is 8 | P(dE-co-PM)S-9-1\ Ethylphenyl Siloxane |
| | $R^1$ to $R^4$ are ethyl<br>2 × $R^5$ are phenyl and remaining $R^5$ are ethyl<br>$R^6$ are ethyl<br>y is 8 | P(dE-co-PM)S-9-2 Ethylphenyl Siloxane |
| 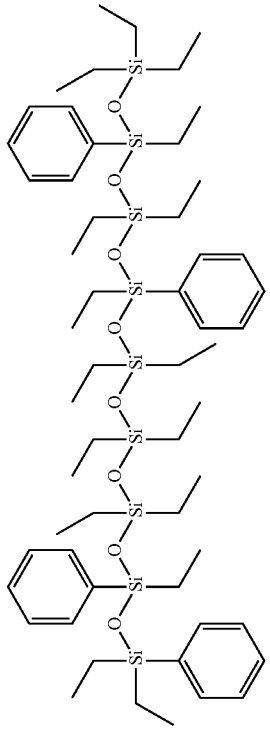 | $R^1$ to $R^4$ are ethyl<br>4 × $R^5$ are phenyl and remaining $R^5$ are ethyl<br>$R^6$ are ethyl<br>y is 8 | P(dE-co-PM)S-9-4 Ethylphenyl Siloxane |

TABLE 1-continued

Compounds of Formula 1

| Chemical Structure | Substituents | Ref. |
|---|---|---|
| | $R^1$ and $R^2$ are phenethyl $R^3$, $R^4$, $R^5$ and $R^6$ are methyl y is 7 | EB-D8-EB |
| | $R^1$ and $R^2$ are phenethyl $R^3$ and $R^4$ are methyl Each $R^5$ and $R^6$ is methyl or phenethyl y is 11 | EB-D12(EB)-EB |
| | $R^1$ and $R^2$ are phenethyl $R^3$ and $R^4$ are methyl Each $R^5$ and $R^6$ is methyl or phenyl y is 11 | EB-D12(Ph2)-EB |

TABLE 1-continued

Compounds of Formula 1

| Chemical Structure | Substituents | Ref. |
|---|---|---|
| (structure) | $R^1$ and $R^2$ are phenethyl<br>$R^3$ and $R^4$ are methyl<br>Each $R^5$ and $R^6$ is methyl or phenethyl<br>y is 11 | EB-D12(EB2)-EB |
| (structure) | $R^1$ and $R^2$ are phenethyl<br>$R^3$ and $R^4$ are methyl<br>Each $R^5$ and $R^6$ is methyl or phenyl<br>y is 11 | EB-D12(Ph)-EB |
| (structure) | $R^1$ and $R^2$ are phenethyl<br>$R^3$ and $R^4$ are methyl<br>Each $R^5$ and $R^6$ is methyl or phenyl<br>y is 15 | EB-D16(Ph2)-EB |

TABLE 1-continued

Compounds of Formula 1

| Chemical Structure | Substituents | Ref. |
|---|---|---|
| | $R^1$ and $R^2$ are phenethyl<br>$R^3$ and $R^4$ are methyl<br>Each $R^5$ and $R^6$ is methyl or phenethyl<br>y is 15 | EB-D16(EB2)-EB |
| | $R^1$ and $R^2$ are methyl<br>$R^3$ and $R^4$ are phenyl<br>Each $R^5$ and $R^6$ is methyl or phenyl<br>y is 7 | Ph2-D8-Ph2 |
| | $R^1$ and $R^2$ are phenyl<br>$R^3$ and $R^4$ is phenyl or methyl<br>Each $R^5$ and $R^6$ is methyl or phenyl<br>y is 15 | Ph2-D16-Ph2 |

Some examples of diphosphonate compounds of Formula 2 are provided in Table 2 as follows:

TABLE 2

| Compounds of Formula 2 | | |
| --- | --- | --- |
| Chemical Structure | Substituents | Chemical Name |
| (structure) | m = 3<br>$R^{11}$, $R^{12}$, $R^{13}$ and $R^{14}$ are methyl<br>$R^{15}$ and $R^{16}$ are hydrogen | Tetramethyl propane-1,3-diylbis(phosphonate) |
| (structure) | m = 1<br>$R^{11}$, $R^{12}$, $R^{13}$ and $R^{14}$ are methyl or ethyl<br>$R^{15}$ and $R^{16}$ are hydrogen | Diethyl ((ethoxy(methoxy)phosphoryl)methyl) phosphonate |
| (structure) | m = 3<br>$R^{11}$, $R^{12}$, $R^{13}$ and $R^{14}$ are methyl, ethyl, propyl or pentyl<br>$R^{15}$ and $R^{16}$ are hydrogen | Pentyl propyl (3-(ethoxy(methoxy)phosphoryl)propyl) phosphonate |
| (structure) | m = 7<br>$R^{11}$, $R^{12}$, $R^{13}$ and $R^{14}$ are propyl or pentyl<br>$R^{15}$ and $R^{16}$ are hydrogen | Heptyl propyl (7-(butoxy(propoxy)phosphoryl)heptyl) phosphonate |
| (structure) | m = 3<br>$R^{11}$, $R^{12}$, $R^{13}$ and $R^{14}$ are butyl<br>$R^{15}$ and $R^{16}$ are hydrogen | Tetrabutyl propane-1,3-diylbis(phosphonate) |
| (structure) | m = 3<br>$R^{11}$, $R^{12}$, $R^{13}$ and $R^{14}$ are ethyl<br>$R^{15}$ and $R^{16}$ are hydrogen | Tetraethyl propane-1,3-diylbis(phosphonate) |
| (structure) | m = 3<br>$R^{11}$ and $R^{12}$ are ethyl, and $R^{13}$ and $R^{14}$ are butyl<br>$R^{15}$ and $R^{16}$ are hydrogen | Dibutyl (3-(diethoxyphosphoryl)propyl)phosphonate |
| (structure) | m = 3<br>$R^{11}$, $R^{12}$, $R^{13}$ and $R^{14}$ are phenyl<br>Each $R^{15}$ and $R^{16}$ are hydrogen | Tetraphenyl propane-1,3-diylbis(phosphonate) |

TABLE 2-continued

Compounds of Formula 2

| Chemical Structure | Substituents | Chemical Name |
|---|---|---|
| 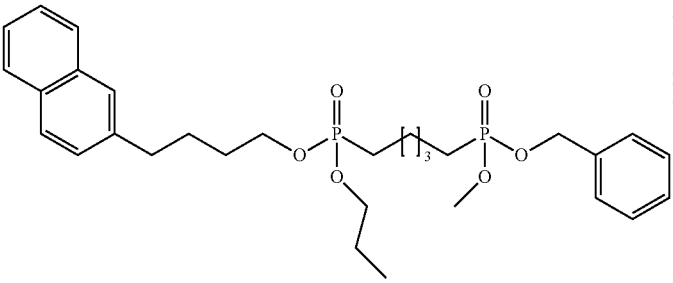 | m = 5<br>$R^{11}$, $R^{12}$, $R^{13}$ and $R^{14}$ are methyl, propyl, methylbenzene or butylnapthene<br>Each $R^{15}$ and $R^{16}$ are hydrogen | Benzyl methyl (5-((4-(naphthalen-2-yl)butoxy)(propoxy)phosphoryl)pentyl) phosphonate |
| 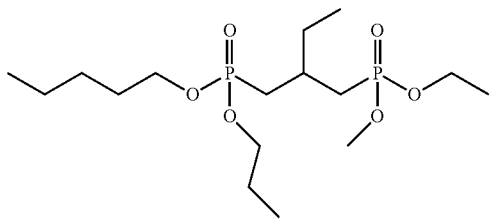 [SMILES: CCCCCOP(=O)(CC(CC)CP(=O)(OC)OCC)OCCC] | m = 3<br>$R^{11}$, $R^{12}$, $R^{13}$ and $R^{14}$ are methyl, ethyl, propyl, or pentyl<br>Each $R^{15}$ and $R^{16}$ are hydrogen or ethyl | Pentyl propyl (2-((ethoxy(methoxy)phosphoryl)methyl)butyl) phosphonate |
| 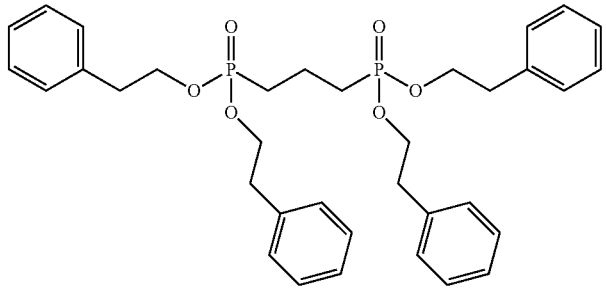 [SMILES: O=P(CCCP(=O)(OCCc1ccccc1)OCCc1ccccc1)(OCCc1ccccc1)OCCc1ccccc1] | m = 3<br>$R^{11}$, $R^{12}$, $R^{13}$ and $R^{14}$ are, ethylbenzene<br>Each $R^{15}$ and $R^{16}$ are hydrogen | Tetraphenethyl propane-1,3-diylbis(phosphonate) |

Additional Components

The hydraulic fluid composition of the present disclosure may also comprise or consist of any one or more additional components, such as "additional compounds" and "additional additives" as described below, which may assist in its function as a hydraulic fluid composition. The additional compounds may comprise or consist of monophosphonate compounds, phosphazene compounds, phosphinate compounds, or combinations thereof. For example, the hydraulic fluid composition may comprise or consist of one or more polysiloxane compounds according to any examples thereof as described herein, one or more diphosphonate compound according to any examples thereof as described herein, and a monophosphonate compound according to any examples thereof as described herein. These additional components, namely the "additional compounds" and "additional additives" as described below are examples only and other additional compounds or components may be used in the compositions.

The fluid compositions may also be selected to provide further advantages, such as low toxicological or environmental impact fluids, for example lower toxicological properties relative to Skydrol® brand fire-resistant hydraulic fluids including Skydrol® LD4 (monophosphate ester based hydraulic fluid) and Skydrol® 5 (a monophosphate ester based hydraulic fluid containing a perfluorinated surfactant as an anti-erosion additive). The polysiloxanes as described herein can provide a low toxicity, particularly in relation to fluorinated surfactants or monophosphate esters, such as those used in Skydrol® 5. The diphosphonates as described herein can also provide a low toxicity, particularly in relation to fluorinated surfactants or phosphate esters, such as those used in Skydrol® 5. In one example, the hydraulic compositions may be substantially free of at least one of monophosphate esters and fluorinated surfactants (e.g. PFOS). In another example, the hydraulic compositions may be substantially free of fluorinated surfactants (e.g. PFOS). For example, the additional components including additional compounds and additional additives as described herein may be selected to exclude any fluorinated surfactants. In another example, the additional components including additional compounds and additional additives as described herein may be selected to exclude at least one of fluorinated surfactants and monophosphate esters.

The additional components, namely the "additional compounds" and "additional additives", either together or individually, may be included in the hydraulic fluid compositions in an amount of up to about 30% (on a by weight basis of the total hydraulic fluid composition), for example less than about 30%, 25%, 20%, 15%, 10%, 5%, 4%, 3%, 2%, or 1%, or for example at least about 1%, 2%, 3%, 4%, 5%, 10%, 15%, 20%, or 25%. The additional components may be included in the hydraulic fluid composition in an amount of between about 1% and about 30% by weight of the total hydraulic fluid composition, for example between about 2% and about 25%, about 3% and about 20%, or about 5% and about 15%.

The reference to "substantially free" generally refers to the absence of the compound in the composition other than any trace amounts or impurities that may be present, for example this may be an amount by weight % in the total composition of less than about 1%, 0.1%, 0.01%, 0.001%, or 0.0001%. The compositions as described herein may also include, for example, impurities in an amount by weight % in the total composition of less than about 5%, 4%, 3%, 2%, 1%, 0.5%, 0.1%, 0.01%, 0.001%, or 0.0001%. An impurity in one particular example where the composition comprises or consists of one or more polysiloxane compounds where y is at least 2 for Formula 1 (or the sum of x, y and z, is at least 2 for Formula 1a), may for example be a disiloxanyl compound, such as diethylbenzene disiloxane.

Additional Compounds

Monophosphonate Compounds

An additional component in the hydraulic fluid composition of the present disclosure may further comprise or consist of one or more monophosphonate compounds. The monophosphonate compound may facilitate or impart further properties suitable for use in the hydraulic fluid compositions, for example by providing further lubricity or fire retardant properties, or modifying viscosity.

In one example, the monophosphonates may be substituted with hydrocarbon groups. The hydrocarbon groups may be selected from alkyl, alkyaryl, and aryl, according to any examples of those groups as described herein. The hydrocarbon group may be an alkyl group. The alkyl group may be a straight chained alkyl. The selection of monophosphonate compounds may provide compounds of lower toxicity than phosphate esters of Skydrol® LD4 or Skydrol®5, for example.

The monophosphonate compound may be represented by a compound of Formula 3:

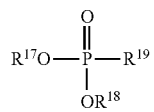

Formula 3

The above monophosphonate compounds of Formula 3 may be further described, wherein each of $R^{17}$, $R^{18}$, and $R^{19}$, are independently selected from $C_{1-20}$alkyl, aryl and $C_{1-20}$alkylaryl.

Each of $R^{17}$, $R^{18}$, and $R^{19}$, may be independently selected from $C_{1-10}$alkyl, aryl and $C_{1-10}$alkylaryl. Each of $R^{17}$, $R^{18}$, and $R^{19}$, may be independently selected from $C_{1-10}$alkyl and $C_{1-10}$alkylaryl. Each of $R^{17}$, $R^{18}$, and $R^{19}$, may be independently selected from $C_{1-6}$ alkyl and $C_{1-6}$alkylaryl. The aryl may be a monocyclic or bicyclic aryl. The aryl may be phenyl. The $C_{1-10}$alkylaryl may be $C_{1-10}$alkylphenyl, such as benzyl. For example, the monophosphonate compound may be diethylbenzylphosphonate or dibutyloctanephosphonate.

Examples of the monophosphonate compounds of Formula 3 may be provided by the following compounds in Table 3.

TABLE 3

Monophosphonate Compounds of Formula 3

| Chemical Structure | Substituents | Chemical Name |
|---|---|---|
|  | $R^{17}$ and $R^{18}$ are ethyl<br>$R^{19}$ is benzyl | Diethylbenzyl phosphonate |
|  | $R^{17}$ and $R^{18}$ are butyl<br>$R^{19}$ is hexyl | Dibutylhexane phosphonate |
|  | $R^{17}$ and $R^{18}$ are butyl<br>$R^{19}$ is octyl | Dibutyloctane phosphonate |

TABLE 3-continued

Monophosphonate Compounds of Formula 3

| Chemical Structure | Substituents | Chemical Name |
|---|---|---|
| (structure) | $R^{17}$ and $R^{18}$ are ethyl $R^{19}$ is octyl | Diethyl octylphosphonate (DEOP) |

The hydraulic fluid composition of the present disclosure may further comprise or consist of a monphosphonate compound in an amount of up to about 30% (on a by weight basis of the total hydraulic fluid composition), for example less than about 30%, 25%, 20%, 15%, 10%, 5%, 4%, 3%, 2%, or 1%, or for example at least about 1%, 2%, 3%, 4%, 5%, 10%, 15%, 20%, or 25%. The hydraulic fluid composition may further comprise or consist of a monphosphonate compound in an amount of between about 1% and about 30% by weight of the total hydraulic fluid composition, for example between about 2% and about 25%, about 3% and about 20%, or about 5% and about 15%.

Phosphazene Compounds

Another additional component in the hydraulic fluid composition of the present disclosure may further comprise or consist of one or more phosphazene compounds. Phosphazene compounds typically contain a high amount of phosphorous, which may facilitate or impart further fire retardant properties.

The phosphazene compound may be a cyclic phosphazene. The phosphazene compound may be cyclic fluorinated phosphazene compound. Examples of the phosphazene compound may include 2,2,4,4,6,6-di(4-fluorophenoxy)tetra(3-trifluoromethylphenoxy)-1,3,5-triaza-2,4,6-triphosphorine, 2,2,4,4,6,6-di(3-fluorophenoxy)tetra(3-trifluoromethylphenoxy)-1,3,5-triaza-2,4,6-triphosphorine, 2,2,4,4,6,6-di(2-fluorophenoxy)tetra(3-trifluoromethylphenoxy)-1,3,5-triaza-2,4,6-triphosphorine, 2,2,4,4,6,6-tri(2-fluorophenoxy)tri(3-trifluoromethylphenoxy)-1,3,5-triaza-2,4,6-triphosphorine, 2,2,4,4,6,6-tri(3-fluorophenoxy)tri(3-trifluoromethylphenoxy)-1,3,5-triaza-2,4,6-triphosphorine, 2,2,4,4,6,6-tri(4-fluorophenoxy)tri(3-trifluoromethylphenoxy)-1,3,5-triaza-2,4,6-triphosphorine, 2,2,4,4,6,6,8,8-tri(4-fluorophenoxy)penta(3-trifluoromethylphenoxy)-1,3,5,7-tetraza-2,4,6,8-tetraphosphorine, 2,2,4,4,6,6,8,8-tri(3-fluorophenoxy)penta(3-trifluoromethylphenoxy)-1,3,5,7-tetraza-2,4,6,8-tetraphosphorine, 2,2,4,4,6,6,8,8-tetra(4-fluorophenoxy)tetra(3-trifluoromethylphenoxy)-1,3,5,7-tetraza-2,4,6,8-tetraphosphorine, 2,2,4,4,6,6,8,8-tetra(3-fluorophenoxy)tetra(3-trifluoromethylphenoxy)-1,3,5,7-tetraza-2,4,6,8-tetraphosphorine, 2,2,4,4,6,6,8,8-2.57(3-fluorophenoxy)-5.43 (3-trifluoromethylphenoxy)-1,3,5,7-tetraza-2,4,6,8-tetraphosphorine, 2,2,4,4,6,6,8,8-2.57(4-fluorophenoxy)-5.43(3-trifluoromethylphenoxy)-1,3,5,7-tetraza-2,4,6,8-tetraphosphorine and mixtures thereof. In a preferred example, the phosphazene is 2,2,4,4,6,6-di(3-fluorophenoxy)tetra(m-trifluoromethylphenoxy)-1,3,5-triaza-2,4,6-triphosphorine, 2,2,4,4,6,6-di(4-fluorophenoxy)tetra(m-trifluoromethylphenoxy)-1,3,5-triaza-2,4,6-triphosphorine or mixtures thereof.

The hydraulic fluid composition of the present disclosure may further comprise or consist of a phosphazene compound in an amount of up to about 30% (on a by weight basis of the total hydraulic fluid composition), for example less than about 30%, 25%, 20%, 15%, 10%, 5%, 4%, 3%, 2%, or 1%, or for example at least about 1%, 2%, 3%, 4%, 5%, 10%, 15%, 20%, or 25%. The hydraulic fluid composition may further comprise or consist of a phosphazene compound in an amount of between about 1% and about 30% by weight of the total hydraulic fluid composition, for example between about 2% and about 25%, about 3% and about 20%, or about 5% and about 15%.

Phosphinate Compounds

Another additional component in the hydraulic fluid composition of the present disclosure may further comprise or consist of one or more phosphinate compounds.

The phosphinate compound may be an aryl dialkyl phosphinate ester.

Examples of the phosphinate compound may include a phenyl-di-n-propyl phosphinate, phenyl-di-n-butyl phosphinate, phenyl-di-sec-butyl phosphinate, phenyl-di-n-pentyl phosphinate, phenyl-di-neopentyl phosphinate, phenyl-di-n-hexyl phosphinate, phenyl-di-n-ibutyl thiophosphinate, p-methoxyphenyl-di-n-butyl phosphinate, m-chlorophenyl-di-n-butyl phosphinate, phenyl-(n-propyl-n-pentyl) phosphinate, phenyl-(n-propyl-n-butyl) phosphinate, phenyl-(n-propyl-n-hexyl) phosphinate, phenyl-(n-butyl-n-pentyl) phosphinate, phenyl-(n-butyl-n-hexyl) phosphinate, phenyl-(n-pentyl-n-hexyl) phosphinate, phenyl-(neopentyl-n-propyl) phosphinate, phenyl-(neopentyl-n-butyl) phosphinate, phenyl-(neopentyl-n-hexyl) phosphinate, thiophenyl-di-n-propyl phosphinate, thiophenyl-di-n-pentyl phosphinate, cresyl-di-n-pentyl phosphinate, tert.-butylphenyl-di-n-butyl phosphinate, n-butylphenyl-di-n-butyl phosphinate, sec. butylphenyl-di-n-butyl phosphinate, ethylphenyl-di-n-butyl phosphinate, xylyl-di-n-butyl phosphinate, thiophenyl-di-n-hexyl phosphinate, thiophenyl-di-n-butyl phosphinate, thiophenyl-di-n-propyl thiophosphinate, thiophenyl-di-n-butyl thiophosphinate, thiophenyl-di-n-pentyl thiophosphinate, thiophenyl-di-n-hexyl thiophosphinate, thiophenyl-(n-propyl-n-butyl) phosphinate, thiophenyl-(n-propyl-n-pentyl) phosphinate, thiophenyl-(n-propyl-n-hexyl) phosphinate, thiophenyl-(n-butyl-n-pentyl) phosphinate, thiophenyln butyl-n-hexyl) phosphinate, thiophenyl-(n-pentyl-n-hexyl) phosphinate, thiophenyl-(n-propyl-n-butyl) thiophosphinate, thiophenyl-(n-propyl-n-pentyl) thiophosphinate, thiophenyln-propyl-n-hexyl) thiophosphinate, thiophenyl-(n-butyl-n-pentyl) thiophosphinate, thiophenyl-(n-butyl-n-hexyl) thiophosphinate, and thiophenyln-pentyl-n-hexyl) thiophosphinate.

The hydraulic fluid composition of the present disclosure may further comprise or consist of a phosphinate compound in an amount of up to about 30% (on a by weight basis of the total hydraulic fluid composition), for example less than about 30%, 25%, 20%, 15%, 10%, 5%, 4%, 3%, 2%, or 1%, or for example at least about 1%, 2%, 3%, 4%, 5%, 10%, 15%, 20%, or 25%. The hydraulic fluid composition may further comprise or consist of a phosphinate compound in an amount of between about 1% and about 30% by weight of the total hydraulic fluid composition, for example between about 2% and about 25%, about 3% and about 20%, or about 5% and about 15%.

Additional Additives

As mentioned above, the hydraulic fluid composition of the present disclosure may further comprise or consist of one or more additional components, such as an additional compound and/or an additional additive, which may assist in its function as a hydraulic fluid composition. The additional additive may further comprise or consist of acid scavengers, anti-erosion agents, viscosity index modifiers, antioxidants, antifoaming agents, anti-corrosion agents, or combinations thereof. In another example, the additional additive may further comprise or consist of acid scavengers, viscosity index modifiers, antioxidants, antifoaming agents, or combinations thereof. In another example, the additional additive may further comprise or consist of acid scavengers, anti-erosion agents, antioxidants, antifoaming agents, or combinations thereof. These additional additives are examples and other additional additives or components may also be used.

The hydraulic fluid composition of the present disclosure may further comprise or consist of one or more additional additives in an amount of up to about 30% (on a by weight basis of the total hydraulic fluid composition), for example less than about 30%, 25%, 20%, 15%, 10%, 5%, 4%, 3%, 2%, or 1%, or for example at least about 0.01%, 0.1%, 1%, 2%, 3%, 4%, 5%, 10%, 15%, 20%, or 25%. The hydraulic fluid composition may further comprise or consist of one or more additional additives in an amount of between about 1% and about 30% by weight of the total hydraulic fluid composition, for example between about 2% and about 25%, about 3% and about 20%, or about 5% and about 15%. Additional ranges may be provided by any two of the lower and upper values previously described. Any one or more of these amounts or ranges may apply individually to each class, mixture or individual additive described below, or collectively to all the "additional additives" provided in the hydraulic fluid compositions.

Acid Scavengers

An additional additive in the hydraulic fluid composition may further comprise or consist of an acid scavenger compound. It will be appreciated that an acid scavenger is a chemical substances added to the composition in order to remove, reduce or de-activate acid impurities or unwanted reaction products. Acid scavengers may include various esters or aliphatic epoxides, for example epoxy alkyl carboxylates. Suitable acid scavengers may include, for example organic compounds which contain at least one epoxide group such as phenylglycidyl ether, pinene oxide, styrene oxide, glycidyl cyclohexyl ether, glycidyl epoxycyclohexyl ether, diglycidyl ether, glycidyl isopropyl ether, butadiene dioxide cyclohexylene oxide, bis-epoxycyclohexyl adipate, 3,4-epoxycycloalkylcarboylates and carbodiimides (e.g. 3,4-epoxycyclohexylcarboylate or 3,4-epoxycyclohexane), and mixtures thereof. In an example, the acid scavenger may be selected from the group consisting of 4-epoxycycloalkylcarboylates and carbodiimides, such as 3,4-epoxycyclohexylcarboylate or 3,4-epoxycyclohexane.

Further to the amounts of additional additives described above, in additional examples the antioxidant may be provided in an amount of less than 3 wt % of the total composition, for example in a range of about 0.1 to about 1 wt %.

Further to the amounts of additional additives described above, in additional examples the acid scavenger may be provided in an amount of about 0.5 to 10 wt %, for example in a range of about 2 to 9 wt % or about 4 to 8 wt %.

Anti-Erosion Agents

An additional additive in the hydraulic fluid composition may further comprise or consist of an anti-erosion agent. An anti-erosion agent may be incorporated in an amount effective to inhibit flow-induced electrochemical corrosion, more precisely referred to as zeta corrosion. The anti-erosion additive may be a perfluorinated anionic surfactant.

The anti-erosion agent may be a perfluorinated anionic surfactant. The perfluorinated anionic surfactant may be an alkali metal salt, for example a potassium salt of a perfluoroalkyl sulfonic acid. Typically, the alkyl component comprises hexyl, heptyl, octyl, nonyl, decyl, or mixtures thereof, with perfluorooctyl affording a further advantage in some examples.

The anti-erosion agent may be a perfluoroalkyl sulfonic acid selected from the group consisting of perfluoromethyl sulfonic acid, perfluoroethyl sulfonic acid, perfluoropropyl sulfonic acid, perfluorobutyl sulfonic acid, perfluoropentyl sulfonic acid, perfluoroheptyl sulfonic acid, perfluorooctyl sulfonic acid, perfluorodecyl sulfonic acid, perfluorooctodecyl sulfonic acid, perfluorocyclopentyl sulfonic acid, perfluorocyclohexyl sulfonic acid, perfluorocycloheptyl sulfonic acid, perfluoro(ethylcyclohexyl) sulfonic acid, perfluoro (cyclohexylmethyl) sulfonic acid, perfluoro (cyclohexylethyl) sulfonic acid, perfluoro (cyclohexylpropyl) sulfonic acid, perfluoro (methylcyclohexyl) sulfonic acid and perfluoro (dimethylcyclohexyl), and any salts or combinations thereof. The fluorinated anti-erosion agents may be provided as a mixture or in combination with one or more other anti-erosion agents, for example with a non-fluorinated anti-erosion additive. For example, a non-fluorinated anti-erosion additive may be a mono epoxycyclohexane carboxylate, for example 2-ethyl-1-hexyl epoxycyclohexanecarboxylate.

The anti-erosion agent may be perfluorooctyl sulfonic acid or a salt thereof.

The anti-erosion agent may be a salt selected from the group consisting of sodium, lithium, potassium, rubidium, and caesium. The perfluorinated anionic surfactant may be a potassium salt. One example of an anti-erosion agent is $KPF_6$.

The anti-erosion agent may be potassium perfluorooctyl sulfonic acid.

The anti-erosion agent may predominantly comprise or consist of the potassium salt of perfluorooctyl sulfonic acid.

In the operation of an aircraft hydraulic fluid composition system, the sulfonic acid moiety of the anti-erosion agent may lower the surface tension of the hydraulic fluid composition and thereby better cover the metal surfaces with which the hydraulic fluid composition typically contacts. The metering edges of servo valves are generally the most important metal parts which need protection from electrochemical corrosion. Positive ions in the fluid, including the alkali metal ion of the anti-erosion agent, are adsorbed onto the metal surface and neutralize the negative charges on the metal that are otherwise created by the rapid flow of the hydraulic fluid composition over the servo valve metering edges.

The hydraulic fluid composition of the present disclosure does not require an anti-erosion agent or a perfluorooctyl sulfonic acid additive, although it will be appreciated that the composition may optionally include such an additive.

Therefore, the hydraulic fluid composition may further comprise or consist of a composition as described herein with the proviso that the composition excludes or is substantially free of an anti-erosion agent, for example a perfluorooctyl sulfonic acid additive. In one example, the hydraulic fluid composition is substantially free of fluorinated anti-erosion additives. The hydraulic fluid composition may be substantially free of perfluorinated anionic surfactants, for example a perfluoroalkyl sulfonic acid or salt thereof. These compositions may be more user friendly and provide ease of handling and with fewer additives may facilitate ease of manufacturing or lower cost of goods.

In another example, the anti-erosion additive may be a non-fluorinated anti-erosion additive. For example, the non-fluorinated anti-erosion additive may be a mono epoxycyclohexane carboxylate, for example 2-ethyl-1-hexyl epoxycyclohexanecarboxylate.

Further to the amounts of additional additives described above, in additional examples the anti-erosion additive may be provided in an amount of about 0.001 to 1 wt %, for example in a range of about 0.01 to 0.5 wt % or about 0.02 to 0.4 wt %.

Viscosity Index Modifier

An additional additive in the hydraulic fluid composition may further comprise or consist of a viscosity index modifier. Suitable viscosity index modifiers may include polyalkyl acrylates, poly(alkyl methacrylates), poly(alkyl methacrylate) esters, polycyclic polymers, polyurethanes, aliphatic epoxides, polyalkylene oxides and polyesters, and combinations thereof. The viscosity index modifier may be a poly(butylmethacrylate) or poly(hexylmethacrylate) or a mixture thereof. In one example, the hydraulic fluid composition may be substantially free of a viscosity index modifier as described hereinbefore.

The viscosity index modifier (also referred to as a viscosity index improver) may be a high molecular weight compound having a number average molecular weight between about 50,000 and about 100,000 and a weight average molecular weight between about 200,000 and 350,000, for example.

Further to the amounts of additional additives described above, in additional examples the viscosity index modifier may be provided in an amount of about 1 to 10 wt %, for example in a range of about 2 to 9 wt % or about 3 to 8 wt %.

Antioxidant

An additional additive in the hydraulic fluid composition may further comprise or consist of an antioxidant or mixture of antioxidants in an amount effective to inhibit oxidation of the hydraulic fluid composition or any of its components. Representative antioxidants include, by way of example, phenolic antioxidants, such as 2,6-di-tert-butyl-4-methylphenol, tetrakis[methylene(3,5-di-tert-butyl-4-hydroxyhydrocinnamate)]-methane, bis (3,5 di-tert-butyl-4 hydroxyphenyl) methane, 1,3,5-trimethyl-2,4,6-tris (3,5-di-tert butyl-4-hydroxyphenyl) benzene and the like; amine antioxidants including, by way of example, diarylamines, such as octylated diphenyl amine phenyl-α-naphthylamine, alkylphenyl-α-naphthylamine, or the reaction product of N-phenylbenzylamine with 2,4,4-trimethylpentene, diphenylamine, ditoylamine, phenyl toly-amine, 4,4'-diaminodiphenylamine, di-p-methoxydiphenylamine, or 4-cyclohexylaminodiphenylamine. Still other suitable antioxidants include amino-phenols such as N-butylaminophenol, N-methyl-N-amylaminophenol and N-isooctyl-p-aminophenol as well as mixtures of any such antioxidants.

A mixture of antioxidants may comprise or consist of 2,6-di-tert-butyl-4-methylphenol and di(octylphenyl)amine (e.g., a 1:1 mixture). Another mixture may comprise or consist of 2,6-di-tert-butyl-p-cresol, di(octylphenyl)amine and 6-methyl-2,4-bis (octylthio)-methyl]-phenol (e.g., 1:2:4 mixture). Another mixture of antioxidants may comprise or consist of 2,6-di-tert-butyl-4-methylphenol, di(octylphenyl)amine and tetrakis[methylene(3,5-di-tert-butyl-4-hydroxyhydrocinnamate)]methane (e.g., a 1:2:3 mixture).

Further to the amounts of additional additives described above, in additional examples the antioxidant may be provided in an amount of less than 3 wt % of the total composition, for example in a range of about 0.1 to about 1 wt %.

Antifoaming Agents

An additional additive in the hydraulic fluid composition may further comprise or consist of an antifoaming agent. The antifoaming agent may be selected from a silicone oil, polyvinyl alcohol, polyether, or a combination thereof. The antifoaming agent may be a silicone oil, for example a polysiloxane such as polydimethylsiloxane. The antifoaming agent may be a polyacrylate, for example a poly(alkyl acrylate) and poly(alkyl methacrylate).

Anti-Corrosion Agents

An additional additive in the hydraulic fluid composition may further comprise or consist of an anti-corrosion agent, which may also be referred to as an anti-corrosion additive or corrosion inhibitor. An anti-corrosion agent may be incorporated in an amount effective to inhibit, reduce or prevent the corrosion rate of metal surfaces. An anti-corrosion agent may be incorporated in an amount effective to inhibit, reduce or prevent the formation of rust.

The anti-corrosion additive may be selected from the group consisting of inorganic or organic phosphates, fatty carboxylic acids neutralized with an alkanolamine, amine carboxylates, alkylamines, alkanolamines, propyl gallate, polyoxyalkylene polyols, octadecyl amines, nonyl phenol ethoxylates, calcium phenolates of hydrogenated pentadecyl phenol, magnesium alkyl benzene sulfonates, and any mixtures thereof. In an example, the anti-corrosion additive may be selected from copper corrosion inhibitors such as benzotriazoles.

The anti-corrosion additive may be an alkanolamine. Suitable alkanolamines may comprise monoethanolamine and triethanolamine.

The anti-corrosion additive may be an alkylamine. Suitable alkylamines may comprise a $C_{6-20}$ linear or branched alkyl group.

The anti-corrosion additive may be an alkanolamine. Suitable alkanolamines may comprise 1 to 12 carbon atoms, and optionally more than one alkanol group, such as dialkanolamines and trialkanolamines.

The anti-corrosion additive may be a benzotriazole. Suitable benzotriazoles may comprise octyl 1H benzotriazole and ditertiary butylated 1H-Benzotriazole.

Other corrosion inhibitors may include polyethoxylated fatty amines and polyethoxylated diamines.

In an example, the corrosion inhibitor may be provided in a concentration or amount effective to substantially inhibit corrosion, if present, for example such that there is a loss of less than about 10 microns per year in the thickness of a metal in contact with the hydraulic fluid.

Many modifications of examples set forth herein will come to mind to one skilled in the art to which the present disclosure pertains having the benefit of the teachings presented in the foregoing descriptions and the associated drawings and figures. Therefore, it is to be understood that the present disclosure is not to be limited to the specific examples illustrated and that modifications and other examples are intended to be included within the scope of the appended claims. Moreover, although the foregoing description and the associated drawings and figures describe examples of the present disclosure in the context of certain illustrative combinations of elements and/or functions, it should be appreciated that different combinations of elements and/or functions may be provided by alternative implementations without departing from the scope of the appended claims.

BRIEF DESCRIPTION OF DRAWINGS

In the examples, reference will be made to the accompanying drawings, in which.

EXAMPLES

Figure 1:
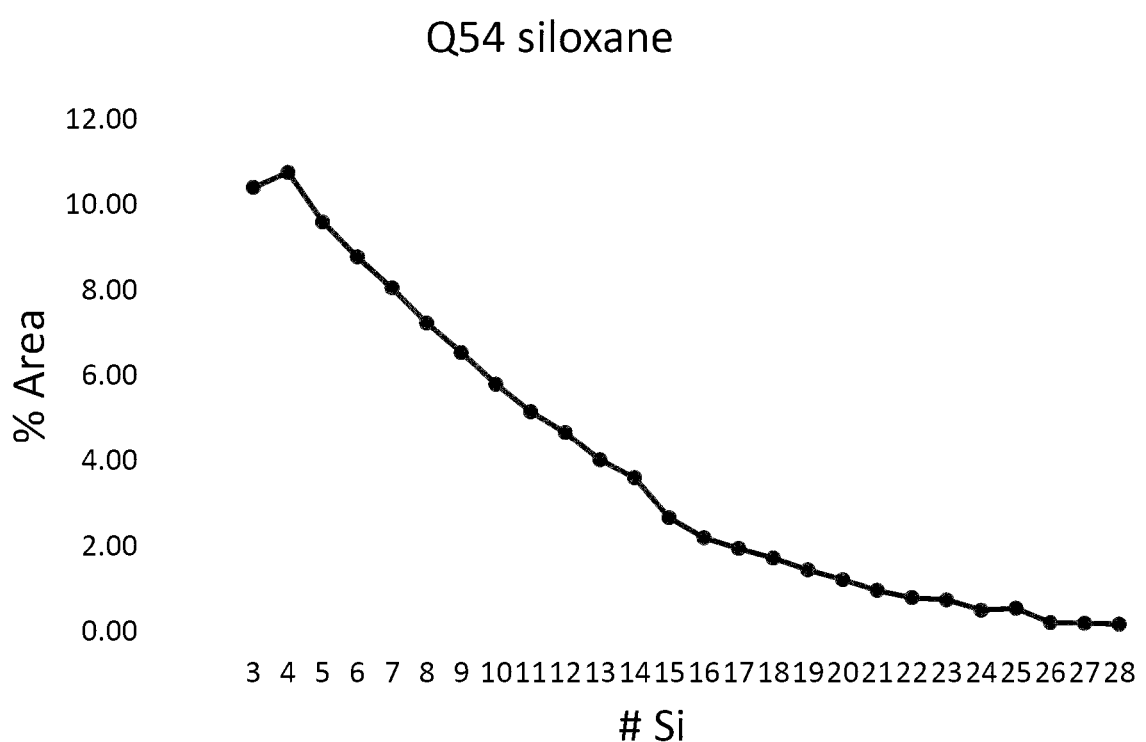
FIG. 1 shows a schematic representation of liquid chromatography for a polysiloxane mixture according to one example of the present disclosure where an amount of a specific polysiloxane compound is provided in a vertical axis and the polysiloxane compound defined by number of silane (Si) groups is provided along the horizontal axis.

The present disclosure is further described by the following examples. It is to be understood that the following description is for the purpose of describing particular examples only and is not intended to be limiting with respect to the above description.

A. Hydraulic Fluid Compositions

Hydraulic fluid compositions were prepared and various properties determined. A range of examples of fluid compositions are shown in Tables 4 and 5 below. For Table 4, polysiloxanes were provided in compositions with diphosphonates in ratios of 50:50 to 95:5 respectively. The suitable miscibility of polysiloxanes with a monophosphonate, diphosphonate and an aviation industry hydraulic fluid of Skydrol® (LD4) was also evaluated. Currently used aviation hydraulic fluids are monophosphate based fluids, such as Skydrol® (LD4). Another hydraulic fluid currently in use is Skydrol® 5, which is a monophosphate based hydraulic fluid that also contains a perfluorinated surfactant as an anti-erosion additive. It will be appreciated that the monophosphate compounds (i.e. P(=O)(OR)$_3$) used in current aviation hydraulic fluids are structurally distinguished from phosphonates containing a hydrocarbon group directly attached to the phosphorus atom and not via an oxygen atom (i.e. RP(=O)(OR)$_2$), for example the monophosphonates or diphosphonates as described herein. Table 5 also provides a range of further examples of fluid compositions comprising alkyl phosphonates by themselves and in combination with a "F9 Mix" that is a combination mixture of a polysiloxane and diphosphonate. Fluid compositions were also prepared and tested covering a range of additional additives, for example including acid scavengers and antioxidants.

TABLE 4

Hydraulic fluid compositions

| | SAE AS1241 specification | EB-D8-EB Dibutyl hexyl phosphonate | EB-D8-EB Skydrol® LD4 | EB-D8-EB Skydrol® LD4 | EB-D8-EB Tetrabutyl propane disphosphonate | EB-D8-EB Tetrabutyl propane disphosphonate | EB-D8-EB Tetrabutyl propane disphosphonate | EB-D8-EB Tetrabutyl propane disphosphonate | EB-D12(EB)-EB Tetrabutyl propane disphosphonate |
|---|---|---|---|---|---|---|---|---|---|
| Weight Ratio | | 50:50 | 50:50 | 75:25 | 95:5 | 90:10 | 75:25 | 50:50 | 50:50 |
| Density (g/cm$^3$, 25° C.) | 1.02 | N/A | N/A | N/A | N/A | N/A | 0.986 | 1.01 | N/A |
| Viscosity @ 65° F. (cP) | Nil | 6.75 ± 0.02 | 10.35 ± 0.01 | 10.18 ± 0.02 | 11.63 ± 0.01 | 11.64 ± 0.39 | 12.81 ± 0.04 | 14.29 ± 0.01 | N/A |
| Viscosity @ 100° F. (cP) | 9 < 12.5 | 5.01 ± 0.01 | 8.49 ± 0.01 | 7.77 ± 0.01 | 8.87 ± 0.01 | 8.93 ± 0.01 | 9.39 ± 0.02 | 9.96 ± 0.02 | N/A |
| Viscosity @ −65° F. (cP)s | 2000 < 2600 | 387 ± 2 | 436 ± 4 | 326.3 ± 0.5 | 340 ± 4 | 417 ± 3 | 786 ± 3 | 2027 ± 11 | 5764 ± 32 |
| Flash point (° C.) | >160 | 155 | 155 | 155 | >200 | >200 | >200 | >200 | >200 |

TABLE 4-continued

Hydraulic fluid compositions

| | SAE AS1241 specification | EB-D8-EB Dibutyl hexyl phosphonate | EB-D8-EB Skydrol ® LD4 | EB-D8-EB Skydrol ® LD4 | EB-D8-EB Tetrabutyl propane disphosphonate | EB-D8-EB Tetrabutyl propane disphosphonate | EB-D8-EB Tetrabutyl propane disphosphonate | EB-D8-EB Tetrabutyl propane disphosphonate | EB-D12(EB)-EB Tetrabutyl propane disphosphonate |
|---|---|---|---|---|---|---|---|---|---|
| Fire point (° C.) | >176 | >200 | >200 | >200 | >200 | >200 | >200 | >200 | >200 |
| Wick (cycles) | >25 | >320 | >320 | >320 | >320 | >320 | >320 | >320 | >320 |
| O-ring swell (%) Kapco | 0-18 (14) | 17.5 | 12.4 | 12.2 | 9.8 | 10.5 | 9.4 | 8.5 | 11.4% |
| O-ring swell (%) Parker | 0-18 (14.5) | 26.0 | 17.7 | 18.1 | 15.1 | 14.9 | 14.5 | 13.9 | 6.9% |
| Paint hardness @ 20° C., 28 day[1] or ultimate[2] | >3H | 2B 5H | 3B* F* | 3B* F* | 2B* 4H* | 3B* 4H* | 2B 5H | 2B >6H | 3B >6H |

[1,2]Minimum pencil hardness required in [1]"pencil push" test to scratch paint and [2]ultimate test

*Tested at 60° C.

TABLE 5

Hydraulic fluid compositions

| | Room Temp (25 C.) Viscosity (cP) | 38 C. Viscosity (cP) | −54 C. Viscosity (cP) |
|---|---|---|---|
| Skydrol LD4 | 16.18 ± 0.07 | 10.34 ± 0.01 | 964.90 ± 4.87 |
| (F9 Mix) EB-D8-EB [50:50] tetraButyl Propane diPhosphonate | 17.28 ± 0.03 | 11.87 ± 0.02 | 2618.0 ± 9.0 |
| DiEthyl Octane Phosphonate (AP26) | 4.64 ± 0.01 | 3.39 ± 0.01 | Frozen 6 hr |
| DiEthyl Octane Phosphonate (AP26) [20:80] + F9 mix | 12.43 ± 0.02 | 8.65 ± 0.03 | 1507.0 ± 14.1 |
| DiEthyl Decane Phosphonate (AP28) | 7.02 ± 0.04 | 4.89 ± 0.01 | Frozen <3 hr |
| DiEthyl Decane Phosphonate (AP28) [20:80] + F9 mix | 13.57 ± 0.04 | 9.26 ± 0.04 | 1586.3 ± 27.5 |
| DiButyl Octane Phosphonate (AP30) | 5.83 ± 0.01 | 4.16 ± 0.01 | 510.1 ± 6.3 |
| DiButyl Octane Phosphonate (AP30) [20:80] + F9 mix | 12.50 ± 0.01 | 8.66 ± 0.01 | 1727.3 ± 4.1 |
| DiButyl Decane Phosphonate (AP32) | 6.97 ± 001 | 4.91 ± 0.01 | 706.2 ± 5.4 |
| DiButyl Decane Phosphonate (AP32) [20:80] + F9 mix | 12.90 ± 0.01 | 8.91 ± 0.01 | 1728.1 ± 27.1 |

Product Analysis

Polysiloxane products were analysed either by GC, proton NMR and/or HPLC. The analysis data presented below is for EB-D8-EB and provides an illustration of the analysis approach for polysiloxanes other than EB-D8-EB. The analysis data presented here is associated with the first reaction step i.e. ring opening polymerisation to form the polysiloxane backbone (GC and NMR), the second reaction step i.e. the end capping by hydrosilylation (GC and NMR) as well as the distribution of oligomers in the final product (HPLC). Additionally presented is a typical GC trace of the distilled/WFE product where low molecular weight volatiles have been removed.

Analysis data for EB-D8-EB

Figure 2:
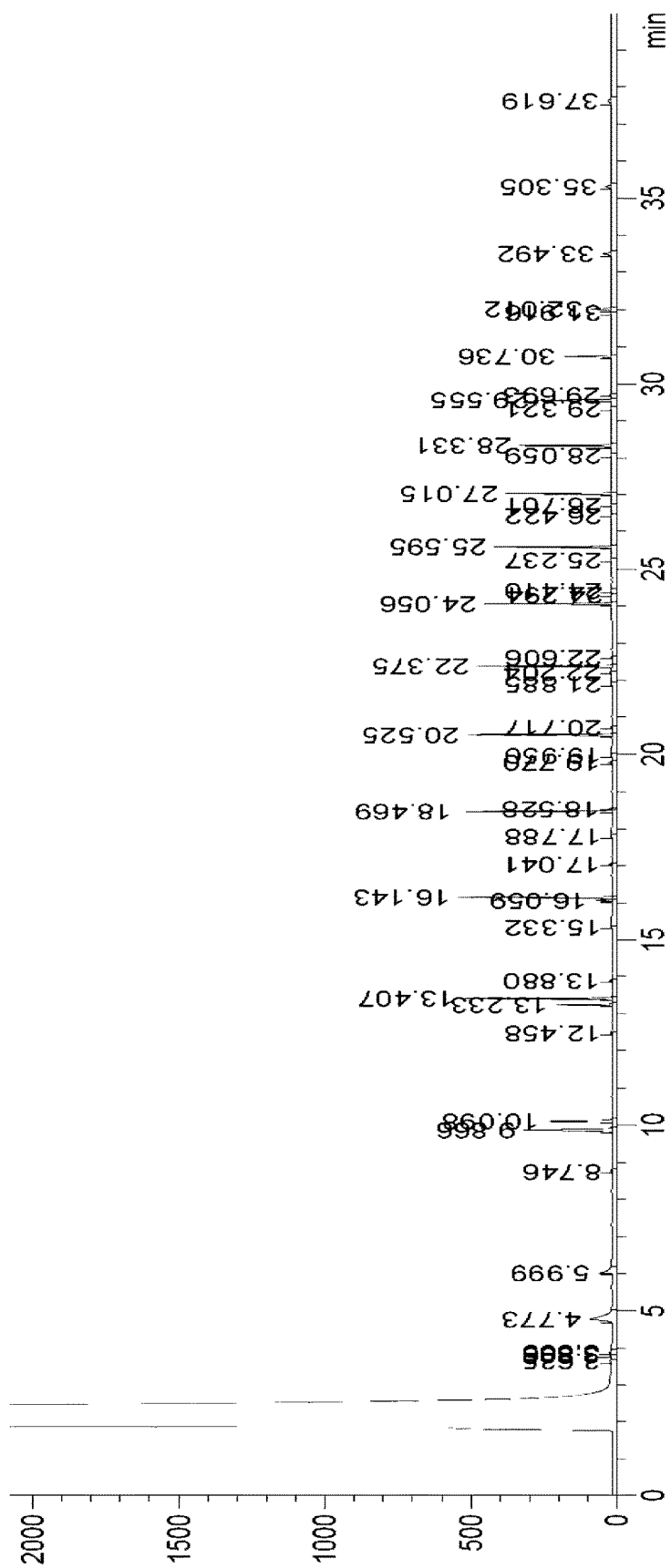
FIG. 2 shows GC data for the first step of the preparation of EB-D8-EB according to one example of the present disclosure showing the distribution of oligomers which are volatile in the GC.

GC data is shown in FIG. 2 for the first step of the preparation of EB-D8-EB showing the distribution of oligomers which are volatile in the GC. At this stage of the process oligomers to 19 silicon chain length are observed in the GC (see FIG. 2). The GC results, which are also provided below in Table 6 show the formation of the polysiloxane backbone with a number average/weight average (NiWi) close to the targeted D8.

TABLE 6

GC Results

| Ret Time | Species/Time (h) | n | 0 | 1 | NiWi | 2 | NiWi |
|---|---|---|---|---|---|---|---|
| 3.632 | TMDS or Acetone | | 0.08% | 0.10% | | 0.11% | |
| 4.77 | TMDS or Acetone | | 1.74% | 5.21% | | 5.25% | |
| 5.995 | TMDS or Acetone | | 1.35% | 1.70% | | 1.73% | |
| 9.867 | H-Si3-H | 3 | | 7.11% | 0.213 | 7.13% | 0.214 |
| 10.167 | D4 | | 95.35% | 5.73% | | 4.90% | |
| 13.232 | D5 | | | 2.85% | | 2.95% | |
| 13.406 | H-Si4-H | 4 | | 7.89% | 0.315 | 7.89% | 0.316 |
| 16.058 | D6 | | | 0.82% | | 0.85% | |
| 16.141 | H-Si5-H | 5 | | 8.57% | 0.429 | 8.19% | 0.410 |
| 18.467 | H-Si6-H | 6 | | 8.01% | 0.480 | 8.08% | 0.485 |
| 20.522 | H-Si7-H | 7 | | 7.73% | 0.541 | 7.80% | 0.546 |
| 22.372 | H-Si8-H | 8 | | 7.35% | 0.588 | 7.41% | 0.593 |
| 24.053 | H-Si9-H | 9 | | 6.86% | 0.618 | 6.94% | 0.624 |
| 25.592 | H-Si10-H | 10 | | 6.30% | 0.630 | 6.38% | 0.638 |
| 27.012 | H-Si11-H | 11 | | 5.72% | 0.629 | 5.81% | 0.639 |
| 28.329 | H-Si12-H | 12 | | 5.15% | 0.618 | 5.25% | 0.630 |
| 29.554 | H-Si13-H | 13 | | 4.35% | 0.565 | 4.44% | 0.578 |
| 30.734 | H-Si14-H | 14 | | 3.17% | 0.444 | 3.25% | 0.456 |
| 32.009 | H-Si15-H | 15 | | 1.75% | 0.262 | 1.80% | 0.270 |
| 33.488 | H-Si16-H | 16 | | 0.79% | 0.126 | 0.81% | 0.130 |
| 35.298 | H-Si17-H | 17 | | 0.54% | 0.092 | 0.56% | 0.095 |
| 37.61 | H-Si18-H | 18 | | 0.46% | 0.082 | 0.47% | 0.085 |
| 40.629 | H-Si19-H | 19 | | 0.36% | 0.068 | 0.37% | 0.071 |
| | | 187 | | 82.08% | 6.70 | 82.59% | 6.78 |
| Average Chain Length | | | 2.00 | | 8.16 | | 8.21 |

Figure 3:
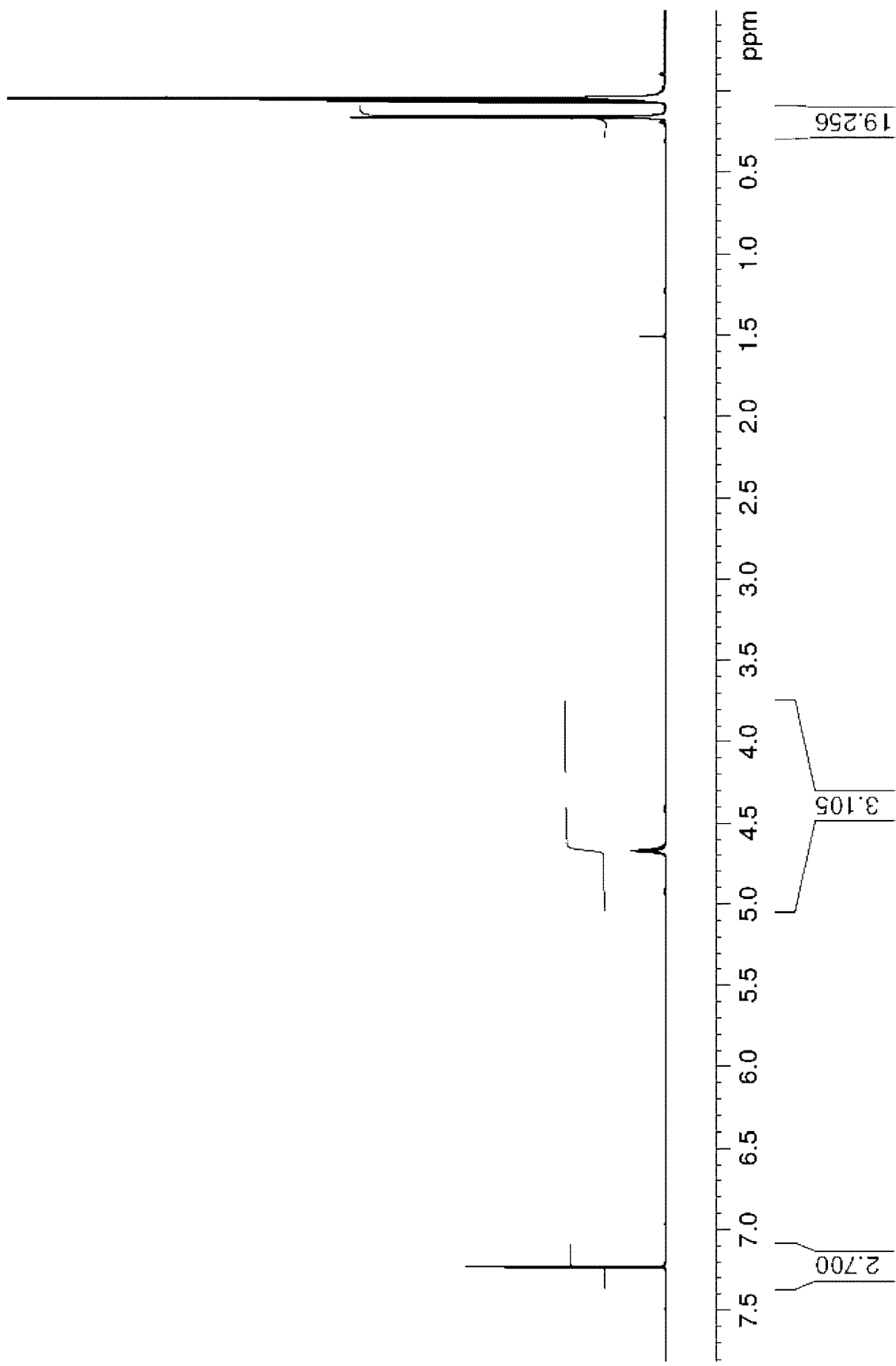
FIG. 3 shows a Proton NMR for the first step of the preparation of EB-D8-EB according to one example of the present disclosure showing the chain extension having taken place with terminal Si—H groups evident (peak at ~4.65) and the methyl groups associated with Si (peak ~0.15 is terminal Si and peak 0.05 with backbone Si)

Proton NMR is provided in FIG. 3 in relation to the first step of the preparation of EB-D8-EB showing the chain extension having taken place with terminal Si—H groups evident (peak at ~4.65) and the methyl groups associated with Si (peak ~0.15 is terminal Si and peak 0.05 with backbone Si).

Figure 4:
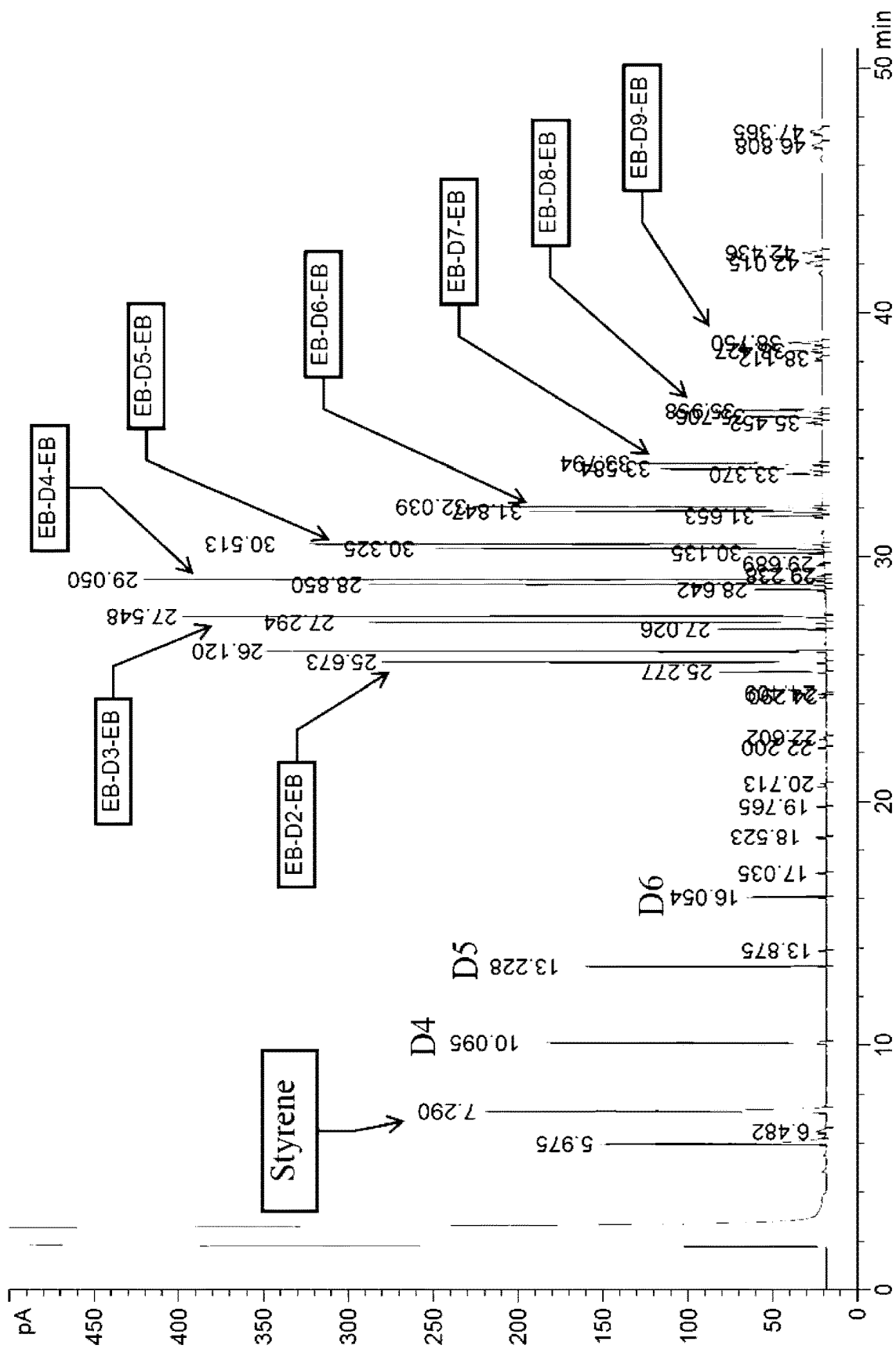
FIG. 4 shows GC data in relation to the second step (hydosilylation) of the preparation of EB-D8-EB according to one example of the present disclosure showing the distribution of oligomers which are volatile in the GC.

GC data is provided in FIG. 4 in relation to the second step (hydosilylation) of the preparation of EB-D8-EB showing the distribution of oligomers which are volatile in the GC. At this stage of the process oligomers to 11 silicon chain lengths are observed as a consequence of hydrosilylation having taken place. It will be noted that longer chain oligomers do not appear in the GC such that the average chain length appears smaller than it actually is. The GC data is also provided below in Table 7.

TABLE 7

Hydrosilylated Product

| Ret Time | Species/Time (h) | n | 1 | NiWi |
|---|---|---|---|---|
| 5.995 | Acetone impurity | | 4.77% | |
| 7.29 | Styrene | | 9.07% | |
| 10.095 | D4 | | 4.10% | |
| 13.328 | D5 | | 2.51% | |
| 16.054 | D6 | | 0.74% | |
| 25.673 | EB-Si2-EB | 2 | 12.77% | 0.255 |
| 27.294 | EB-Si3-EB | 3 | 14.33% | 0.430 |
| 28.85 | EB-Si4-EB | 4 | 13.71% | 0.548 |
| 29.689 | EB-Si5-EB | 5 | 12.43% | 0.621 |
| 31.847 | EB-Si6-EB | 6 | 9.79% | 0.587 |
| 33.584 | EB-Si7-EB | 7 | 6.50% | 0.455 |
| 35.706 | EB-Si8-EB | 8 | 3.56% | 0.285 |
| 38.427 | EB-Si9-EB | 9 | 1.98% | 0.178 |
| 42.015 | EB-Si10-EB | 10 | 1.37% | 0.137 |
| 46.808 | EB-Si11-EB | 11 | 1.09% | 0.120 |
| | | 65.00 | 77.52% | 3.62 |
| Average Chain Length | | | | 4.67 |

Figure 5:
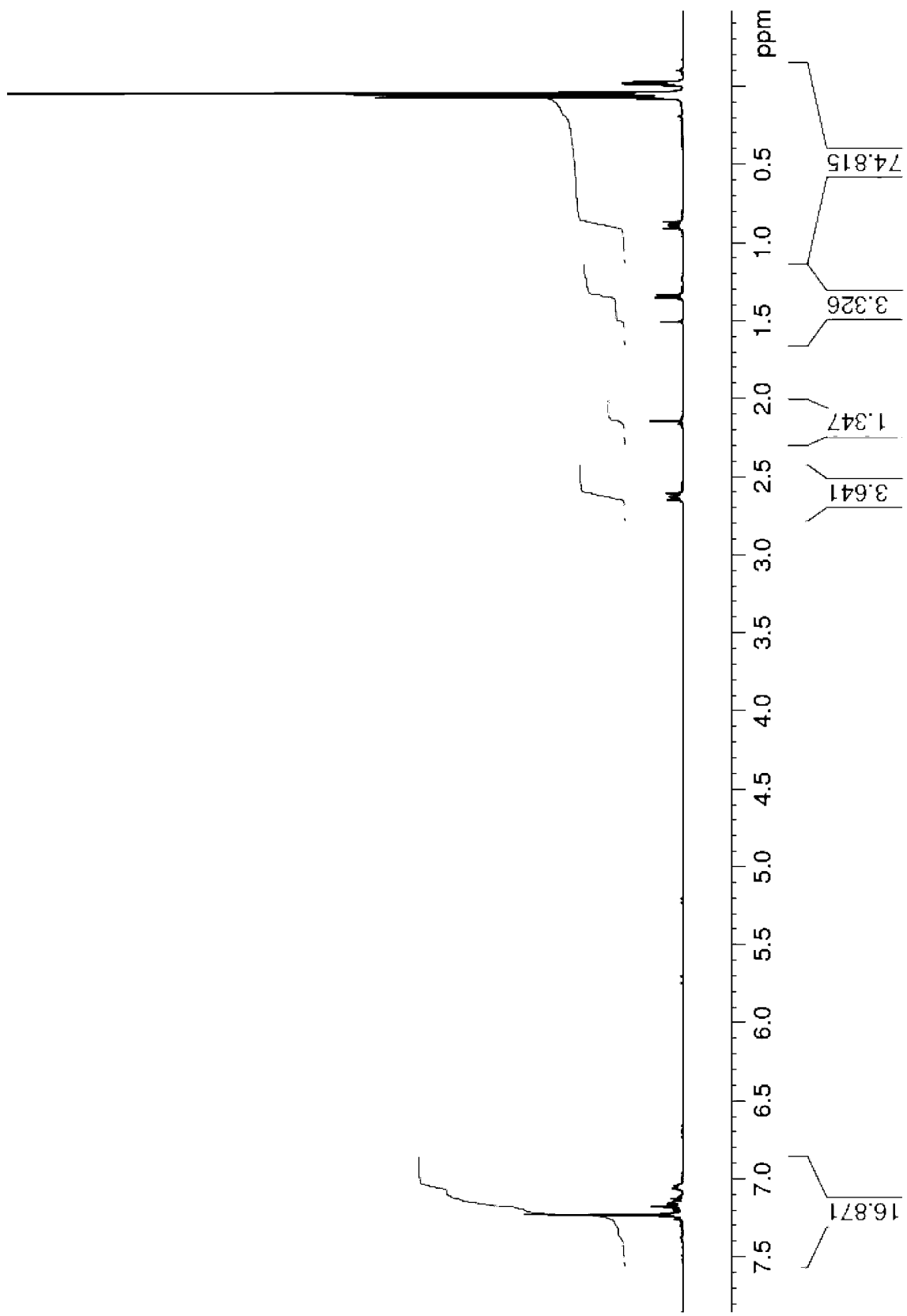
FIG. 5 shows a Proton NMR of the second reaction step for the preparation of EB-D8-EB according to one example of the present disclosure.

Proton NMR as shown in FIG. 5 of the second reaction step for the preparation of EB-D8-EB indicates that none of the starting H-D8-H (peak at ~4.65 in the Proton NMR above is not evident) is seen at the completion of the process.

Figure 6:
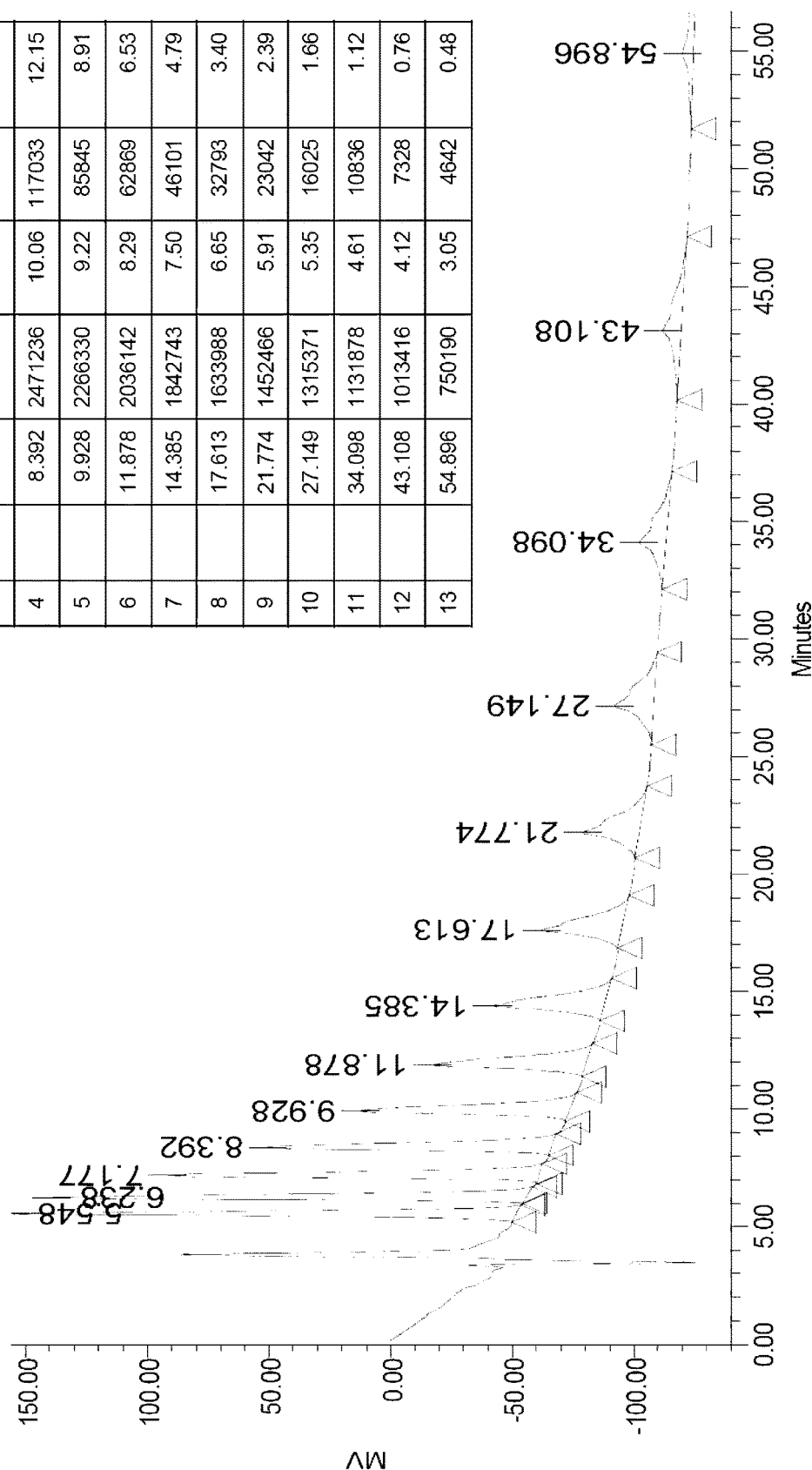
FIG. 6 shows an HPLC of EB-D8-EB showing the low molecular weight oligomers according to one example of the present disclosure.
Figure 7:
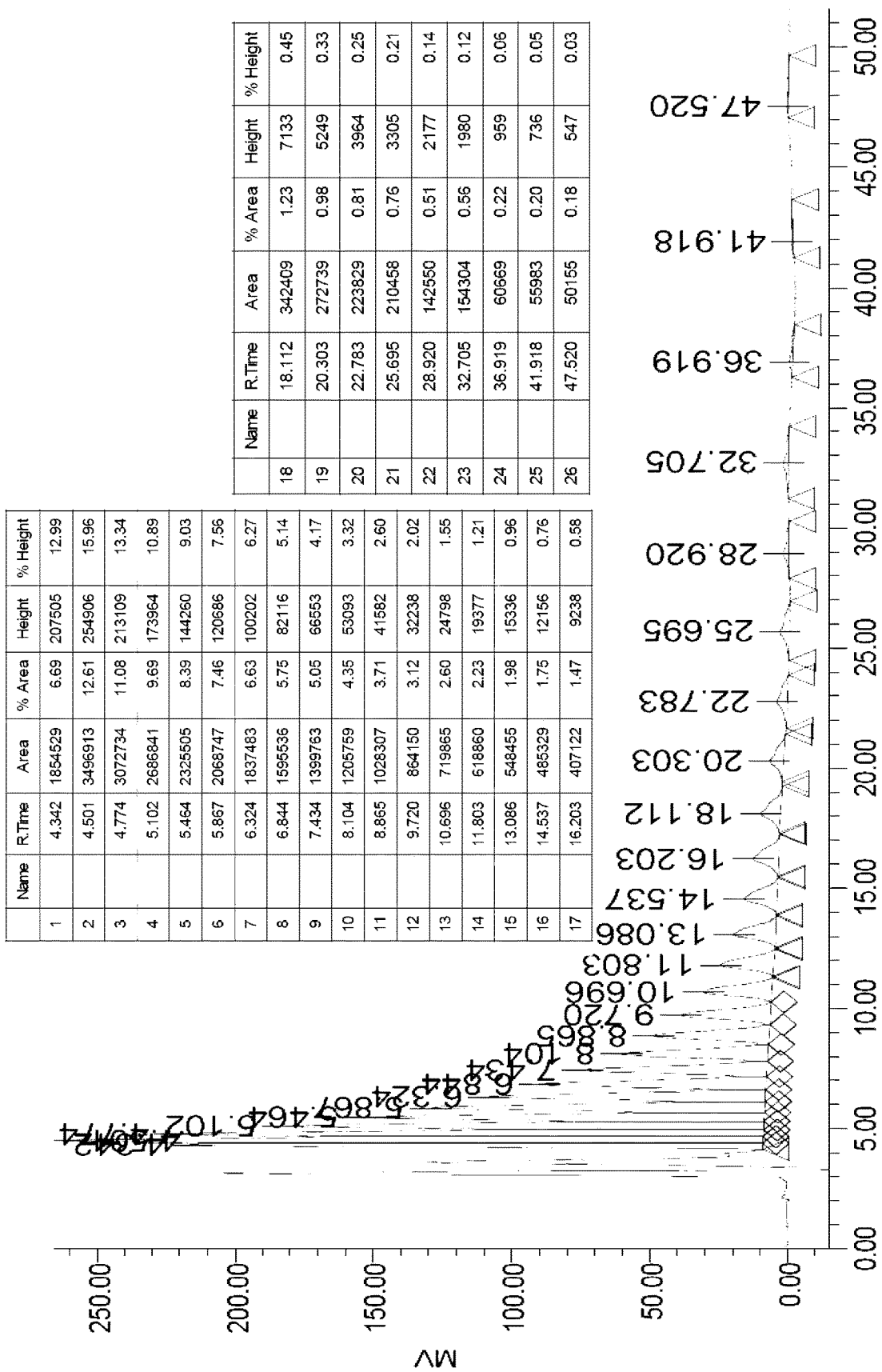
FIG. 7 shows an HPLC of EB-D8-EB showing the full distribution of oligomers according to one example of the present disclosure.

HPLC of EB-D8-EB in FIG. 6 shows separation of the low molecular weight oligomers. The HPLC of EB-D8-EB in FIG. 7 shows the full distribution of oligomers.

Analysis and integration of the combined HPLC data presented above showing the relative amounts of the oligomers present in the EB-D8-EB product, allowed determining the average chain length to be ~8 (see FIG. 1).

Figure 8:
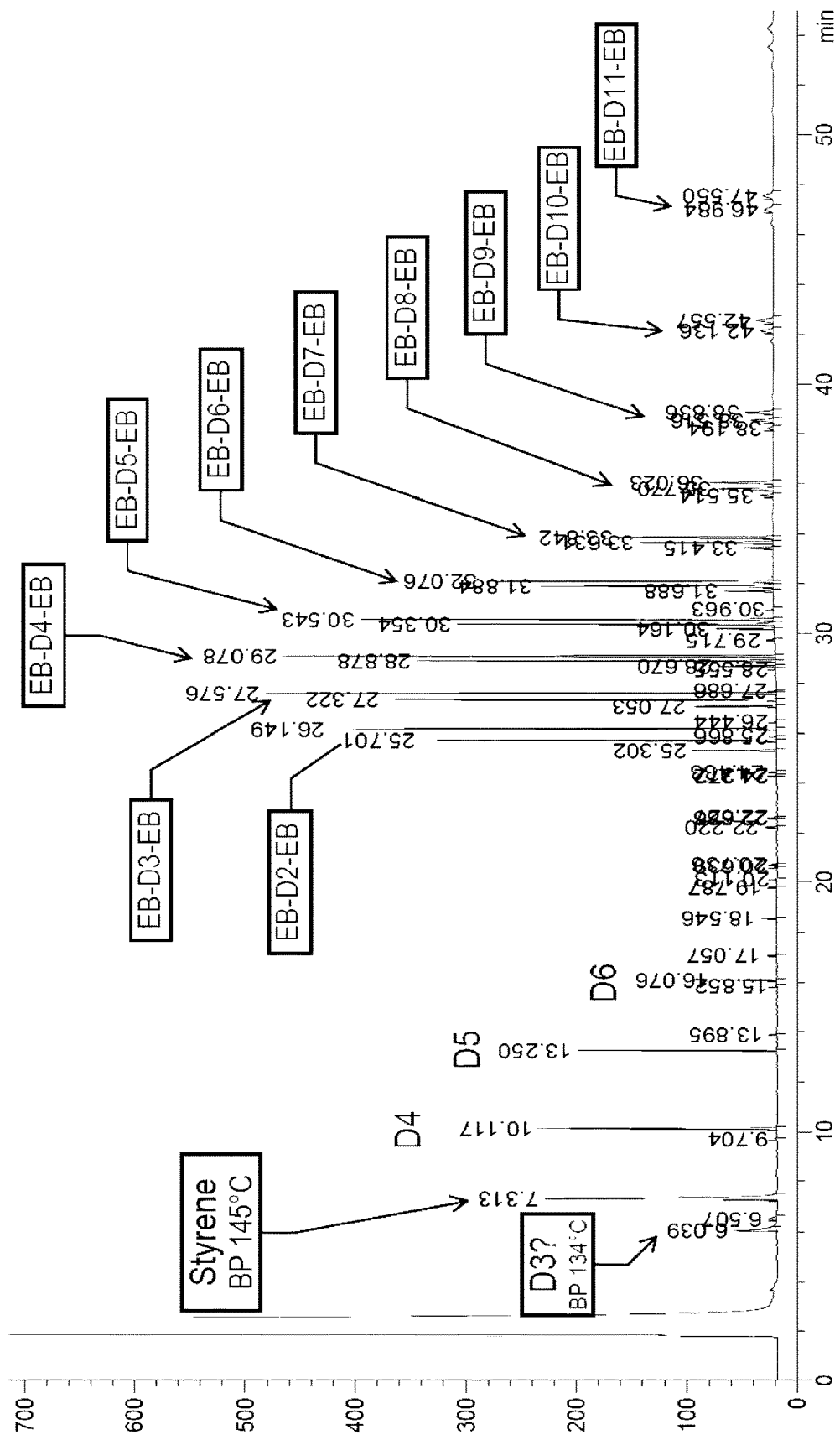
FIG. 8 shows GC data of EB-D8-EB according to one example of the present disclosure before distillation/WFE.
Figure 9:
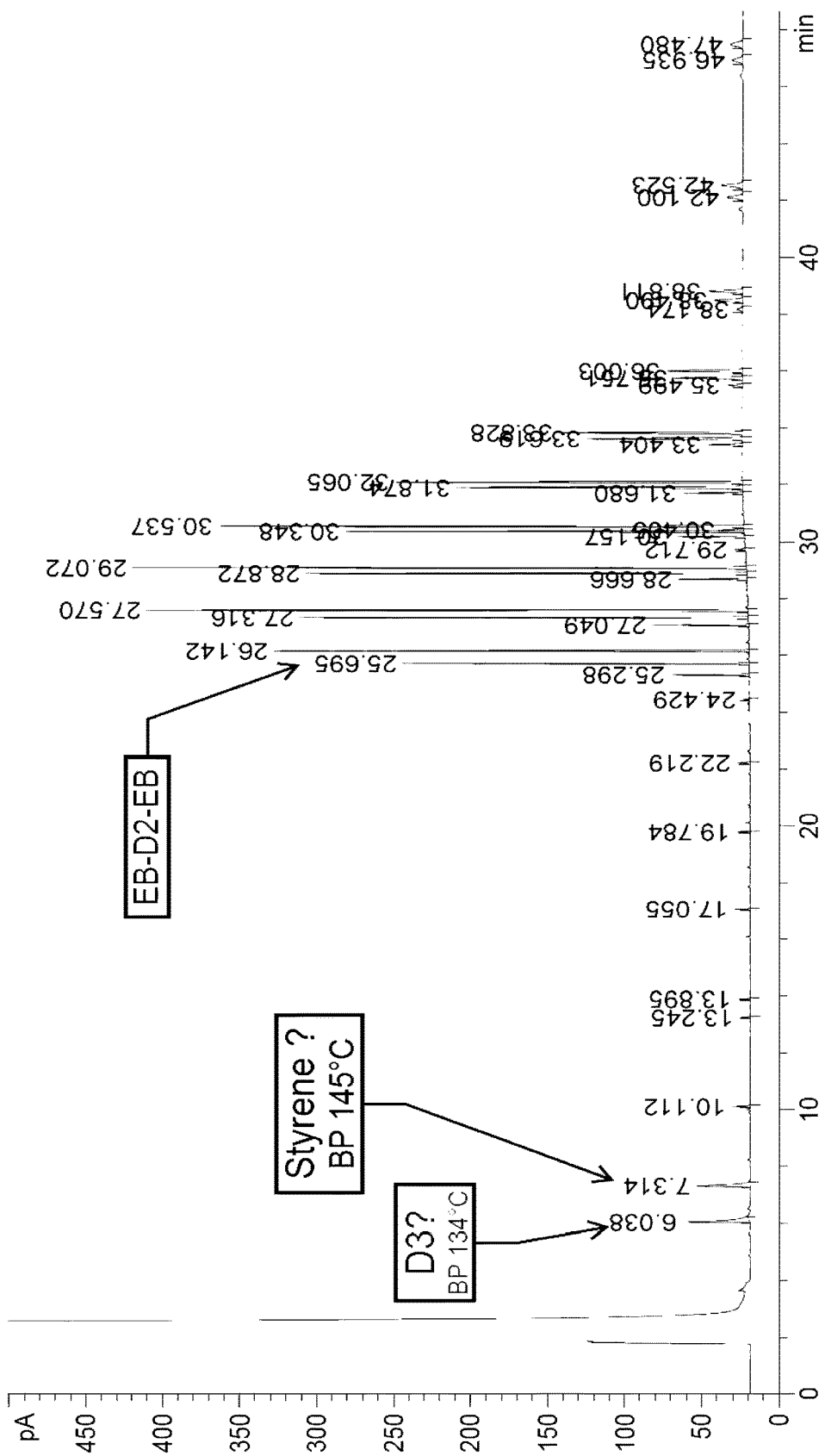
FIG. 9 shows GC data of EB-D8-EB according to one example of the present disclosure after distillation/WFE.

The GC data in FIG. 8 (before distillation/WFE) and FIG. 9 (after distillation/WFE) show the distribution following distillation/WFE clearly indicating the reduction in the presence of low molecular weight volatiles Additive Addition Where the acid number was outside of the specification it could be reduced by the use of activated alumina. The use of DCE 410 [7-Oxabicyclo[4.1.0]heptane-3-carboxylic acid, 2-ethylhexyl] is an antacid additive used in Skydrol® (LD4) for limiting acid levels in phosphate ester formulations was found to be effective after the acid number had been reduced.

B. Preparation of Polysiloxane Compounds of Formula 1 and 1a

Example 1: Preparation of α,ω-Diethylbenzyl Octasiloxane (EB-D8-EB)

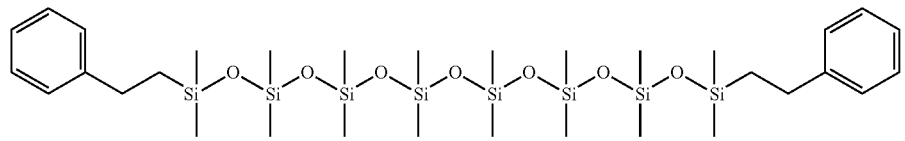 [SMILES: C[Si](C)(CCc1ccccc1)O[Si](C)(C)O[Si](C)(C)O[Si](C)(C)O[Si](C)(C)O[Si](C)(C)O[Si](C)(C)O[Si](C)(C)CCc1ccccc1]

TMDS (tetramethyl disiloxane; 671.6 g) was placed into a 5000 ml round bottom flask equipped with a magnetic flea, nitrogen feed, vacuum line and condenser. D4 (octamethylcyclotetrasiloxane; 2341.7 g) was added, the mixture degassed using nitrogen and vacuum, then trifluoromethanesulfonic acid (4.34 g) added with stirring. The temperature was raised to 50° C. for three hours, to produce a distribution of hydride-terminated siloxane chains of average length 8 repeat units. Next a large excess of sodium bicarbonate (6.08 g) was added, and the mixture stirred for 30 minutes to ensure neutralization of the acid. Karstedt's catalyst (2%, 1.00 g) was added to styrene (1066.9 g), and then that mixture was added to the hydride-terminated siloxane in three portions: 293 g, 352 g and 448 g; at intervals of about 1 hour. Shortly after each addition the temperature rose by about 40° C. then slowly declined. An hour after the last addition activated carbon (20 g) was added to adsorb the Karstedt's catalyst, and the mixture stirred for a further hour. Filter aid (Celite 542; 20 g) was then added and the mixture filtered through medium-speed paper. Volatiles (principally residual styrene and D4) were then removed from the filtered reaction mixture, either by distillation at reduced pressure (~1 mBar, up to 160° C.), or by wiped film evaporation (~5 mBar at 150° C., flow rate 4 ml/min on a 2" unit). The final product was a white to pale yellow oil.

The composition of the siloxane product was analysed by liquid chromatography and the siloxane oligomer mixture obtained is represented in the chart provided in FIG. 1 where an amount of a specific siloxane compound is provided in the vertical axis and the siloxane compound defined by number of silane (Si) groups is provided along the horizontal axis. The number average molar mass was determined to be 869, the weight average molar mass was determined to be 1044, and from these calculations the polydispersity (PD) was determined to be about 1.2. The composition of the mixture of siloxane oligomers essentially provides a number average siloxane oligomer corresponding to about 8 silane groups (i.e. EB-D8-EB). This siloxane product composition was shown to provide advantageous properties for use as a hydraulic fluid or component therein, which includes advantageous viscosity properties and various compatibility with other hydraulic fluids including various components and additives thereof.

Example 2: Preparation of α,ω-Diethylbenzyl Ethylbenzyl Dodecasiloxane (EB-D12EB-EB)

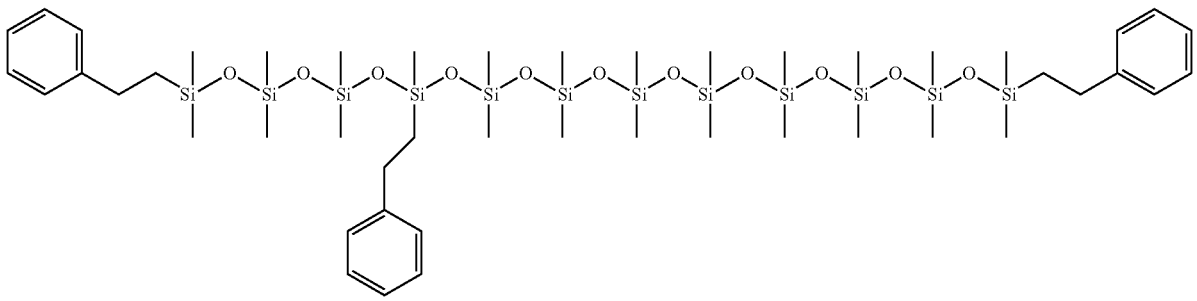 [SMILES: C[Si](C)(CCc1ccccc1)O[Si](C)(C)O[Si](C)(C)O[Si](C)(C)O[Si](C)(C)O[Si](C)(C)O[Si](C)(C)O[Si](C)(C)O[Si](C)(CCc1ccccc1)O[Si](C)(C)O[Si](C)(C)O[Si](C)(C)CCc1ccccc1]

TMDS (tetramethyl disiloxane; 134.3 g) was placed into a 2000 ml round bottom flask equipped with a magnetic flea, nitrogen feed, vacuum line, condenser and temperature probe. D4 (octamethylcyclotetrasiloxane; 667.4 g) and "D4H" (tetramethylcyclotetrasiloxane; 60.1 g) were added, the mixture degassed using nitrogen and vacuum, then trifluoromethanesulfonic acid (1.72 g) was added with stirring. The temperature was raised to 50°-60° C. for three hours, to produce a distribution of hydride-terminated siloxane chains of average length 12 repeat units, with an average of 3 hydride units per chain. Next a large excess of sodium bicarbonate (3.65 g) was added, and the mixture stirred for 30 minutes to ensure neutralization of the acid. Karstedt's catalyst (2%, 1.50 g) was added to styrene (320.1 g), and then that mixture was added to the hydride-terminated siloxane in two portions of 160.0 g, with a delay of about 1 hour between additions. Shortly after each addition the temperature rose by about 50° C. then slowly declined. An hour after the last addition activated carbon (8.8 g) was added to adsorb the Karstedt's catalyst, and the mixture stirred for a further hour. Filter aid (Celite 542; 8.8 g) was then added and the mixture filtered through medium-speed paper. Volatiles (principally residual styrene and D4) were then removed from the filtered reaction mixture, either by distillation at reduced pressure (~1 mBar, up to 160° C.), or by wiped film evaporation (~5 mBar at 150° C., flow rate 4 ml/min on a 2" unit). The final product was a white to pale yellow oil.

Example 3: Preparation of α,ω-Diethylbenzyl Diethyl Benzyl Hexadecasiloxane (EB-D16EB2-EB)

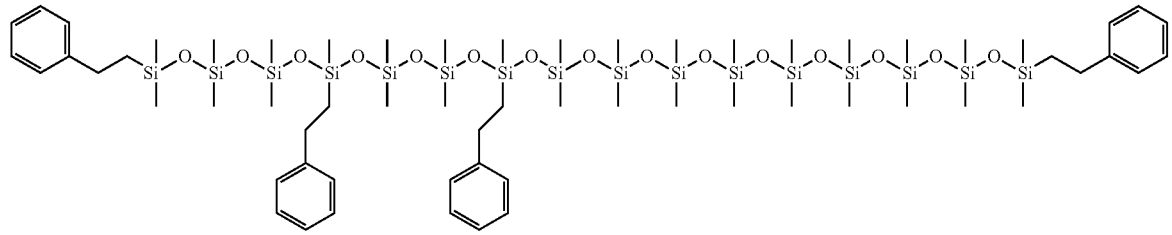 [SMILES: C[Si](C)(CCc1ccccc1)O[Si](C)(C)O[Si](C)(C)O[Si](C)(C)O[Si](C)(C)O[Si](C)(C)O[Si](C)(C)O[Si](C)(C)O[Si](C)(C)O[Si](C)(CCc1ccccc1)O[Si](C)(C)O[Si](C)(C)O[Si](C)(CCc1ccccc1)O[Si](C)(C)O[Si](C)(C)O[Si](C)(C)CCc1ccccc1]

TMDS (tetramethyl disiloxane; 94.03 g) was placed into a 2000 ml round bottom flask equipped with a magnetic flea, nitrogen feed, vacuum line, condenser and temperature probe. D4 (octamethylcyclotetrasiloxane; 622.90 g) and "D4H" (tetramethylcyclotetrasiloxane; 84.18 g) were added, the mixture degassed using nitrogen and vacuum, then trifluoromethanesulfonic acid (1.602 g) was added with stirring. The temperature was raised to 60°-70° C. for four hours, to produce a distribution of hydride-terminated siloxane chains of average length 16 repeat units, with an average of 3 hydride units per chain. Next a large excess of sodium bicarbonate (5.66 g) was added, and the mixture stirred for 30 minutes to ensure neutralization of the acid. Karstedt's catalyst (2%, 0.8 g) was added to styrene (298.72 g), and then that mixture was added to the hydride-terminated siloxane. in two portions of 149.36 g, with a delay of about 40 minutes between additions. Shortly after each addition the temperature rose by about 70 and 40° C. respectively then slowly declined. An hour after the last addition activated carbon (8.2 g) was added to adsorb the Karstedt's catalyst, and the mixture stirred for a further 2-3 hours. Filter aid (Celite 542; 5.46 g) was then added and the mixture filtered through medium-speed paper. Volatiles (principally residual styrene and D4) were then removed from the filtered reaction mixture, either by distillation at reduced pressure (~1 mBar, up to 160° C.), or by wiped film evaporation (~5 mBar at 150° C., flow rate 4 m/min on a 2" unit). The final product was a white to pale yellow oil.

Example 4: Preparation of α,ω-Diethylbenzyl Diphenyl Hexadecasiloxane (EB-D16(Ph2)-EB)

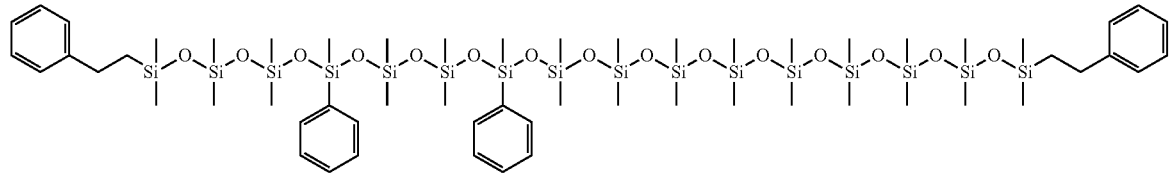 [SMILES: C[Si](C)(CCc1ccccc1)O[Si](C)(C)O[Si](C)(C)O[Si](C)(C)O[Si](C)(C)O[Si](C)(C)O[Si](C)(C)O[Si](C)(C)O[Si](C)(C)O[Si](C)(O[Si](C)(C)O[Si](C)(C)O[Si](C)(O[Si](C)(C)O[Si](C)(C)O[Si](C)(C)CCc1ccccc1)c1ccccc1)c1ccccc1]

TMDS (tetramethyl disiloxane; 94.03 g) was placed into a 2000 ml round bottom flask equipped with a magnetic flea, nitrogen feed, vacuum line, condenser and temperature probe. D4 (octamethylcyclotetrasiloxane; 622.90 g) and "D3PH" (trimethyltriphenylcyclosiloxane; 190.72 g) were added, the mixture degassed using nitrogen and vacuum, then trifluoromethanesulfonic acid (1.43 g) was added with stirring. The mix was stirred at room temperature for four hours, to produce a distribution of hydride-terminated siloxane chains of average length 16 repeat units, with an average of 3 hydride units per chain. Next a large excess of sodium bicarbonate (4.01 g) was added, and the mixture stirred for 30 minutes to ensure neutralization of the acid. Karstedt's catalyst (2%, 0.234 g) was added to styrene (149.36 g), and then that mixture was added to the hydride-terminated siloxane. Shortly after the temperature rose by about 60° C. and then slowly declined. An hour after later activated carbon (11.04 g) was added to adsorb the Karstedt's catalyst, and the mixture stirred for a further 2-3 hours. Filter aid (Celite 542; 184.36 g) was then added and the mixture filtered through medium-speed paper. Volatiles (principally residual styrene and D4) were then removed from the filtered reaction mixture, either by distillation at reduced pressure (~1 mBar, up to 160° C.), or by wiped film evaporation (~5 mBar at 150° C., flow rate 4 ml/min on a 2" unit).

Example 5: Preparation of α,ω-Tetraphenyl Octosiloxane (Ph2-D8-Ph2)

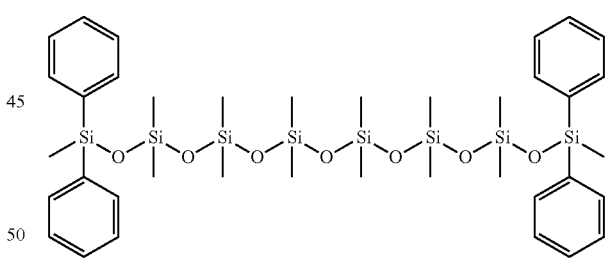

TPhTMTS (1,1,5,5-ttetraphenyl-1,3,3,5-tetramethyltrisiloxane, 24.24 g) was placed into a 100 ml round bottom flask equipped with a magnetic flea, nitrogen feed, vacuum line, condenser and temperature probe. D4 (octamethylcyclotetrasiloxane; 18.54 g) was added, the mixture degassed using nitrogen and vacuum, then trifluoromethanesulfonic acid (0.11 g) was added stirring under nitrogen for 5 hours. An excess of sodium bicarbonate (0.76 g) and activated carbon (0.76 g) were added, and the mixture stirred for 6 hours. Filter aid (Celite) was then added and the mixture filtered through medium-speed paper. Volatiles were then removed from the filtered reaction mixture by rotary evaporation at ~10 mBar, at 80° C. for 3-4 hours. A clear liquid was produced.

Example 6: Preparation of Tetraethylbenzyltetramethyltetracyclosiloxane

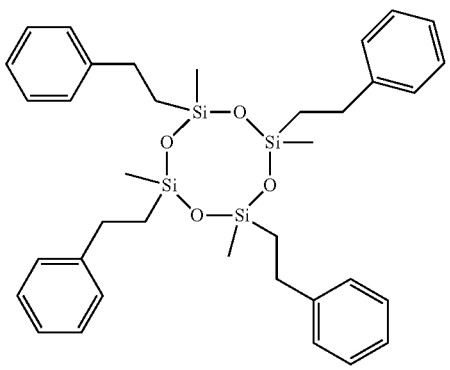 [SMILES: C[Si]1(CCc2ccccc2)O[Si](C)(CCc2ccccc2)O[Si](C)(CCc2ccccc2)O[Si](C)(CCc2ccccc2)O1]

D4H (tetramethylcyclotetrasiloxane; 24.05 g) was placed into a 100 ml round bottom flask equipped with a magnetic flea, nitrogen feed, vacuum line, condenser and temperature probe. The mixture was degassed using nitrogen and vacuum, then Karstedt's catalyst (2%, 0.16 g) was added. Subsequently, the styrene (42.675 g) was added in four portions and the mixture allowed to cool before the next addition. Shortly after each addition the temperature rose by about 40-70° C. and then slowly declined. After the last addition, the mix was allowed to cool and activated carbon (0.66 g) was added to adsorb the Karstedt's catalyst. The mix was filtered through medium-speed paper and volatiles were then removed from the filtered reaction mixture by distillation at reduced pressure (~1 mBar, up to 160° C.), or by wiped film evaporation (~5 mBar at 150° C., flow rate 4 ml/min on a 2" unit). The final product was a viscous liquid.

Example 7: Preparation of α,ω-Diethylbenzylphenyldodecasiloxane (EB-D12(Ph)-EB)

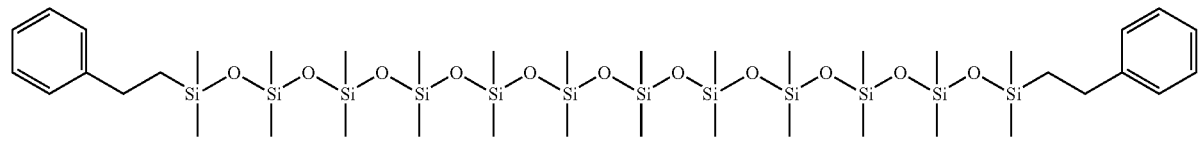 [SMILES: C[Si](C)(CCc1ccccc1)O[Si](C)(C)O[Si](C)(C)O[Si](C)(C)O[Si](C)(C)O[Si](C)(C)O[Si](C)(C)O[Si](C)(C)O[Si](C)(C)O[Si](C)(C)O[Si](C)(C)O[Si](C)(C)CCc1ccccc1]

TMDS (tetramethyl disiloxane; 6.72 g) was placed into a 250 ml round bottom flask equipped with a magnetic flea, nitrogen feed, vacuum line, condenser and temperature probe. D4 (octamethylcyclotetrasiloxane; 33.37 g) and "D3Ph" (trimethyltriphenylcyclosiloxane: 6.81 g) were added, the mixture degassed using nitrogen and vacuum, then trifluoromethanesulfonic acid (0.10 g) was added with stirring. The mixture was stirred at room temperature for three hours. Sodium bicarbonate (0.35 g) was added, and the mixture stirred for 30 minutes to ensure neutralization of the acid. Styrene (10.67 g) was then added followed by Karstedt's catalyst (2%, 0.075 g) was added. Shortly after the addition the temperature rose by about 60° C. respectively then slowly declined. Activated carbon (0.6 g) was added to adsorb the Karstedt's catalyst. Volatiles were then removed from the filtered reaction mixture, either by distillation at reduced pressure (~1 mBar, up to 160° C.), for two hours.

Example 8: Preparation of α,ω-Diethylbenzyldiphenyldodecasiloxane (EB-D12(Ph2)-EB)

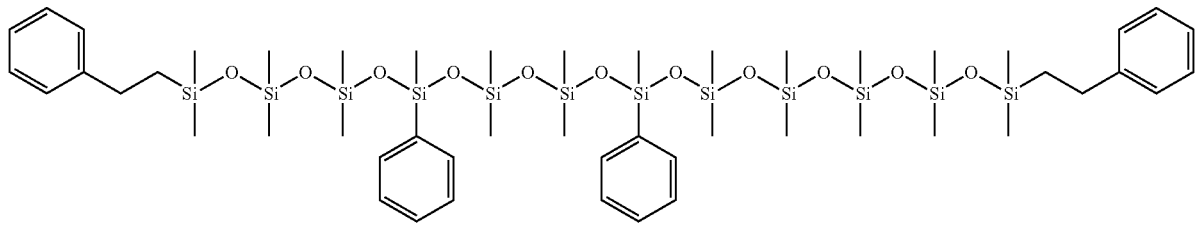 [SMILES: C[Si](C)(CCc1ccccc1)O[Si](C)(C)O[Si](C)(C)O[Si](C)(C)O[Si](C)(C)O[Si](C)(O[Si](C)(C)O[Si](C)(C)O[Si](C)(O[Si](C)(C)O[Si](C)(C)O[Si](C)(C)CCc1ccccc1)c1ccccc1)c1ccccc1]

TMDS (tetramethyl disiloxane; 6.72 g) was placed into a 250 ml round bottom flask equipped with a magnetic flea, nitrogen feed, vacuum line, condenser and temperature probe. D4 (octamethylcyclotetrasiloxane; 29.66 g) and "D3Ph" (trimethyltriphenylcyclosiloxane: 13.62 g) were added, the mixture degassed using nitrogen and vacuum, then trifluoromethanesulfonic acid (0.09 g) was added with stirring. The mixture was stirred at room temperature for three hours. Sodium bicarbonate (0.15 g) was added, and the mixture stirred for 30 minutes to ensure neutralization of the acid. Styrene (10.67 g) was then added followed by Karstedt's catalyst (2%, 0.04 g) was added. Shortly after the addition the temperature rose by about 60° C. respectively then slowly declined. Activated carbon (0.6 g) was added to adsorb the Karstedt's catalyst. Volatiles were then removed from the filtered reaction mixture, either by distillation at reduced pressure (~1 mBar, up to 160° C.), for two hours.

Example 9: Preparation of α,ω-Diethylbenzylethylbenzyldodecasiloxane (EB-D12(EB)-EB)

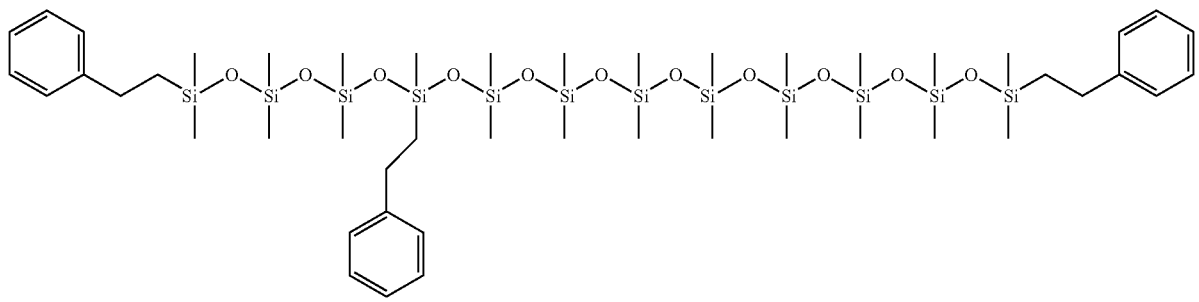 [SMILES: C[Si](C)(CCc1ccccc1)O[Si](C)(C)O[Si](C)(C)O[Si](C)(C)O[Si](C)(C)O[Si](C)(C)O[Si](C)(C)O[Si](C)(C)O[Si](C)(CCc1ccccc1)O[Si](C)(C)O[Si](C)(C)O[Si](C)(C)CCc1ccccc1]

TMDS (tetramethyl disiloxane; 2014.9 g) was placed into a 2000 ml round bottom flask equipped with a magnetic flea, nitrogen feed, vacuum line, condenser and temperature probe. D4 (octamethylcyclotetrasiloxane; 10010.8 g) and "D4H" (tetramethylcyclotetradisiloxane; 901.9 g) were added, the mixture degassed using nitrogen and vacuum, then trifluoromethanesulfonic acid (25.85 g) was added with stirring. The mixture was stirred at 70° C. for four hours. Sodium bicarbonate (0.15 g) was added, and the mixture stirred for 30 minutes to ensure neutralization of the acid. Styrene (2400 g) was then added followed by Karstedt's catalyst (2%, 0.5 g) was added. An exotherm of ~80° C. was observed and the reaction mix allowed to cool to ~70° C. before a second portion of styrene (2400 g) with an ensuing exotherm of ~40° C. The reaction was allowed to cool to ~80° C. before activated carbon (132.1 g) was added to adsorb the Karstedt's catalyst. Celite (88 g) and MgSO4 (88 g) were added and the mix filtered. Volatiles were then removed from the filtered reaction mixture by distillation at reduced pressure (~1 mBar, up to 160° C.), for two hours.

Example 10: Preparation of α,ω-Diethylbenzyldiethylbenzyldodecasloxane (EB-D12(EB2)-EB)

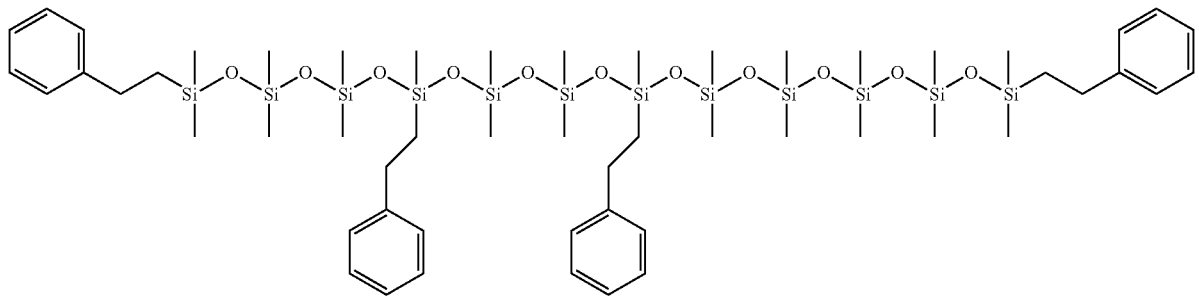 [SMILES: C[Si](C)(CCc1ccccc1)O[Si](C)(C)O[Si](C)(C)O[Si](C)(C)O[Si](C)(C)O[Si](C)(CCc1ccccc1)O[Si](C)(C)O[Si](C)(C)O[Si](C)(CCc1ccccc1)O[Si](C)(C)O[Si](C)(C)O[Si](C)(C)CCc1ccccc1]

TMDS (tetramethyl disiloxane; 6.72 g) was placed into a 100 ml round bottom flask equipped with a magnetic flea, nitrogen feed, vacuum line, condenser and temperature probe. D4 (octamethylcyclotetrasiloxane; 29.7 g) and "D4H" (tetramethylcyclotetradiloxane; 6.01 g) were added, the mixture degassed using nitrogen and vacuum, then trifluoromethanesulfonic acid (0.106 g) was added with stirring. The mixture was stirred at 50-60° C. for three hours. Sodium bicarbonate (0.18 g) was added, and the mixture stirred for 10-20 minutes to ensure neutralization of the acid. Styrene (21.3 g) was then added followed by Karstedt's catalyst (2%, 0.08 g) was added. An exotherm of ~100° C. was observed. The reaction was allowed to cool to ambient before activated carbon (0.6 g) was added to adsorb the Karstedt's catalyst. The mix was filtered. Volatiles were then removed from the filtered reaction mixture by distillation at reduced pressure (~1 mBar, up to 160° C.), for two hours.

Example 11: Preparation of Tetraphenylhexadecasiloxane (Ph2-D16-Ph2)

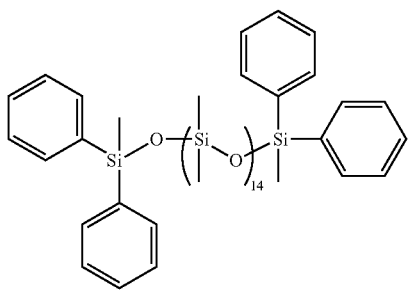

TPhTMTS (1,1,5,5-tetraphenyl-1,3,3,5-tetramethyltrisiloxane, 9.7 g) was placed into a 100 ml round bottom flask equipped with a magnetic flea, nitrogen feed, vacuum line, condenser and temperature probe. D4 (octamethylcyclotetrasiloxane; 19.28 g) was added, the mixture degassed using nitrogen and vacuum, then siloxanolate (0.3 g) was added stirring under nitrogen overnight before heating to 150° C. for one hour.

C. Preparation of Diphosphonate Compounds of Formula 2

Example 7: Preparation of Tetraethyl Propane Diphosphonate 1,3-dibromopropane (60.6 g) and triethyl phosphite (100.0 g) were charged to a 250 ml round bottom flask equipped with a magnetic flea, nitrogen feed, condenser, receiver and temperature probe. A slow nitrogen feed was started, and the temperature raised towards 180° C. with stirring. At about 150° C. the mixture began to boil as the by-product ethyl bromide distilled over into the receiver, and the rate of temperature rise increased. The temperature peaked at about 185° C., after which the remaining triethyl phosphite (50.0 g) was slowly fed in. The mixture was held at 1700-180° C. for a further 2 hours to ensure complete reaction. The crude product was then cooled, and volatiles (principally unreacted triethyl phosphite and a side reaction by-product, diethyl ethyl phosphonate) were removed from the reaction mixture, either by distillation at reduced pressure (~1 mBar, up to 160° C.), or by wiped film evaporation (~5 mBar at 160° C., flow rate 4 ml/min on a 2" unit). The final product was a white oil.

Example 8: Preparation of Tetrabutyl Propane Diphosphonate 1,3-dibromopropane (888.3 g) and tributyl phosphite (2203 g) were charged to a 5000 ml round bottom flask equipped with a magnetic flea, nitrogen feed, condenser, receiver and temperature probe. A slow nitrogen feed was started, and the temperature raised towards 180° C. with stirring. At about 150° C. the mixture began to boil as by-product butyl bromide distilled over into the receiver, and the rate of temperature rise increased. When the temperature reached 200° C. the remaining tributyl phosphite (881 g) was fed in at a sufficient rate to maintain the reaction temperature near 200° C. The mixture was held at 1700-190° C. for a further 2 hours to ensure complete reaction. The crude product was then cooled, and volatiles (principally unreacted tributyl phosphite and a side reaction by-product, dibutyl butane phosphonate) were removed from the reaction mixture, either by distillation at reduced pressure (~1 mBar, up to 160° C.), or by wiped film evaporation (~5 mBar at 160° C., flow rate 4 ml/min on a 2" unit). The final product was a white to pale yellow oil.

Example 9: Preparation of Diethyldibutyl Propane Diphosphonate 1,3-dibromopropane (504.72 g) and triethylphosphite (498.47 g) were charged to a 2000 ml round bottom flask equipped with a magnetic flea, nitrogen feed, condenser, receiver and temperature probe. A slow nitrogen feed was started, and the temperature raised towards 160° C. with stirring. At about 140° C. the mixture began to boil as by-product ethyl bromide distilled over into the receiver, and the rate of temperature rise increased. After the exotherm peaked and the by-product distilled off tributyl phosphite (625.8 g) was fed in at a sufficient rate to maintain the reaction temperature near 200° C. The mixture was held at 1700-180° C. for a further 2 hours to ensure complete reaction. The crude product was then cooled, and volatiles (principally unreacted triethyl and/or tributyl phosphite) were removed from the reaction mixture, either by distillation at reduced pressure (~1 mBar, up to 160° C.), or by wiped film evaporation (~5 mBar at 160° C., flow rate 4 ml/min on a 2" unit). The final product was pale yellow oil and the colour removed using activated charcoal.

Example 10: Preparation of TetraButyl Xylyl Diphosphonate

α,α'-DiChloroXylene (17.51 g) and tributylphosphite (150.19 g) were charged into a 250 ml round bottom flask equipped with a magnetic flea, nitrogen feed, condenser, receiver and temperature probe. A slow nitrogen feed was started, and the temperature raised towards 200° C. with stirring. The reaction mixture was cooled to about 160° C. the reaction and successive addition of sodium bromide (20.58 g) and sodium iodide (30 g. The crude product was then cooled, and volatiles (principally unreacted tributyl phosphite) removed from the reaction mixture, either by distillation at reduced pressure (~1 mBar, up to 160° C.), or wiped film evap. (~5 mBar at 160° C., flow rate 4 ml/min on a 2" unit).

D. Preparation of Phosphonate Compounds of Formula 3

Example 11: Preparation of Diethyl Benzyl Phosphonate

Benzyl bromide (171.0 g) and triethyl phosphite (28.5 g) were added to a 500 ml round bottom flask equipped with a distillation set-up, magnetic flea, and a 20 cm long Dufton fractionating column. The reaction was heated to 140° C. under agitation and the by-product ethyl bromide was distilled off and collected. Five more portions of triethyl phosphite (28.5 g) were added, at such a rate as to maintain the stillhead temperature at about 40° C. and the reactor temperature of at about 140° C. Once the distillation had ceased, NMR was used to confirm the reaction had gone to completion from the absence of the —$\underline{CH_2}$—Br signal in the proton NMR. The crude product was purified via high vacuum distillation to remove volatiles (principally unreacted triethyl phosphite and a side reaction by-product, diethyl ethyl phosphonate). The final product was a clear, pale yellow oil.

Example 12: Preparation of Dibutyl Hexane Phosphonate 1-bromohexane (194.8 g) and tributyl phosphite (443.1 g) were added to a round bottom flask with a distillation set-up and magnetic flea. The reactants were heated to 165-170° C. and the by-product, butyl bromide was distilled off and collected. Once the distillation had ceased, NMR was used to confirm the reaction had gone to completion from the absence of the —$\underline{CH_2}$—Br signal in the proton NMR, usually after about 2-3 hours. Generally, only about 50% of the theoretical amount of butyl bromide was collected due to its relatively high boiling point preventing rapid volatilization. The crude product was purified via high vacuum distillation to remove volatiles (principally unreacted tributyl phosphite and a side reaction by-product, dibutyl butane phosphonate). The final product was a clear, pale yellow oil.

Example 13: Preparation of Diethyl Octane Phosphonate

BromoOctane (1931.3 g) and some of the total triethyl phosphite (1994 g) were added to a 5000 ml round bottom flask equipped with a distillation set-up, magnetic flea, and a 20 cm long Dufton fractionating column. The reaction mix was heated towards 200° C. A vigorous exotherm occurred as the temperature exceeded 160°-180° C. accompanied the by-product ethyl bromide being distilled off and collected. Slowly add the remaining TriEthyl Phosphite so as to keep distillate temperature below 100° C. As the exotherm declines and the reaction approaches completion maintain the temperature at 170° C.-180° C. for another 2 hours. Unreacted TriEthyl Phosphite and other volatiles DiEthyl-EthylPhosphate (DEEP) are removed by vacuum distillation. Once the distillation had ceased, NMR was used to confirm the reaction had gone to completion from the absence of the —$\underline{CH_2}$—Br signal in the proton NMR. The crude product was purified via high vacuum distillation to remove volatiles (principally unreacted triethyl phosphite and a side reaction by-product, diethyl ethyl phosphonate).

The invention claimed is:

1. A hydraulic fluid composition comprising a polysiloxane compound and a non-halogenated diphosphonate compound, wherein the polysiloxane compound is represented by a compound Formula 1

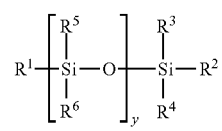

Formula 1 wherein
y is an integer selected from 1 to 40;
$R^1$, $R^2$, $R^3$, and $R^4$, are each independently selected from the group consisting of $C_{1-10}$alkyl, aryl, and $C_{1-10}$alkylaryl;
each $R^5$ and each $R^6$ are independently selected from the group consisting of $C_{1-10}$alkyl, aryl, and $C_{1-10}$alkylaryl; and
at least one of $R^1$ to $R^4$, or at least one of $R^5$ and $R^6$ from at least one of the y units, is $C_{1-10}$alkylaryl,
wherein the polysiloxane compound has a mol % of aryl moieties of about 15 mol % to about 35 mol %, relative to silicon,
wherein the polysiloxane compound is present in the composition at a polydispersity of about 1 to about 5, and
wherein the non-halogenated diphosphonate compound is represented by a compound of Formula 2:

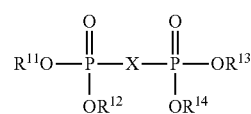

Formula 2 wherein:
X is selected from a group consisting of an aryl, $C_{1-20}$alkylaryl, and $C_{1-20}$dialkylaryl; and
$R^{11}$, $R^{12}$, $R^{13}$, and $R^{14}$ are each independently selected from a group consisting of $C_{1-20}$alkyl, aryl, and $C_{1-20}$alkylaryl.

2. The hydraulic fluid composition of claim 1, wherein the polysiloxane compound of Formula 1 is represented by a compound of Formula 1a:

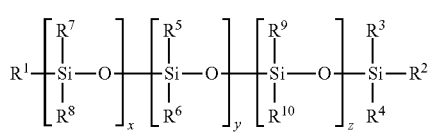

Formula 1a wherein
x is an integer selected from 0 to 10;
y is an integer selected from 1 to 20;
z is an integer selected from 0 to 10;
$R^1$, $R^2$, $R^3$, and $R^4$, are each independently selected from the group consisting of $C_{1-10}$alkyl, aryl, and $C_{1-10}$alkylaryl;
each $R^5$ and each $R^6$ are independently selected from the group consisting of $C_{1-10}$alkyl, aryl, and $C_{1-10}$alkylaryl; and each $R^7$, $R^8$, $R^9$, and $R^{10}$, is independently selected from $C_{1-10}$alkyl.

3. The hydraulic fluid composition of claim 2, wherein each $R^7$, $R^8$, $R^9$, and $R^{10}$, is methyl and x and z are integers each independently selected from 1 to 3.

4. The hydraulic fluid composition of claim 2, wherein y is an integer selected from 2 to 16 or the sum of x, y and z, is an integer selected from 2 to 16.

5. The hydraulic fluid composition of claim 2, wherein $R^1$ and $R^2$ are each independently selected from the group consisting of $C_{1-10}$alkyl, aryl, and $C_{1-10}$alkylaryl; each $R^3$, $R^4$, $R^5$, $R^7$, $R^8$, $R^9$, and $R^{10}$, is $C_{1-4}$alkyl; and wherein each $R^6$ and y is selected to provide the polysiloxane compound of Formula 1a with between 1 to 6 optional substituents independently selected from the group consisting of aryl and $C_{1-10}$alkylaryl and any other substituents for each $R^6$ is independently selected from $C_{1-4}$alkyl.

6. The hydraulic fluid composition of claim 5, wherein each $R^3$, $R^4$, $R^5$, $R^7$, $R^8$, $R^9$, and $R^{10}$, is methyl, and each $R^6$ is independently selected from the group consisting of methyl, aryl, and $C_{1-10}$alkylaryl.

7. The hydraulic fluid composition of claim 1, wherein at least one or both of $R^1$ and $R^2$ are selected from the group consisting of aryl and $C_{1-10}$alkylaryl.

8. The hydraulic fluid composition of claim 1, wherein the $C_{1-10}$alkylaryl is a $C_{1-6}$alkylphenyl.

9. The hydraulic fluid composition of claim 1, wherein the composition comprises a mixture of at least two polysiloxane compounds of Formula 1.

10. The hydraulic fluid composition of claim 9, wherein the polysiloxane mixture comprises a series of different polysiloxane compounds of Formula 1 each having a different y value or a number of siloxane repeat units (Si—O) selected from and including each integer from 6 to 17.

11. The hydraulic fluid composition of claim 9, wherein the polysiloxane mixture comprises at least four polysiloxane compounds each having a different number of siloxane repeat units (Si—O) selected from 9 to 12 repeat units.

12. The hydraulic fluid composition of claim 1, wherein the diphosphonate compound is represented by a compound of Formula 2(a)(i):

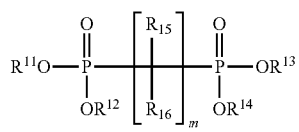

Formula 2(a)(i)

wherein m is an integer selected from 1 to 10;

$R^{11}$, $R^{12}$, $R^{13}$, and $R^{14}$, are each independently selected from the group consisting of $C_{1-20}$alkyl, aryl, and $C_{1-20}$alkylaryl; and each $R^{15}$ and $R^{16}$ is independently selected from the group consisting of hydrogen, $C_{1-20}$alkyl, aryl, and $C_{1-20}$alkylaryl.

13. The hydraulic fluid composition of claim 12, wherein m of Formula 2(a)(i) is an integer selected from 1 to 6; $R^{11}$, $R^{12}$, $R^{13}$, and $R^{14}$, are each independently selected from the group consisting of $C_{1-10}$alkyl and $C_{1-10}$alkylaryl; and each $R^{15}$ and $R^{16}$ of Forumla 2(a)(i) is independently selected from the group consisting of hydrogen and methyl.

14. The hydraulic fluid composition of claim 12, wherein m of Formula 2(a)(i) is an integer selected from 1 to 6; $R^{11}$, $R^{12}$, $R^{13}$, and $R^{14}$ of Formula 2(a)(i) are each independently selected from $C_{2-10}$alkyl; and each $R^{15}$ and $R^{16}$ of Formula 2(a)(i) is hydrogen.

15. The hydraulic fluid composition of claim 1, wherein the composition further comprises a phosphonate compound represented by a compound of Formula 3:

Formula 3 wherein $R^{17}$, $R^{18}$, and $R^{19}$, are each independently selected from the group consisting of $C_{1-20}$alkyl, aryl, and $C_{1-20}$alkylaryl.

16. The hydraulic fluid composition of claim 15, wherein $R^{17}$, $R^{18}$, and $R^{19}$, are each independently selected from the group consisting of $C_{1-10}$alkyl and $C_{1-10}$alkylaryl.

17. The hydraulic fluid composition of claim 1, wherein the amount of polysiloxane compound, based on weight % of the composition, is provided at between about 10 and 90%.

18. The hydraulic fluid composition of claim 1, wherein the volume ratio of the polysiloxane compound to the diphosphonate compound in the composition is provided at a volume ratio between about 4:1 and 1:4.

19. The hydraulic fluid composition of claim 1, wherein the composition further comprises or consists of an additive selected from the group consisting of an acid scavenger, an anti-erosion additive, a viscosity index improver, an antifoaming agent, an antioxidant, an anti-corrosion additive, and any combinations thereof.

20. The hydraulic fluid composition of claim 19, wherein the composition further comprises or consists of an additive selected from the group consisting of an acid scavenger, an antifoaming agent, an antioxidant, and any combinations thereof.

21. The hydraulic fluid composition of claim 19, wherein the acid scavenger is selected from the group consisting of a phenylglycidyl ether, pinene oxide, styrene oxide, glycidyl cyclohexyl ether, glycidyl epoxycyclohexyl ether, diglycidyl ether, glycidyl isopropyl ether, butadiene dioxide cyclohexylene oxide, bis-epoxycyclohexyl adipate, 3,4-epoxycyclohexylcarboylate and 3,4-epoxycyclohexane, and any combinations thereof.

22. The hydraulic fluid composition of claim 19, wherein the antifoaming agent is selected from the group consisting of a silicone oil, polyvinyl alcohol, polyether, and any combinations thereof.

23. The hydraulic fluid composition of claim 19, wherein the antioxidant is selected from the group consisting of a 2,6-di-tert-butyl-p-cresol, phenyl-α-napthylamine, di(octylphenyl)amine, 6-methyl-2,4-bis(octylthio)-methyl-phenol, tetrakis[methylene(3,5-di-tert-butyl-4-hydroxyhydrocinnamate)], and any combinations thereof.

24. The hydraulic fluid composition of claim 1, wherein the composition is substantially free of fluorinated anti-erosion additives.

25. The hydraulic fluid composition of claim 24, wherein the composition is substantially free of any perfluorinated anionic surfactant.

26. The hydraulic fluid composition of claim 1, wherein the composition is substantially free of any one or more additional viscosity index improver selected from the group consisting of poly(alkyl acrylate), poly(alkyl methacrylate), poly(alkyl methacrylate) esters, polycyclic polymers, polyurethanes, polyalkylene oxides, and polyesters.

27. The hydraulic fluid composition of claim 1, wherein the flash point of the composition is between 160 and 300° C. when measured using flash point testing method of ASTM D4206 of 2-4 ml volumes with a Stanhope Seta Open Cup Apparatus.

28. The hydraulic fluid composition of claim 1, wherein the density (gcm$^{-3}$ at 298K) of the composition is less than 1.5.

29. The hydraulic fluid composition of claim 1, wherein the composition exhibits a viscosity between about 5 and about 25 centipoises at about 100° F. and between about 500 and about 3500 centipoises at −65° F.

30. The hydraulic fluid composition claim 1, wherein the composition is effective for use as a fire resistant hydraulic fluid.

31. The hydraulic fluid composition of claim 30, wherein the composition is effective for use as a hydraulic fluid in aircraft.

32. A process for preparing a hydraulic fluid composition comprising adding together in a composition, in any order, the polysiloxane compound of Formula 1 and diphosphonate compound as defined in claim 1.

33. The process of claim 32, whereby the hydraulic fluid composition is prepared by adding into the composition, in any order, at least one of a phosphonate compound or additive.

34. A hydraulic fluid composition comprising:
a polysiloxane compound of Formula 1:

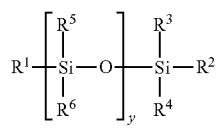

Formula 1 wherein
y is an integer selected from 4 to 40;
$R^1$, $R^2$, $R^3$, and $R^4$, are each independently selected from the group consisting of $C_{1-10}$alkyl, aryl, and $C_{1-10}$alkylaryl;
each $R^5$ and each $R^6$ is independently selected from the group consisting of $C_{1-10}$alkyl, aryl, and $C_{1-10}$alkylaryl; and
wherein at least one of $R^1$ to $R^4$, or at least one $R^5$ and $R^6$ from at least one of the y units, is $C_{1-10}$alkylaryl,
wherein the polysiloxane compound has a mol % of aryl moieties of about 20 mol % to about 30 mol %, relative to silicon,
wherein the polysiloxane compound is present in the composition at a polydispersity of about 1 to about 5; and
a non-halogenated diphosphonate compound represented by a compound of Formula 2:

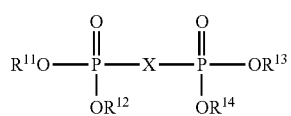

Formula 2 wherein:
X is selected from a group consisting of an aryl, $C_{1-20}$alkylaryl, and $C_{1-20}$dialkylaryl; and
$R^{11}$, $R^{12}$, $R^{13}$, and $R^{14}$ are each independently selected from a group consisting of $C_{1-20}$alkyl, aryl, and $C_{1-20}$alkylaryl.

35. The hydraulic fluid composition of claim 34, wherein the polysiloxane compound of Formula 1 is represented by a compound of Formula 1a:

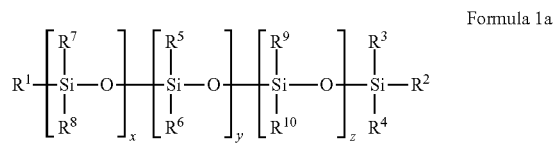

Formula 1a wherein
x is an integer selected from 0 to 10;
y is an integer selected from 4 to 20;
z is an integer selected from 0 to 10;
$R^1$, $R^2$, $R^3$, and $R^4$, are each independently selected from the group consisting of $C_{1-10}$alkyl, aryl, and $C_{1-10}$alkylaryl;
each $R^5$ and each $R^6$ are independently selected from the group consisting of $C_{1-10}$alkyl, aryl, and $C_{1-10}$alkylaryl; and
each $R^7$, $R^8$, $R^9$, and $R^{10}$, is independently selected from $C_{1-10}$alkyl; and
wherein at least one of $R^1$ to $R^4$, or at least one of $R^5$ to $R^{10}$ from at least one of the x, y or z units, is $C_{1-10}$alkylaryl.

36. The hydraulic fluid composition of claim 35, wherein each $R^7$, $R^8$, $R^9$, and $R^{10}$, is methyl and x and z are integers each independently selected from 1 to 3.

37. The hydraulic fluid composition of claim 34, wherein y is an integer selected from 4 to 16 or the sum of x, y and z, is an integer selected from 4 to 16.

38. The hydraulic fluid composition of claim 34, wherein $R^1$ and $R^2$ are each independently selected from the group consisting of $C_{1-10}$alkyl, aryl, and $C_{1-10}$alkylaryl; each $R^3$, $R^4$, $R^5$, $R^7$, $R^8$, $R^9$, and $R^{10}$, is $C_{1-4}$alkyl; and wherein each $R^6$ and y is selected to provide the polysiloxane compound of Formula 1a with between 1 to 6 optional substituents independently selected from the group consisting of aryl and $C_{1-10}$alkylaryl and any other substituents for each $R^8$ is independently selected from $C_{1-4}$alkyl.

39. The hydraulic fluid composition of claim 38, wherein each $R^3$, $R^4$, $R^5$, $R^7$, $R^8$, $R^9$, and $R^{10}$, is methyl, and each $R^6$ is independently selected from the group consisting of methyl, aryl, and $C_{1-10}$alkylaryl.

40. The hydraulic fluid composition of claim 34, wherein at least one of $R^1$ and $R^2$ is $C_{1-10}$alkylaryl.

41. The hydraulic fluid composition of claim 34, wherein the $C_{1-10}$alkylaryl is a $C_{1-6}$alkylphenyl.

42. The hydraulic fluid composition of claim 34, wherein the composition comprises a mixture of at least two polysiloxane compounds of the Formula 1.

43. The hydraulic fluid composition of claim 42, wherein the polysiloxane mixture comprises a series of different polysiloxane compounds of Formula 1 each having a different y value or a number of siloxane repeat units (Si—O) selected from and including each integer from 6 to 17.

44. The hydraulic fluid composition of claim 43, wherein the polysiloxane mixture comprises at least four polysiloxane compounds each having a different number of siloxane repeat units (Si—O) selected from 8 to 13 repeat units.

45. The hydraulic fluid composition of claim 34, wherein the composition further comprises a phosphonate compound of Formula 3:

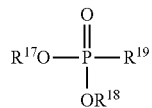

Formula 3 wherein $R^{17}$, $R^{18}$, and $R^{19}$, are each independently selected from the group consisting of $C_{1-20}$alkyl, aryl, and $C_{1-20}$alkylaryl.

46. The hydraulic fluid composition of claim 45, wherein $R^{17}$, $R^{18}$, and $R^{19}$, are each independently selected from the group consisting of $C_{1-10}$alkyl and $C_{1-10}$alkylaryl.

47. The hydraulic fluid composition of claim 34, wherein the amount of polysiloxane compound, based on weight % of the composition, is provided at between about 10 and 90%.

48. The hydraulic fluid composition of claim 34, wherein the composition further comprises or consists of an additive selected from the group consisting of an acid scavenger, an anti-erosion additive, a viscosity index improver, an anti-foaming agent, an antioxidant, anti-corrosion additive, and any combinations thereof.

49. The hydraulic fluid composition of claim 48, wherein the composition further comprises or consists of an additive selected from the group consisting of an acid scavenger, an antifoaming agent, an antioxidant, and any combinations thereof.

50. The hydraulic fluid composition of claim 34, wherein the composition is substantially free of fluorinated anti-erosion additives.

51. The hydraulic fluid composition of claim 34, wherein the composition is substantially free of any one or more additional viscosity index improver selected from the group consisting of poly(alkyl acrylate), poly(alkyl methacrylate), poly(alkyl methacrylate) esters, polycyclic polymers, polyurethanes, polyalkylene oxides, and polyesters.

52. The hydraulic fluid composition of claim 34, wherein the flash point of the composition is between 160 and 300° C. when measured using flash point testing method of ASTM D4206 of 2-4 ml volumes with a Stanhope Seta Open Cup Apparatus.

53. The hydraulic fluid composition of claim 34, wherein the density (gcm$^3$ at 298K) of the composition is less than 1.5.

54. The hydraulic fluid composition of claim 34, wherein the composition exhibits a viscosity between about 5 and about 25 centipoises at about 100° F. and between about 500 and about 3500 centipoises at −65° F.

55. The hydraulic fluid composition of claim 34, wherein the composition is effective for use as a fire resistant hydraulic fluid or a hydraulic fluid in aircraft.

56. A process for preparing a hydraulic fluid composition comprising combining together in a composition, in any order, the polysiloxane compound of Formula 1 and one or more additional compounds and additives, wherein each of the one or more polysiloxane compounds of Formula 1, one or more additional compounds including phosphonate compounds of Formula 3, and one or more additional additives, are as defined according to claim 34.

57. A hydraulic fluid composition comprising:
a polysiloxane compound of Formula 1:

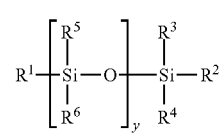

Formula 1 wherein y is an integer selected from 4 to 25;

each $R^3$ and $R^4$ are each independently selected from the group consisting of $C_{1-10}$alkyl, aryl, and $C_{1-10}$alkylaryl; and each $R^5$ and each $R^6$ is independently selected from the group consisting of $C_{1-10}$alkyl, aryl, and $C_{1-10}$alkylaryl; and each $R^1$ and $R^2$ is independently $C_{1-10}$alkylaryl, wherein the polysiloxane compound has a mol % of aryl moieties of about 15 mol % to about 35 mol %, relative to silicon, and a non-halogenated diphosphonate compound represented by a compound of Formula 2:

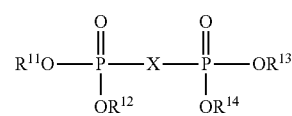

Formula 2 wherein:

X is selected from a group consisting of an aryl, $C_{1-20}$alkylaryl, and $C_{1-20}$dialkylaryl; and $R^{11}$, $R^{12}$, $R^{13}$, and $R^{14}$ are each independently selected from a group consisting of $C_{1-20}$alkyl, aryl, and $C_{1-20}$alkylaryl.

58. The hydraulic fluid composition of claim 57, wherein the polysiloxane compound of Formula 1 is represented by a compound of Formula 1a:

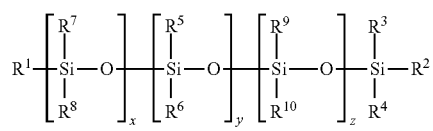

Formula 1a wherein x is an integer selected from 0 to 10;
y is an integer selected from 4 to 20;
z is an integer selected from 0 to 10;
each $R^1$ and $R^2$ is independently $C_{1-10}$alkylaryl;
each $R^3$ and $R^4$ are each independently selected from the group consisting of $C_{1-10}$alkyl, aryl, and $C_{1-10}$alkylaryl;
each $R^5$ and each $R^6$ are independently selected from the group consisting of $C_{1-10}$alkyl, aryl, and $C_{1-10}$alkylaryl; and
each $R^7$, $R^8$, $R^9$, and $R^{10}$ is independently selected from $C_{1-10}$alkyl.

59. The hydraulic fluid composition of claim 58, wherein each $R^7$, $R^8$, $R^9$, and $R^1$ is methyl and x and z are integers each independently selected from 1 to 3.

60. The hydraulic fluid composition of claim 57, wherein y is an integer selected from 4 to 16 or the sum of x, y and z is an integer selected from 4 to 16.

61. The hydraulic fluid composition of claim 57, wherein each $R^3$, $R^4$, $R^5$, $R^7$, $R^8$, $R^9$, and $R^1$ is $C_{1-4}$alkyl; and wherein each $R^6$ and y is selected to provide the polysiloxane compound with between 1 to 6 additional substituents independently selected from the group consisting of aryl and $C_{1-10}$alkylaryl and any other substituents for each $R^6$ is independently selected from $C_{1-4}$alkyl.

62. The hydraulic fluid composition of claim 61, wherein each $R^3$, $R^4$, $R^5$, $R^7$, $R^8$, $R^9$, and $R^{10}$ is methyl, and each $R^6$ is independently selected from the group consisting of methyl, aryl, and $C_{1-10}$alkylaryl.

63. The hydraulic fluid composition of claim 57, wherein each $R^1$ and $R^2$ is independently $C_{1-6}$alkylphenyl.

64. The hydraulic fluid composition of claim 57, wherein the composition comprises a mixture of at least two polysiloxane compounds of Formula 1.

65. The hydraulic fluid composition of claim 64, wherein the polysiloxane mixture comprises a series of different polysiloxane compounds of Formula 1 each having a different y value or a number of siloxane repeat units (Si—O) selected from and including each integer from 6 to 17.

66. The hydraulic fluid composition of claim 64, wherein the polysiloxane mixture comprises at least four polysiloxane compounds each having a different number of siloxane repeat units (Si—O) selected from 9 to 12 repeat units.

67. The hydraulic fluid composition of claim 57, wherein the composition is effective for use as a fire resistant hydraulic fluid or a hydraulic fluid in aircraft.

68. A process for preparing a hydraulic fluid composition comprising combining together in a composition, in any order, the polysiloxane compound of Formula 1 according to claim 57 with one or more additional compounds and/or additives.

69. The hydraulic fluid composition of claim 10, wherein the polysiloxane mixture comprises at least six polysiloxane compounds each having a different number of siloxane repeat units (Si—O) selected from 8 to 13 repeat units.

70. The hydraulic fluid composition of claim 43, wherein the polysiloxane mixture comprises at least four polysiloxane compounds each having a different number of siloxane repeat units (Si—O) selected from 9 to 12 repeat units.

71. The hydraulic fluid composition of claim 64, wherein the polysiloxane mixture comprises at least six polysiloxane compounds each having a different number of siloxane repeat units (Si—O) selected from 8 to 13 repeat units.

72. The hydraulic fluid composition of claim 1, wherein the polysiloxane is present in the composition at a polydispersity of about 1 to about 3.

73. The hydraulic fluid composition of claim 34, wherein the polysiloxane compound is present in the composition at a polydispersity of about 1 to about 3.

74. The hydraulic fluid composition of claim 1, wherein the polysiloxane compound has a mol % of aryl moieties of about 20 mol % to about 30 mol %, relative to silicon.

75. The hydraulic fluid composition of claim 57, wherein the polysiloxane compound has a mol % of aryl moieties of about 20 mol % to about 30 mol %, relative to silicon.

76. The hydraulic fluid composition of claim 1, wherein each $R^1$ and $R^2$ is independently $C_{1-10}$alkylaryl.

77. The hydraulic fluid composition of claim 76, wherein the polysiloxane compound comprises a compound selected from the group consisting of:

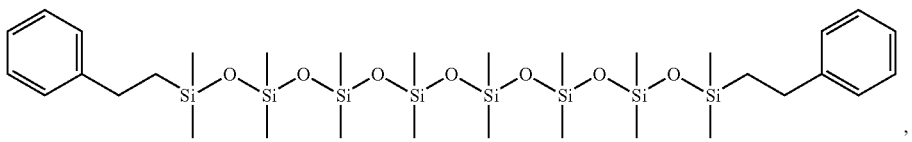

,

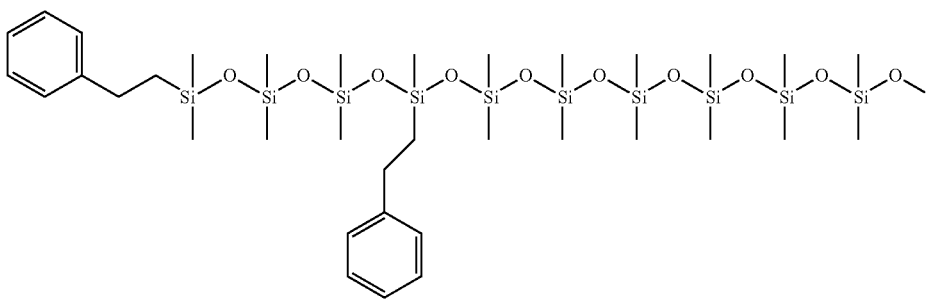

,

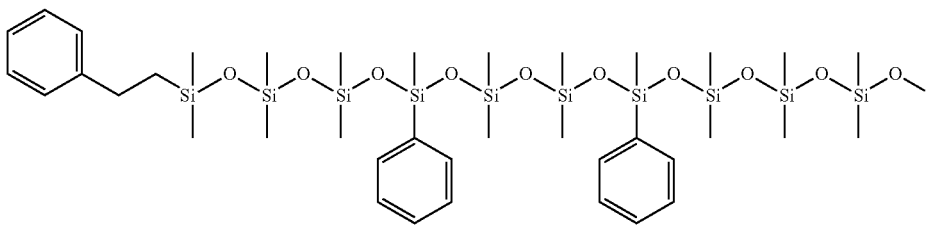

,

-continued
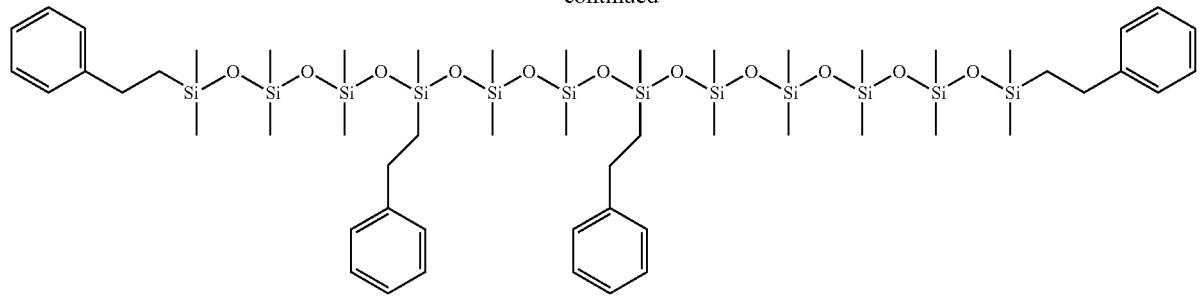,
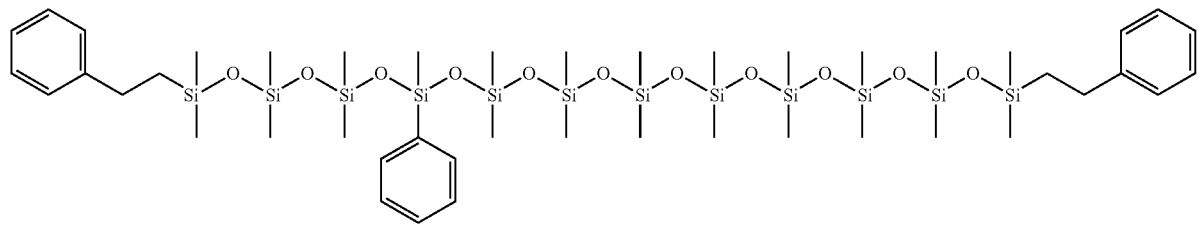,
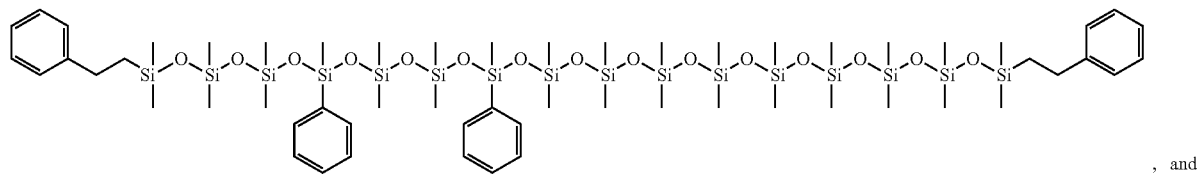, and
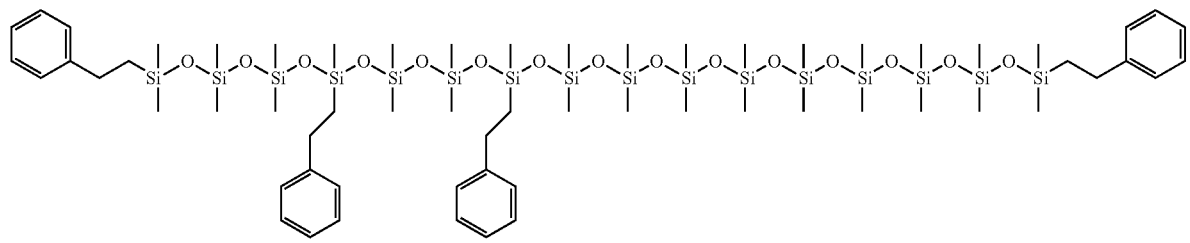.
78. The hydraulic fluid composition of claim 34, wherein each $R^1$ and $R^2$ is independently $C_{1-10}$alkylaryl.
79. The hydraulic fluid composition of claim 78, wherein the polysiloxane compound comprises a compound selected from the group consisting of:
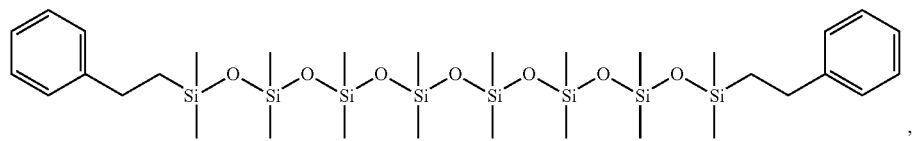,
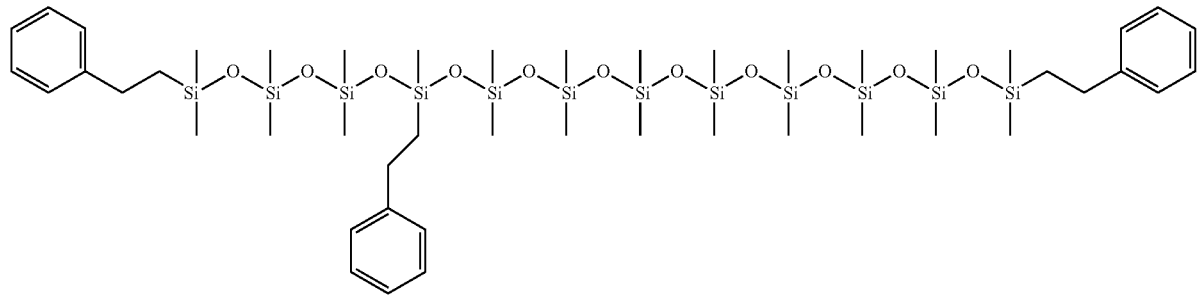, -continued
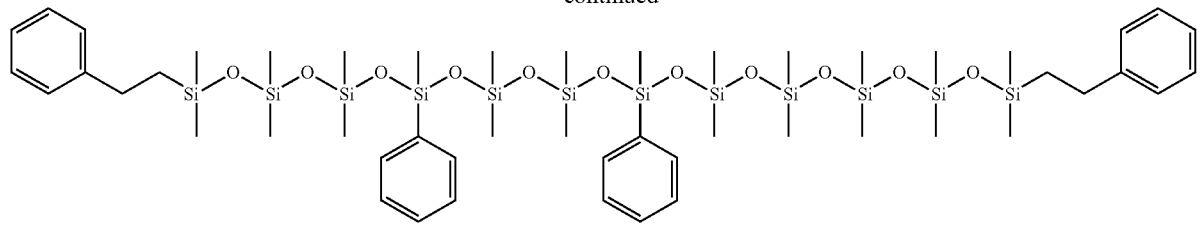
,
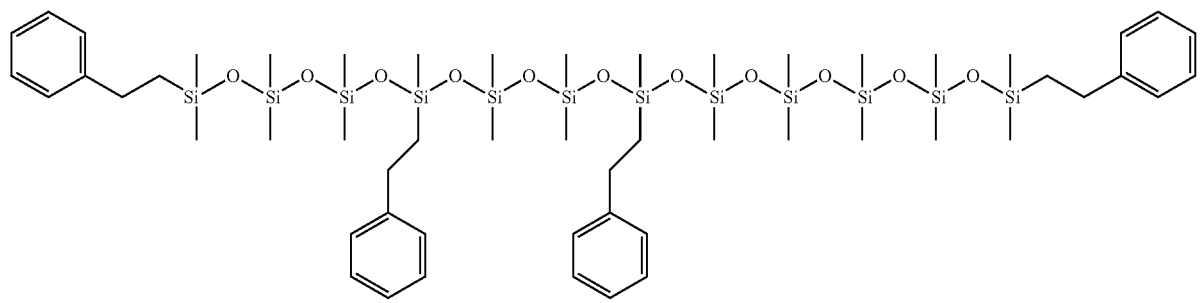
,
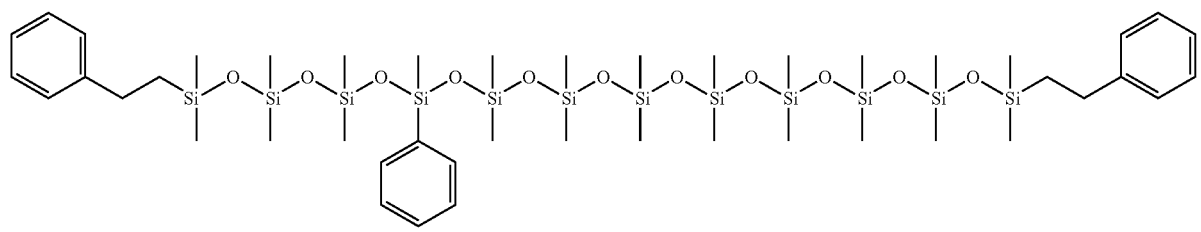
,
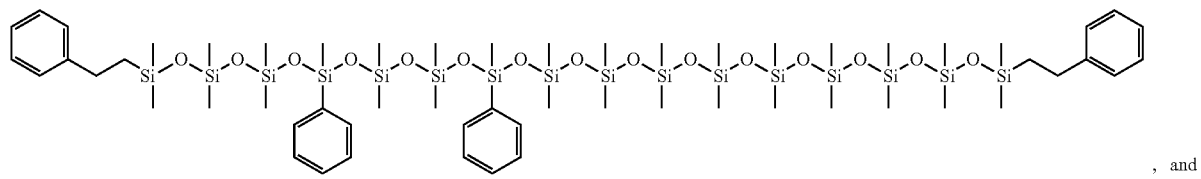
, and
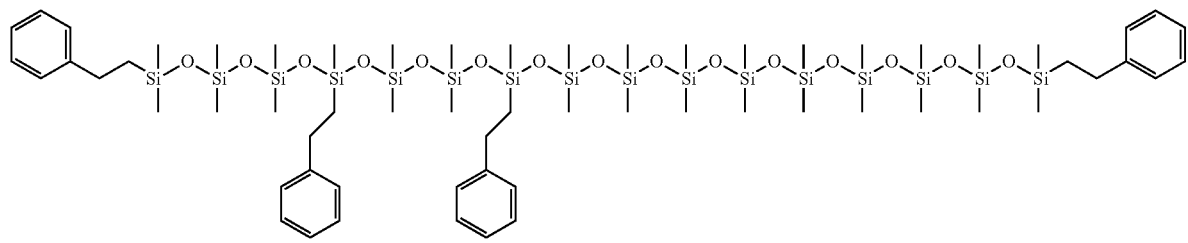
.
80. The polysiloxane compound of claim 57, wherein the polysiloxane compound is selected from the group consisting of:
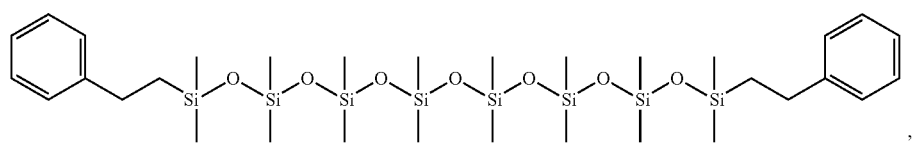
,

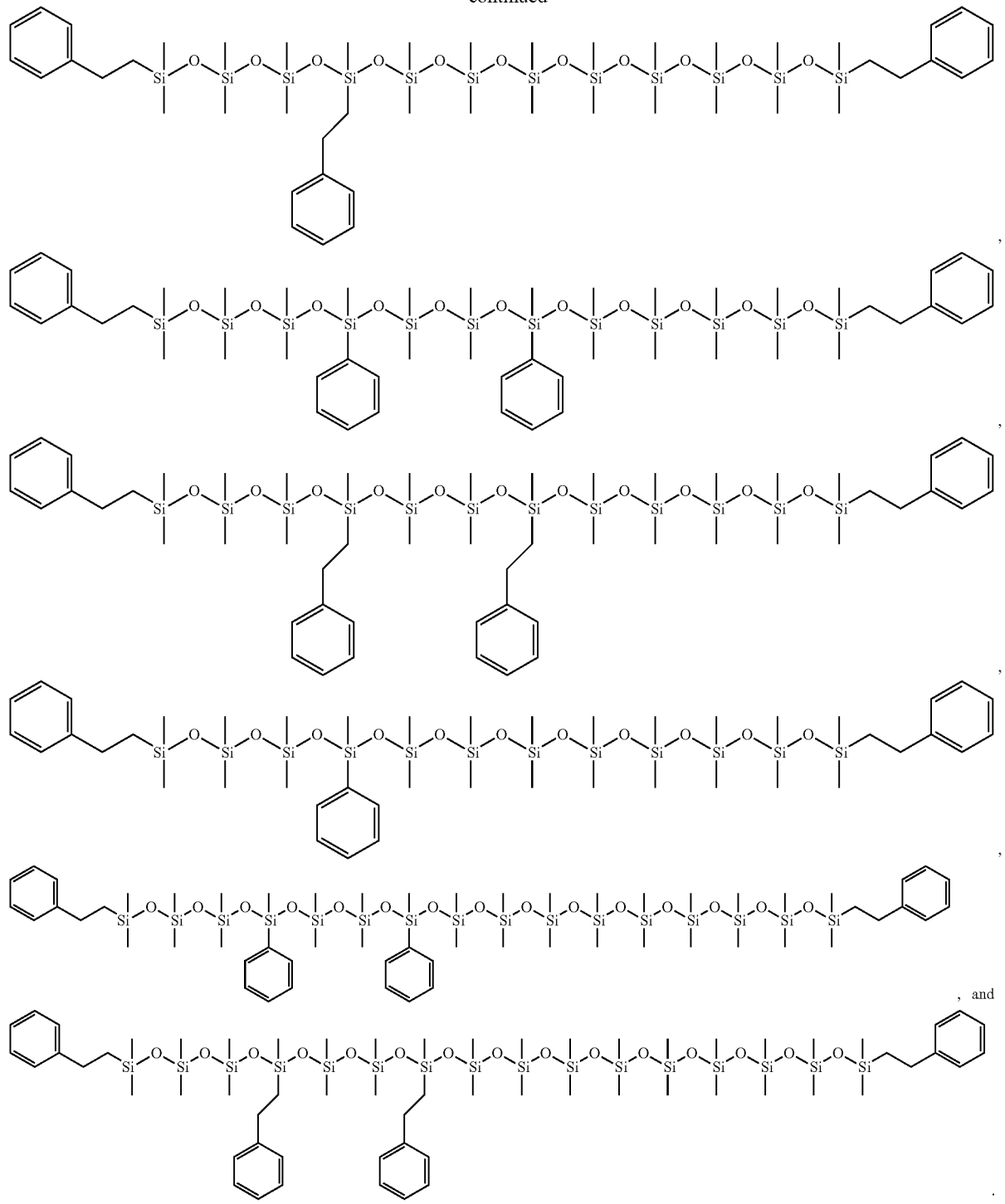
81. The hydraulic fluid composition of claim 1, wherein X is $C_{1-20}$dialkylaryl.
82. The hydraulic fluid composition of claim 1, wherein X is aryl.

UNITED STATES PATENT AND TRADEMARK OFFICE
CERTIFICATE OF CORRECTION

PATENT NO. : 11,299,688 B2
APPLICATION NO. : 16/300579
DATED : April 12, 2022
INVENTOR(S) : Mathew John Ballard et al.

It is certified that error appears in the above-identified patent and that said Letters Patent is hereby corrected as shown below:

In the Claims

In Column 66, Line 2, in Claim 1, after "compound" insert -- of --.

In Column 66, Line 2, in Claim 1, delete "1" and insert -- 1: --.

In Column 66, Line 14, in Claim 1, delete "$R^4$," and insert -- $R^4$ --.

In Column 66, Line 17, in Claim 1, delete "are" and insert -- is --.

In Column 66, Line 20, in Claim 1, delete "$R^4$," and insert -- $R^4$ --.

In Column 66, Line 20, in Claim 1, delete "from" and insert -- of --.

In Column 66, Line 21, in Claim 1, delete "units," and insert -- units --.

In Column 66, Line 62, in Claim 2, delete "$R^4$," and insert -- $R^4$ --.

In Column 67, Line 1, in Claim 2, delete "$R^{10}$," and insert -- $R^{10}$ --.

In Column 67, Line 4, in Claim 3, delete "$R^{10}$," and insert -- $R^{10}$ --.

In Column 67, Line 7, in Claim 4, delete "y" and insert -- y, --.

In Column 67, Line 7, in Claim 4, delete "z," and insert -- z --.

In Column 67, Line 12, in Claim 5, delete "$R^{10}$," and insert -- $R^{10}$ --.

In Column 67, Line 19, in Claim 6, delete "$R^{10}$," and insert -- $R^{10}$ --.

Signed and Sealed this
Twenty-first Day of February, 2023

Katherine Kelly Vidal
*Director of the United States Patent and Trademark Office*

CERTIFICATE OF CORRECTION (continued)
U.S. Pat. No. 11,299,688 B2

In Column 67, Line 41, in Claim 12, after "the" insert -- hydraulic fluid composition further comprises a second --.

In Column 67, Line 41, in Claim 12, after "compound" delete "is".

In Column 67, Line 54, in Claim 12, delete "$R^{14}$," and insert -- $R^{14}$ --.

In Column 67, Line 60, in Claim 13, delete "wherein" and insert -- wherein: --.

In Column 67, Line 62, in Claim 13, delete "$R^{14}$," and insert -- $R^{14}$ --.

In Column 67, Line 65, in Claim 13, delete "Forumla" and insert -- Formula --.

In Column 68, Line 1, in Claim 14, delete "wherein" and insert -- wherein: --.

In Column 68, Line 19, in Claim 15, delete "$R^{19}$," and insert -- $R^{19}$ --.

In Column 68, Line 23, in Claim 16, delete "$R^{19}$," and insert -- $R^{19}$ --.

In Column 68, Lines 49-50, in Claim 21, delete "3,4-epoxycyclohexylcarboylate" and insert -- 3,4- epoxycyclohexylcarboxylate --.

In Column 68, Line 58, in Claim 23, delete "napthylamine," and insert -- naphthylamine, --.

In Column 69, Line 18, in Claim 30, after "composition" insert -- of --.

In Column 69, Line 44, in Claim 34, delete "$R^4$," and insert -- $R^4$ --.

In Column 69, Line 50, in Claim 34, delete "$R^4$," and insert -- $R^4$ --.

In Column 69, Line 51, in Claim 34, delete "from" and insert -- of --.

In Column 69, Line 51, in Claim 34, delete "units," and insert -- units --.

In Column 70, Line 24, in Claim 35, delete "$R^4$," and insert -- $R^4$ --.

In Column 70, Line 30, in Claim 35, delete "$R^{10}$," and insert -- $R^{10}$ --.

In Column 70, Line 32, in Claim 35, delete "$R^4$," and insert -- $R^4$ --.

In Column 70, Line 33, in Claim 35, delete "from" and insert -- of --.

In Column 70, Line 33, in Claim 35, delete "units," and insert -- units --.

In Column 70, Line 36, in Claim 36, delete "$R^{10}$," and insert -- $R^{10}$ --.

CERTIFICATE OF CORRECTION (continued)
U.S. Pat. No. 11,299,688 B2

In Column 70, Line 40, in Claim 37, delete "z," and insert -- z --.

In Column 70, Line 44, in Claim 38, delete "$R^{10}$," and insert -- $R^{10}$ --.

In Column 70, Line 48, in Claim 38, delete "$R^8$" and insert -- $R^6$ --.

In Column 70, Line 51, in Claim 39, delete "$R^{10}$," and insert -- $R^{10}$ --.

In Column 70, Line 67, in Claim 44, delete "four" and insert -- six --.

In Column 71, Line 16, in Claim 45, delete "$R^{19}$," and insert -- $R^{19}$ --.

In Column 71, Line 21, in Claim 46, delete "$R^{19}$," and insert -- $R^{19}$ --.

In Column 71, Line 53, in Claim 53, delete "(gcm$^3$" and insert -- (gcm$^{-3}$ --.

In Column 72, Line 66, in Claim 59, delete "$R^1$" and insert -- $R^{10}$ --.

In Column 73, Line 5, in Claim 61, delete "$R^1$" and insert -- $R^{10}$ --.

In Column 74, Line 4, in Claim 69, delete "claim 10," and insert -- claim 9, --.